(12) United States Patent
Ricci

(10) Patent No.: US 9,134,986 B2
(45) Date of Patent: *Sep. 15, 2015

(54) ON BOARD VEHICLE INSTALLATION SUPERVISOR

(71) Applicant: Flextronics AP, LLC, San Jose, CA (US)

(72) Inventor: Christopher P. Ricci, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,467

(22) Filed: Sep. 12, 2014

(65) Prior Publication Data

US 2015/0006035 A1    Jan. 1, 2015

Related U.S. Application Data

(63) Continuation of application No. 13/829,157, filed on Mar. 14, 2013, now Pat. No. 8,949,823, which is a continuation-in-part of application No. 13/679,479, filed on Nov. 16, 2012.

(Continued)

(51) Int. Cl.
  *G06F 9/44* (2006.01)
  *G06F 9/445* (2006.01)
  *G06F 13/14* (2006.01)

(Continued)

(52) U.S. Cl.
  CPC *G06F 8/61* (2013.01); *B60Q 11/00* (2013.01); *B60R 25/01* (2013.01); *B60W 50/00* (2013.01); *G06F 11/3006* (2013.01); *G06F 11/3051* (2013.01); *G06F 11/3055* (2013.01); *G06F 13/14* (2013.01); *H04L 12/40* (2013.01); *G06F 11/0796* (2013.01); *G06F 11/1428* (2013.01); *G06F 11/2035* (2013.01); *G06F 11/2041* (2013.01); *G06F 11/3409* (2013.01); *G06F 11/349* (2013.01); *H04L 2012/40215* (2013.01); *H04L 2012/40273* (2013.01)

(58) Field of Classification Search
  CPC .......................................................... G06F 8/61
  USPC .................................................. 717/174, 168
  See application file for complete search history.

(56) References Cited

U.S. PATENT DOCUMENTS 5,296,840 A    3/1994  Gieffers
5,363,306 A   11/1994  Kuwahara et al.

(Continued)

OTHER PUBLICATIONS

Official Action for U.S. Appl. No. 13/679,459, mailed Oct. 28, 2014 17 pages.

(Continued)

*Primary Examiner* — Phillip H Nguyen
(74) *Attorney, Agent, or Firm* — Sheridan Ross P.C.

(57) ABSTRACT

The present disclosure describes a microprocessor executable installation supervisor operable to determine, for a selected computational component to be installed in the vehicle, whether the selected computational component satisfies a requirement and/or restriction associated with the selected computational component, when installed, and, when the selected computational component can satisfy the requirement and/or restriction, create a set of data structures in the selected computational component and/or a computer readable medium on board the vehicle to bind the selected computational component to the vehicle.

24 Claims, 31 Drawing Sheets

Related U.S. Application Data

(60) Provisional application No. 61/560,509, filed on Nov. 16, 2011, provisional application No. 61/637,164, filed on Apr. 23, 2012, provisional application No. 61/663,335, filed on Jun. 22, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.

| | |
|---|---|
| B60R 25/01 | (2013.01) |
| B60Q 11/00 | (2006.01) |
| B60W 50/00 | (2006.01) |
| G06F 11/30 | (2006.01) |
| H04L 12/40 | (2006.01) |
| G06F 11/07 | (2006.01) |
| G06F 11/14 | (2006.01) |
| G06F 11/20 | (2006.01) |
| G06F 11/34 | (2006.01) |

(56) References Cited

U.S. PATENT DOCUMENTS

| | | | |
|---|---|---|---|
| 5,508,689 | A | 4/1996 | Rado et al. |
| 5,648,769 | A | 7/1997 | Sato et al. |
| 5,710,702 | A | 1/1998 | Hayashi et al. |
| 5,794,164 | A | 8/1998 | Beckert et al. |
| 5,838,251 | A | 11/1998 | Brinkmeyer et al. |
| 5,890,080 | A | 3/1999 | Coverdill et al. |
| 6,161,071 | A * | 12/2000 | Shuman et al. ............ 701/48 |
| 6,302,438 | B1 | 10/2001 | Stopper, Jr. et al. |
| 6,484,082 | B1 | 11/2002 | Millsap et al. |
| 6,502,022 | B1 | 12/2002 | Chastain et al. |
| 6,678,747 | B2 | 1/2004 | Goossen et al. |
| 6,681,176 | B2 | 1/2004 | Funk et al. |
| 6,690,940 | B1 | 2/2004 | Brown et al. |
| 6,724,920 | B1 | 4/2004 | Berenz et al. |
| 6,782,240 | B1 | 8/2004 | Tabe |
| 7,019,641 | B1 | 3/2006 | Lakshmanan et al. |
| 7,295,921 | B2 | 11/2007 | Spencer et al. |
| 7,343,148 | B1 | 3/2008 | O'Neil |
| 7,474,264 | B2 | 1/2009 | Bolduc et al. |
| 7,493,140 | B2 | 2/2009 | Michmerhuizen et al. |
| 7,506,375 | B2 | 3/2009 | Kanda et al. |
| 7,548,815 | B2 | 6/2009 | Watkins et al. |
| 7,549,041 | B2 | 6/2009 | Wang |
| 7,606,660 | B2 | 10/2009 | Diaz et al. |
| 7,643,913 | B2 | 1/2010 | Taki et al. |
| 7,734,315 | B2 | 6/2010 | Rathus et al. |
| 7,738,462 | B2 | 6/2010 | Hwang |
| RE41,449 | E | 7/2010 | Krahnstoever et al. |
| 7,891,004 | B1 | 2/2011 | Gelvin et al. |
| 7,899,610 | B2 | 3/2011 | McClellan |
| 8,346,432 | B2 | 1/2013 | Van Wiemeersch et al. |
| 8,432,260 | B2 | 4/2013 | Talty et al. |
| 8,527,143 | B2 | 9/2013 | Tan |
| 8,532,574 | B2 | 9/2013 | Kirsch |
| 8,583,292 | B2 | 11/2013 | Preston et al. |
| 8,644,165 | B2 | 2/2014 | Saarimaki et al. |
| 8,706,143 | B1 | 4/2014 | Elias |
| 8,725,311 | B1 | 5/2014 | Breed |
| 8,761,673 | B2 | 6/2014 | Sakata |
| 8,774,842 | B2 | 7/2014 | Jones et al. |
| 8,817,761 | B2 | 8/2014 | Gruberman et al. |
| 8,818,725 | B2 | 8/2014 | Ricci |
| 8,838,088 | B1 | 9/2014 | Henn et al. |
| 8,868,899 | B2 | 10/2014 | Galicia et al. |
| 2002/0023010 | A1 | 2/2002 | Rittmaster et al. |
| 2002/0045484 | A1 | 4/2002 | Eck et al. |
| 2002/0105968 | A1 | 8/2002 | Pruzan et al. |
| 2003/0007227 | A1 | 1/2003 | Ogino |
| 2003/0158638 | A1 | 8/2003 | Yakes et al. |
| 2003/0182435 | A1 | 9/2003 | Redlich et al. |
| 2004/0024502 | A1 | 2/2004 | Squires et al. |
| 2004/0255123 | A1 | 12/2004 | Noyama et al. |
| 2004/0257208 | A1 | 12/2004 | Huang et al. |
| 2005/0031100 | A1 | 2/2005 | Iggulden et al. |
| 2005/0042999 | A1 | 2/2005 | Rappaport |
| 2005/0130744 | A1 | 6/2005 | Eck et al. |
| 2005/0149752 | A1 | 7/2005 | Johnson et al. |
| 2005/0153760 | A1 | 7/2005 | Varley |
| 2006/0042846 | A1 | 3/2006 | Kojori et al. |
| 2006/0047386 | A1 | 3/2006 | Kanevsky et al. |
| 2006/0125631 | A1 | 6/2006 | Sharony |
| 2006/0250272 | A1 | 11/2006 | Puamau |
| 2006/0274829 | A1 | 12/2006 | Siemens et al. |
| 2007/0015485 | A1 | 1/2007 | DeBiasio et al. |
| 2007/0057781 | A1 | 3/2007 | Breed |
| 2007/0103328 | A1 | 5/2007 | Lakshmanan et al. |
| 2007/0115101 | A1 | 5/2007 | Creekbaum et al. |
| 2007/0120697 | A1 | 5/2007 | Ayoub et al. |
| 2007/0156317 | A1 | 7/2007 | Breed |
| 2008/0051957 | A1 | 2/2008 | Breed et al. |
| 2008/0090522 | A1 | 4/2008 | Oyama |
| 2008/0129475 | A1 | 6/2008 | Breed et al. |
| 2008/0140278 | A1 | 6/2008 | Breed |
| 2008/0148374 | A1 | 6/2008 | Spaur et al. |
| 2008/0174451 | A1 | 7/2008 | Harrington et al. |
| 2008/0212215 | A1 | 9/2008 | Schofield et al. |
| 2008/0234919 | A1 | 9/2008 | Ritter et al. |
| 2008/0253613 | A1 | 10/2008 | Jones et al. |
| 2008/0305780 | A1 | 12/2008 | Williams et al. |
| 2009/0082951 | A1 | 3/2009 | Graessley |
| 2009/0180668 | A1 | 7/2009 | Jones et al. |
| 2009/0195370 | A1 | 8/2009 | Huffman et al. |
| 2009/0224931 | A1 | 9/2009 | Dietz et al. |
| 2009/0275321 | A1 | 11/2009 | Crowe |
| 2009/0278750 | A1 | 11/2009 | Man et al. |
| 2009/0278806 | A1 | 11/2009 | Duarte et al. |
| 2009/0279839 | A1 | 11/2009 | Nakamura et al. |
| 2010/0042498 | A1 | 2/2010 | Schalk |
| 2010/0090817 | A1 | 4/2010 | Yamaguchi et al. |
| 2010/0097239 | A1 | 4/2010 | Campbell et al. |
| 2010/0144284 | A1 | 6/2010 | Chutorash et al. |
| 2010/0202346 | A1 | 8/2010 | Sitzes et al. |
| 2010/0222939 | A1 | 9/2010 | Namburu et al. |
| 2010/0228404 | A1 | 9/2010 | Link et al. |
| 2010/0235042 | A1 | 9/2010 | Ying |
| 2010/0253493 | A1 | 10/2010 | Szczerba et al. |
| 2010/0295676 | A1 | 11/2010 | Khachaturov et al. |
| 2011/0021213 | A1 | 1/2011 | Carr |
| 2011/0021234 | A1 | 1/2011 | Tibbitts et al. |
| 2011/0035098 | A1 | 2/2011 | Goto et al. |
| 2011/0053506 | A1 | 3/2011 | Lemke et al. |
| 2011/0092159 | A1 | 4/2011 | Park et al. |
| 2011/0105097 | A1 | 5/2011 | Tadayon et al. |
| 2011/0106375 | A1 | 5/2011 | Gurusamy Sundaram |
| 2011/0112969 | A1 | 5/2011 | Zaid et al. |
| 2011/0117933 | A1 | 5/2011 | Andersson |
| 2011/0137520 | A1 | 6/2011 | Rector et al. |
| 2011/0195699 | A1 | 8/2011 | Tadayon et al. |
| 2011/0267204 | A1 | 11/2011 | Chuang et al. |
| 2012/0006610 | A1 | 1/2012 | Wallace et al. |
| 2012/0071097 | A1 | 3/2012 | Matsushita et al. |
| 2012/0081267 | A1 | 4/2012 | Sirpal et al. |
| 2012/0081311 | A1 | 4/2012 | Sirpal et al. |
| 2012/0084542 | A1 | 4/2012 | Reeves et al. |
| 2012/0084735 | A1 | 4/2012 | Sirpal |
| 2012/0084792 | A1 | 4/2012 | Benedek et al. |
| 2012/0089299 | A1 | 4/2012 | Breed |
| 2012/0109446 | A1 | 5/2012 | Yousefi et al. |
| 2012/0110356 | A1 | 5/2012 | Yousefi et al. |
| 2012/0115446 | A1 | 5/2012 | Gautama et al. |
| 2012/0116609 | A1 | 5/2012 | Jung et al. |
| 2012/0116678 | A1 | 5/2012 | Witmer |

(56) References Cited

U.S. PATENT DOCUMENTS

| | | |
|---|---|---|
| 2012/0149341 A1 | 6/2012 | Tadayon et al. |
| 2012/0173900 A1 | 7/2012 | Diab et al. |
| 2012/0173905 A1 | 7/2012 | Diab et al. |
| 2012/0238286 A1 | 9/2012 | Mallavarapu et al. |
| 2012/0242510 A1 | 9/2012 | Choi et al. |
| 2012/0259951 A1 | 10/2012 | Schalk et al. |
| 2012/0274459 A1 | 11/2012 | Jaisimha et al. |
| 2012/0284292 A1 | 11/2012 | Rechsteiner et al. |
| 2012/0289217 A1 | 11/2012 | Riemer et al. |
| 2012/0296567 A1 | 11/2012 | Breed |
| 2012/0313771 A1 | 12/2012 | Wittlitt, III |
| 2013/0035063 A1 | 2/2013 | Fisk et al. |
| 2013/0099940 A1 | 4/2013 | Protopapas |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Ricci |
| 2013/0157640 A1 | 6/2013 | Aycock |
| 2013/0158821 A1 | 6/2013 | Ricci |
| 2013/0166097 A1 | 6/2013 | Ricci |
| 2013/0167159 A1 | 6/2013 | Ricci et al. |
| 2013/0179689 A1 | 7/2013 | Matsumoto et al. |
| 2013/0190978 A1 | 7/2013 | Kato et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0212659 A1 | 8/2013 | Maher et al. |
| 2013/0218412 A1 | 8/2013 | Ricci |
| 2013/0219039 A1 | 8/2013 | Ricci |
| 2013/0227648 A1 | 8/2013 | Ricci |
| 2013/0231800 A1 | 9/2013 | Ricci |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0282238 A1 | 10/2013 | Ricci et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0295901 A1 | 11/2013 | Abramson et al. |
| 2013/0309977 A1 | 11/2013 | Heines et al. |
| 2014/0032014 A1 | 1/2014 | DeBiasio et al. |
| 2014/0066014 A1 | 3/2014 | Nicholson et al. |
| 2014/0088798 A1 | 3/2014 | Himmelstein |
| 2014/0120829 A1 | 5/2014 | Bhamidipati et al. |
| 2014/0125802 A1 | 5/2014 | Beckert et al. |
| 2014/0143839 A1 | 5/2014 | Ricci |

OTHER PUBLICATIONS

Notice of Allowance for U.S. Appl. No. 13/679,857, mailed Dec. 3, 2014 5 pages.
Notice of Allowance for U.S. Appl. No. 13/679,878, mailed Feb. 2, 2015 5 pages.
Official Action for U.S. Appl. No. 13/679,875, mailed Dec. 26, 2014 14 pages.
Official Action for U.S. Appl. No. 13/679,676, mailed Feb 25, 2015 14 pages.
Notice of Allowance for U.S. Appl. No. 13/679,441, mailed Oct. 29, 2014 5 pages.
Official Action for U.S. Appl. No. 13/679,864, mailed Nov. 3, 2014 9 pages.
Official Action for U.S. Appl. No. 13/679,476, mailed Jan. 16, 2015 23 pages.
Official Action for U.S. Appl. No. 13/828,513, mailed Dec. 24, 2014 7 pages.
Notice of Allowance for U.S. Appl. No. 13/828,651, mailed Feb. 2, 2015 10 pages.
Official Action for U.S. Appl. No. 13/828,758, mailed Feb. 12, 2015 10 pages.
Official Action for U.S. Appl. No. 13/828,860, mailed Feb. 27, 2015 16 pages.
Official Action for U.S. Appl. No. 13/828,960, mailed Jan. 5, 2015 15 pages.
Notice of Allowance for U.S. Appl. No. 13/829,505, mailed Nov. 26, 2014 8 pages.
Notice of Allowance for U.S. Appl. No. 13/829,718, mailed Nov. 21, 2014 5 pages.
Notice of Allowance for U.S. Appl. No. 13/830,003, mailed Nov. 21, 2014 7 pages.
Official Action for U.S. Appl. No. 13/830,133, mailed Oct. 29, 2014 31 pages.
Notice of Allowance for U.S. Appl. No. 13/830,133, mailed Mar. 3, 2015 5 pages.
Notice of Allowance for U.S. Appl. No. 13/679,887, mailed Nov. 13, 2014 5 pages.
"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.
"Audi A8 MMI Touch," Audi of America, Jan. 7, 2011, [retrieved on Apr. 16, 2014], 2 pages. Retrieved from: www.youtube.com/watch?v=O2nZ-WHo9IA.
"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).
U.S. Appl. No. 14/468,055, filed Aug. 25, 2014, Ricci.
"Time-triggered CAN," CIA, © 2001-2013, 4 pages, found at: (www.can-cia.org/index.php?id+166).
Davis et al. "Controller Area Network (CAN) schedulability analysis: Refuted, revisited and revised," Real-Time Systems, Apr. 2007, vol. 35, No. 3, pp. 239-272.
Di Natale "Controller Area Network," Dec. 2009, 54 pages.
Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.
Fonseca et al. "Scheduling for a TTCAN network with a stochastic optimization algorithm," Proceedings 8th Internatioanl CAN Conference, Jan. 2002, 7 pages.
Hartwich et al. "CAN Network with Time Triggered Communication," Robert Bosch GmbH Proceedings 7th International CAN Conference, Jul. 2000, 7 pages.
Idstein et al. "Using the Controller Area Network for Communication Between Prosthesis Sensors and Control Systems," Proceedings of the

(56) References Cited

OTHER PUBLICATIONS

2011 MyoElectric Controls/Powered Prostetics Symposium Fredericton, New Brunswick, Canada, Aug. 14-19, 2011, 4 pages.
Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).
Marturano "General Motors Takes a CUE from Customers," InContext, Nov. 8, 2011, 3 pages, found at: (incontextdesign.com/blog/general-motors-takes-a-cue-from-customers/).
Purcher "Apple Invents In-Vehicle Holistic ID for "iOS in the Car"," Patently Apple, Dec. 2013, 8 pages. [retrieved on Dec. 12, 2013 from: www.patentlyapple.com/patently-apple/2013/12/apple-invents-in-vehicle-holistic-id-for-ios-in-the-car.html].
International Search Report and Written Opinion for International (PCT) Patent Application No. PCT/US12/65510, mailed May 6, 2013 17 pages.
International Preliminary Report on Patentability for International (PCT) Patent Application No. PCT/US2012/065510, mailed May 30, 2014 14 pages.
International Search Report and Written Opinion for International (PCT) Patent Application No. PCT/US12/65613, mailed Feb. 15, 2013 9 pages.
International Preliminary Report on Patentability for International (PCT) Patent Application No. PCT/US2012/065613, mailed May 30, 2014 8 pages.
International Search Report and Written Opinion for International (PCT) Patent Application No. PCT/US2014/019983, mailed Aug. 18, 2014 10 pages.
International Search Report and Written Opinion for International (PCT) Patent Application No. PCT/US14/19216, mailed Jul. 25, 2014 8 pages.
International Search Report and Written Opinion for International (PCT) Patent Application No. PCT/US14/19209, mailed Apr. 25, 2014.
International Search Report and Written Opinion for International (PCT) Patent Application No. PCT/US14/19201, mailed Jul. 29, 2014 11 pages.
Official Action for U.S. Appl. No. 13/679,857, mailed Jun. 27, 2014 5 pages.
Official Action for U.S. Appl. No. 13/679,878, mailed Sep. 26, 2014 7 pages.
Official Action for U.S. Appl. No. 13/679,875, mailed Apr. 7, 2014 7 pages Restriction Requirement.
Official Action for U.S. Appl. No. 13/679,875, mailed Jul. 17, 2014 13 pages.
Official Action for U.S. Appl. No. 13/679,441, mailed Sep. 5, 2013 6 pages.
Official Action for U.S. Appl. No. 13/679,441, mailed Jan. 16, 2014 6 pages.
Official Action for U.S. Appl. No. 13/679,441, mailed May 9, 2014 6 pages.
Notice of Allowance for U.S. Appl. No. 13/679,441, mailed Jul. 22, 2014 5 pages.
Official Action for U.S. Appl. No. 13/679,864, mailed Aug. 21, 2014 5 pages Restriction Requirement.
Official Action for U.S. Appl. No. 13/679,476, mailed Oct. 11, 2013 13 pages.
Official Action for U.S. Appl. No. 13/679,476, mailed May 20, 2014 19 pages.
Official Action for U.S. Appl. No. 13/828,513, mailed May 6, 2014 7 pages.
Official Action for U.S. Appl. No. 13/828,513, mailed Sep. 4, 2014 5 pages.
Official Action for U.S. Appl. No. 13/828,651, mailed Jul. 29, 2014 17 pages.
Notice of Allowance for U.S. Appl. No. 13/829,157, mailed Jul. 25, 2014 14 pages.
Official Action for U.S. Appl. No. 13/829,505, mailed Jul. 23, 2014 7 pages.
Official Action for U.S. Appl. No. 13/829,718, mailed Apr. 10, 2014 7 pages.
Official Action for U.S. Appl. No. 13/829,718, mailed Jul. 25, 2014 8 pages.
Official Action for U.S. Appl. No. 13/830,003, mailed Apr. 15, 2014 9 pages.
Official Action for U.S. Appl. No. 13/830,003, mailed Jul. 25, 2014 9 pages.
Official Action for U.S. Appl. No. 13/830,133, mailed Jul. 10, 2014 9 pages.
Official Action for U.S. Patent Application No. 6583-315, mailed Jul. 9, 2013 10 pages.
Official Action for U.S. Appl. No. 13/678,773, mailed Dec. 30, 2013 9 pages.
Notice of Allowance for U.S. Appl. No. 13/678,773, mailed Apr. 2, 2014 5 pages.
Official Action for U.S. Appl. No. 13/679,887, mailed Jun. 30, 2014 6 pages.
Official Action for U.S. Appl. No. 13/679,476, mailed Jun. 4, 2015 25 pages.
Notice of Allowance for U.S. Appl. No. 13/828,513, mailed Apr. 3, 2015 5 pages.
Notice of Allowance for U.S. Appl. No. 13/828,960, mailed Jun. 5, 2015 10 pages.
Official Action for U.S. Appl. No. 13/829,605, mailed Jun. 4, 2015 12 pages.
Official Action for U.S. Appl. No. 13/829,799, mailed Jun. 3, 2015 9 pages.
Official Action for U.S. Appl. No. 13/829,058, mailed Jul. 16, 2015 11 pages.
Official Action for U.S. Appl. No. 13/829,862, mailed Jul. 16, 2015 9 pages.

* cited by examiner

ON BOARD VEHICLE INSTALLATION SUPERVISOR

CROSS REFERENCE TO RELATED APPLICATION

The present application is a continuation of U.S. patent application Ser. No. 13/829,157, filed Mar. 14, 2013, entitled "On Board Vehicle Installation Supervisor", which is a continuation-in-part of U.S. patent application Ser. No. 13/679,476, filed Nov. 16, 2012, entitled "Vehicle Middleware", which claims the benefits of U.S. Provisional Application Serial Nos. 61/560,509, filed Nov. 16, 2011; 61/637,164, filed Apr. 23, 2012; and 61/663,335, filed Jun. 22, 2012, all entitled "Complete Vehicle Ecosystem"; 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware"; and 61/715,699, filed Oct. 18, 2012, entitled "Vehicle Middleware"; each of which is incorporated herein by this reference in its entirety.

Cross reference is made to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,292, filed Nov. 16, 2012, entitled "Branding of Electrically Propelled Vehicles Via the Generation of Specific Operating Output"; Ser. No. 13/679,400, filed Nov. 16, 2012, entitled "Vehicle Climate Control"; Ser. No. 13/840,240, filed on Mar. 15, 2013, entitled "Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

FIELD

The disclosure relates generally to vehicle middleware systems and particularly to vehicle middleware systems for drivers and third-parties.

BACKGROUND

Modern vehicles use a number of communication systems and/or networks. Each of these communication systems and/or networks may have a bus structure that is open or proprietary. Each of these buses may also be specifically designed to work in a vehicle or may be available as a general communication protocol. These communication systems and/or networks connect the various individual components of the vehicles through their respective buses. Examples of proprietary vehicle bus architecture include Controller Area Network (CAN) Bus, Local Interconnect Network (LIN) Bus, and the various Original Equipment manufacturer (OEM) Bus among others. Examples of open and general bus architecture include wired or wireless Ethernet and Low-Voltage Differential Signaling (LVDS) among others.

Taking the CAN bus for example, the CAN bus is a serial network developed primarily for use with automotive applications. CAN bus allows devices and microcontrollers in a vehicle to communicate with each other without a host computer.

The CAN protocol allows various devices and microcontrollers to be connected to a single CAN bus. According to the protocol, communication along the CAN bus is message-based to allow messages and data to be sent from one connected device to another.

To facilitate communication on the CAN bus without the need of a host computer, CAN features an arbitration-free transmission mechanism. A CAN transmission includes an arbitration field (message ID) representing the priority of the message being transmitted. A dominant bit ('0') indicates a higher priority than a recessive bit ('1'). For example, in a hypothetical two-bit ID CAN network, a device sending a '10' ID will have priority over a device sending a '11' ID on the CAN bus. In this example, both devices have a recessive bit in the first bit; however, the first device has a dominant second bit which could be used to arbitrate against a recessive second bit in the second device. The second device will back-off from transmitting over the bus upon this determination in favor of the second device and will attempt to retransmit a few clock cycles after the first device has finished transmitting. It is recognized that each message ID transmitted must be unique over the CAN bus for this arbitration-free transmission mechanism. According to the CAN specification, standard CAN (version 2.0A) uses 11-bit IDs, and extended CAN (version 2.0B) uses 29-bit IDs.

The CAN specification (ISO 11898) further described two types of CAN buses, the high-speed CAN bus (ISO 11898-2) (such as for engine, suspension, and transmission controllers and safety equipment) and the low-speed CAN bus (ISO 11898-3) (such as for less critical components including non-safety sensors). The high-speed CAN bus is designed to carry data at high speed (up to 1 Mbit/s in some implementation). The low-speed CAN bus is designed to carry data at a lower speed (up to 125 Kbit/s in some implementation) but is more fault tolerant than the high-speed CAN bus. Further, the low-speed CAN bus can serves as a back-up for the high-speed CAN bus in case there is a failure to the high-speed CAN bus.

As usage of the CAN standard evolves, many vehicles and systems implementing CAN are using both a high-speed and a low-speed CAN bus in parallel. The high-speed CAN bus carries information that is vital for vehicle operation or safety and is delivered to various part of the vehicle or system in substantially real time. For example, the high-speed CAN bus would be used in a situation where an airbag deploys. When sensors in the bumper or at the front of the vehicle indicate that the vehicle has been involved in a frontal collision, the sensors can send priority information via the high-speed CAN bus to the airbag deployment unit to deploy the airbag. The low-speed CAN bus would be used for other less critical applications.

A number of extensions have been proposed and used to extend the capabilities of the various bus architectures. For example, On-Board Diagnostics (OBD) adds support for requesting data from vehicle components for diagnostics purposes using Parameter Identifiers (PIDs). While OBD is designed to work with CAN bus, OBD can be implemented to work with other general and/or OEM specific buses. Further, specific vehicle components such as the Engine Control Unit (ECU), Transmission Control Unit (TCU), Anti-lock Braking System (ABS), and generally Body Control Modules (BCMs) can have specific protocol extensions to work with the various bus architectures. Further, extensions to the bus architectures are needed to support carrying information regarding various environmental type issues such as emissions information to comply with various government regulation mandates.

Vehicles, particularly passenger vehicles, are evolving rapidly with emerging safety, entertainment, and communication technologies. Existing vehicle bus protocols, which are largely designed for safety, are generally unsuitable for other non-safety communications, due to low bus bandwidth and transmission speed. There are therefore various needs in the art including improving information flow between vehicle components, leveraging the various communication systems and/or networks in the art to enhance vehicle safety, data security, and/or data processing, and providing remote authorized third party (i.e. peace officers, vehicle manufacturers, vehicle security services, and owners) access to a vehicle's functions and state information while maintaining security against unauthorized parties and components.

SUMMARY

These and other needs are addressed by the various aspects, embodiments, and/or configurations of the present disclosure. The present disclosure is directed to a vehicle having a variety of networking and other capabilities.

The vehicle, in accordance with this disclosure, can include a microprocessor executable installation supervisor operable to determine, for a selected computational component to be installed in the vehicle, whether the selected computational component satisfies a requirement and/or restriction associated with the selected computational component, when installed, and, when the selected computational component can satisfy the requirement and/or restriction, create a set of data structures in the selected computational component and/or a computer readable medium on board the vehicle to bind the selected computational component to the vehicle, thereby preventing the selected computational component, after installation in the vehicle, from communicating openly with a processing module in a different vehicle.

A method, in accordance with this disclosure, can include the steps of:

(a) determining, for a selected computational component to be installed in a selected vehicle, whether the selected computational component satisfies a requirement and/or restriction associated with the selected computational component, when installed, and (b) when the selected computational component can satisfy the requirement and/or restriction, microprocessor executable installation supervisor creating a set of data structures in the selected computational component and/or a computer readable medium on board the selected vehicle to bind the selected computational component to the selected vehicle, thereby restricting the ability of the selected computational component, after installation in the selected vehicle, to communicate with a processing module in a different vehicle when compared to the ability of the selected computational component, after installation in the selected vehicle, to communicate with a processing module in the selected vehicle.

A non-transient, tangible computer readable medium, in accordance with this disclosure, can include a microprocessor executable installation supervisor on board a vehicle that, when executed:

(a) determines, for the selected computational component to be installed in a selected vehicle, whether the selected computational component satisfies a requirement and/or restriction associated with the selected computational component, when installed, and (b) when the selected computational component can satisfy the requirement and/or restriction, creates a set of data structures in the selected computational component and/or a computer readable medium on board the selected vehicle to bind the selected computational component to the selected vehicle, thereby prohibiting the selected computational component, after installation in the selected vehicle, from communicating restricted vehicle information to a processing module in a different vehicle.

The selected computational component can be one or more of hardware and/or software.

The selected computational component can be one or more of an on-board sensor, processing module, software application, circuit board, expansion module, critical device, non-critical device, and cellular upgrade module.

The selected computational component can be one or more of an on board sensor, a media controller, a gateway, a firewall, a processing module, a network controller, an input/output system, a display controller, an audio controller, an arbitration module, a health check module, a critical system controller, a non-critical system controller, an on board sensor monitor, a displayed object movement module, a diagnostic module, a media filter, a network selector, a remote control module, a computational module selector, an expansion module, an application, and a plug-in module.

The selected computational component can monitor, control, operate, and/or be one or more of an engine and/or power control unit, transmission control unit (TCU), a door setting, a window setting, a blind spot monitor, an airbag deployment control unit, a collision sensor, a nearby object sensing system, a seat belt control unit, a sensor for a seat belt setting, a power source controller, an energy output sensor, an engine temperature sensor, oil pressure, hydraulic pressure, a headlight, an emergency light, a brake light, a parking light, a fog light, an interior and/or passenger compartment light, a tail light, a vehicle control system sensor, a wireless network, a cellular data sensor, a steering sensor, a torque sensor, an engine, power steering, a display panel, switch state control unit, and a brake control unit.

The selected computational component can monitor, control, operate, and/or be one or more of an emissions system, a seating system controller and/or sensor, an entertainment system, monitoring an ambient (outdoor) weather sensor, an odometer reading sensor, a trip mileage reading sensor, a road condition sensor, a radar transmitter/receiver output, a brake wear sensor, an oxygen sensor, an ambient lighting sensor, a vision system sensor, a ranging sensor, a parking sensor, a heating, venting, and air conditioning (HVAC) system and/or sensor, a water sensor, a air-fuel ratio meter, a hall effect sensor, a microphone, a radio frequency (RF) sensor, and/or an infrared (IR) sensor.

The installation supervisor can be operable to perform or perform a plurality of:

(a) detect an installation attempt of the selected computational component on board the vehicle, (b) in response, determine a characteristic of the selected computational component, (c) determine whether the selected computational component is linked with another vehicle, and (d) determine whether the installation of the selected computational component is in compliance with a license restriction and/or requirement.

The vehicle described in the present disclosure can provide a number of advantages. For example, the vehicle can provide for improved control of data stream management and integration to accommodate the ever-increasing sophistication of each data segment and enable data sharing amongst all segments. It can enable interoperability amongst diverse systems. It can provide an open architecture, thereby obviating existing constraints on design changes due to locked-in technology. It can enable drivers freely and conveniently to integrate his or her digital lifestyle into a vehicle while enabling voice and fingertip activation. It can implement a dynamic software environment and on board vehicle network that does not need to change over technology generations. Car manufacturers can have the freedom to specify any type of processor, memory or storage technology and to make appropriate changes at any time. The architecture can integrate presentation functions, sensor/control functions and infotainment functions in a highly modular extensible way ensuring that the system design can scale up or down easily and evolve over many model years without battling technological obsolescence. For example, the architecture can allow the vehicle owner and/or manufacturer to upgrade and/or add application engines, upgrade the in-vehicle networking capabilities, upgrade Internet connectivity, upgrade display capabilities, and migrate to high availability capabilities, all without radical changes to the software environment and/or for inter- and intra-model line differentiation. The vehicle can support multiple processing and expansion modules that anchor specific functions to a selected processor. It can support a variety of embedded Electronic Control Unit ("ECU") data sources, such as those provided by LIN, CAN, and FlexRay, and IPv6 connectivity that enables seamless migration to Ethernet-based sensor technology and new bus architectures supported by the AutoStar initiative. It can employ a single data management hub, providing improved vehicle safety in the face of security threats posed by connectivity to the Ethernet. It can enable vehicle manufacturers to manage multiple display subsystems that are unique to the subsystem location in the vehicle and deliver vehicle occupants a personalized experience. The subsystems can include, for example, a console display (providing information and input/output control), a configurable dashboard display, a configurable heads-up display, and passenger display units. Configurable displays allow drivers to add/change gauges for non-vehicle operation information that is displayed on the dashboard and heads-up display to suit user preferences and needs. Direct video can be delivered through display controllers and/or an interactive touch screen, optionally equipped with proximity sensors, all implemented with Ethernet-based intelligent display subsystems. Handheld devices, such as personal digital assistants, cellular phones, and tablet and laptop computers, can interface wirelessly, via one or more tethered networks, with the vehicle's processing module(s) and be integrated into the processing resources available to perform vehicle-related tasks, operations, and functions. Assignment of an IPv6 address or other electronic address on a network to the vehicle can provide an address to locate the vehicle on the Internet (or other network), simplify implementing cyber security, enable applications that support safety and data collection for predictive analytics, enable voice-over-IP calls from the vehicle, and furnish reliable presence information to a presence service or server.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "automotive navigation system" is a satellite navigation system designed for use in automobiles. It typically uses a GPS navigation device to acquire position data to locate the user on a road in the unit's map database. Using the road database, the unit can give directions to other locations along roads also in its database. Dead reckoning using distance data from sensors attached to the drivetrain, a gyroscope and an accelerometer can be used for greater reliability, as GPS signal loss and/or multipath can occur due to urban canyons or tunnels.

The term "bus" and variations thereof, as used herein, refers to a subsystem that transfers information and/or data between various components. A bus generally refers to the collection communication hardware interface, interconnects, bus architecture, and/or protocol defining the communication scheme for a communication system and/or communication network. A bus may also be specifically refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication channel" refers to an analog and/or digital physical transmission medium such as cable (twisted-pair wire, cable, and fiber-optic cable) and/or other wireline transmission medium, and/or a logical and/or virtual connection over a multiplexed medium, such microwave, satellite, radio, infrared, or other wireless transmission medium. A channel is used to convey an information signal, for example a digital bit stream, from one or several senders (or transmitters) to one or several receivers. A channel has a certain capacity for transmitting information, often measured by its bandwidth in Hz or its data rate in bits per second. Channel performance measures that can be employed in determining a quality or grade of service of a selected channel include spectral bandwidth in Hertz, symbol rate in baud, pulses/s or symbols/s, digital bandwidth bit/s measures (e.g., gross bit rate (signaling rate), net bit rate (information rate), channel capacity, and maximum throughput), channel utilization, link spectral efficiency, signal-to-noise ratio measures (e.g., signal-to-interference ratio, $E_b/N_o$, and carrier-to-interference ratio in decibel), bit-error rate (BER), packet-error rate (PER), latency in seconds, propagation time, transmission time, and delay jitter.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

A "communication modality" refers to a protocol- or standard defined or specific communication session or interaction, such as Voice-Over-Internet-Protocol ("VoIP"), cellular communications (e.g., IS-95, 1G, 2G, 3G, 3.5G, 4G, 4G/IMT-Advanced standards, 3GPP, WIMAX™, GSM, CDMA, CDMA2000, EDGE, 1xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "dash" and "dashboard" and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The terms "determine", "calculate" and "compute," and variations thereof, as used herein, are used interchangeably and include any type of methodology, process, mathematical operation or technique.

The term "display" refers to a portion of a screen used to display the output of a computer to a user.

The term "displayed image" or "displayed object" refers to an image produced on the display. A typical displayed image is a window or desktop or portion thereof, such as an icon. The displayed image may occupy all or a portion of the display.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "means" as used therein shall be given its broadest possible interpretation in accordance with 35 U.S.C., Section 112, Paragraph 6. Accordingly, a claim incorporating the teen "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chat rooms and forums that use voice, video text or avatars.

The term "presence" is a status indicator that conveys ability and willingness of a potential communication partner—for example a user—to communicate. A user's client provides presence information (presence state) via a network connection to a presence service, which is stored in what constitutes his personal availability record (called a presentity) and can be made available for distribution to other users (called watchers) to convey his availability for communication. Presence information has wide application in many communication services and is one of the innovations driving the popularity of instant messaging or recent implementations of voice over IP clients. A user client may publish a presence state to indicate its current communication status. This published state informs others that wish to contact the user of his availability and willingness to communicate. The most common use of presence today is to display an indicator icon on instant messaging clients, typically from a choice of graphic symbols with easy-to-convey meanings, and a list of corresponding text descriptions of each of the states. Even when technically not the same, the "on-hook" or "off-hook" state of called telephone is an analogy, as long as the caller receives a distinctive tone indicating unavailability or availability.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

The term "vehicle" refers to a device or structure for transporting animate and/or inanimate or tangible objects (e.g., persons and/or things), such as a self-propelled conveyance. The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, aircraft, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Overview

Figure 1:
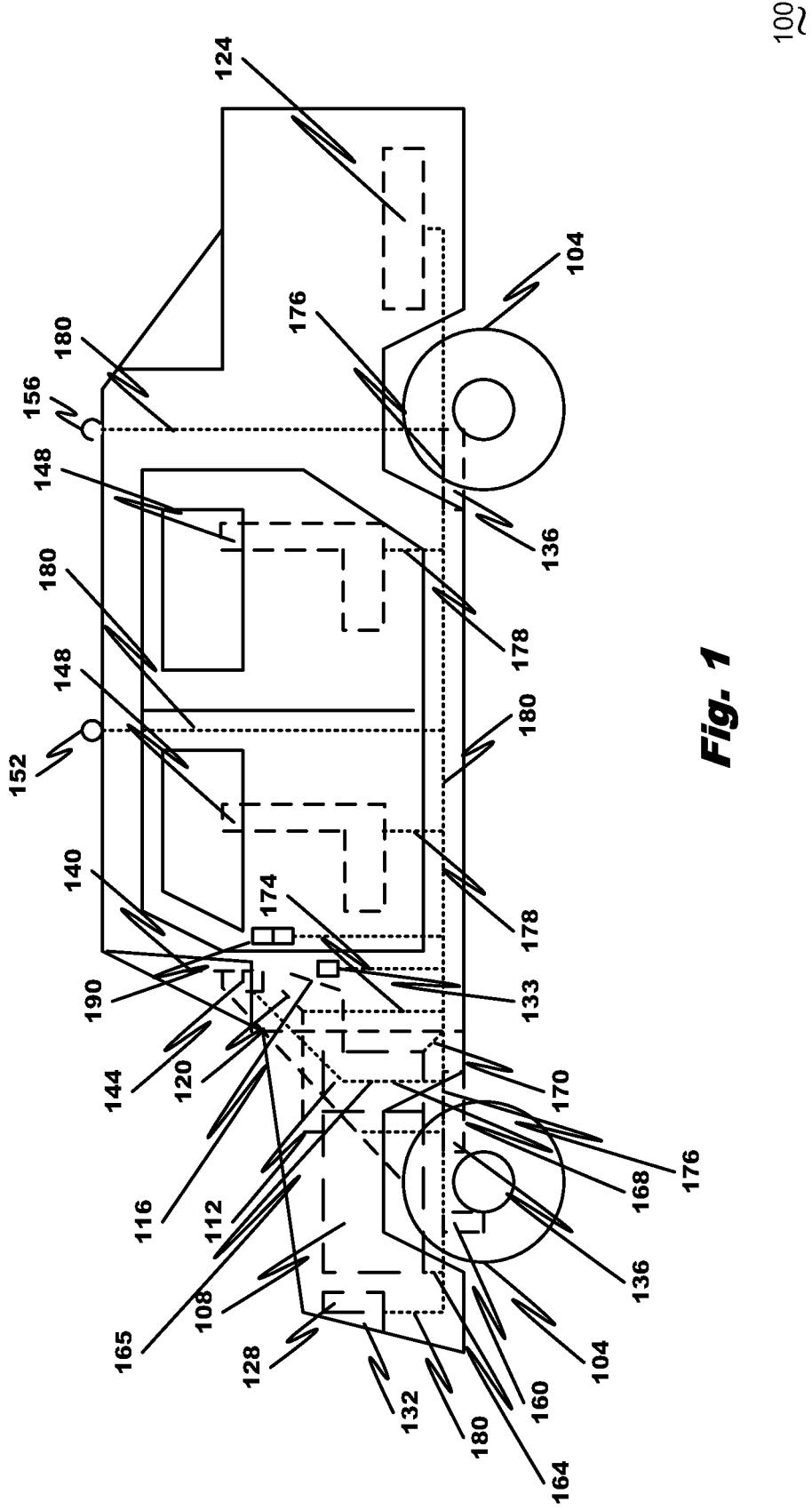
FIG. 1 depicts a vehicle configured in accordance with an embodiment.

The present disclosure describes a vehicle implementing one or more processing modules. These modules are configured to connect and interface with the various buses in the vehicle, where the various buses are connected with the various components of the vehicle to facilitate information transfer among the vehicle components. Each processing module is further modularized with the ability to add and replace other functional modules now or in the future. These functional modules can themselves act as distinct vehicle components. Each processing module may hand-off processing to other modules depending on its health, processing load, or by third-party control. Thus, the plurality of processing modules help to implement a middleware point of control to the vehicle with redundancy in processing and safety and security awareness in their applications.

Exemplary processing modules include one or more of:

(a) an active-active or active-standby duplicated processing module configurations in fully or partially wirelessly networked vehicles;

(b) an arbitration module to handle hand-off conflicts in duplicated processing module configurations;

(c) a health check module which checks critical and non-critical tasks, functions, and operations of each processing module to determine which to designate as the active or primary processing module;

(d) a displayed object movement module to move displayed objects from a source input/output system to a target or destination input/output system;

(e) a media filter which filters and/or processes (e.g., formats, configures, changes a presentation mode of, and/or otherwise causes at least part of the signal to be altered from the signal as received) third party sourced signals, particularly multimedia signals, in a manner consistent with a vehicle universal or occupant-specific whitelist, blacklist, or other user preference, sensed occupant context, and/or a governing federal, state, provincial, and/or local law or regulation;

(f) in a vehicle equipped with an internal wireless network and optionally bus-type network, a network selector which selects a network for signal transmission based on network/node status, signal/noise ratio, type of signal, available and/or unavailable bandwidth, network performance parameter(s) (e.g., availability, packet drop or loss, jitter, latency, buffer capacity, throughput, and the like) quality of service, and/or other parameters and configures the signal for transmission over the selected network;

(g) a diagnostic module handles warning/error signals in a predetermined manner;

(h) a remote control module which receives a request from a remote source or third party to command a vehicle function (which function may be identified by a suitable function-specific code), authenticates the requestor, and if successfully authenticated and if privileged to request the performance of the vehicle function, executes the request notwithstanding a contrary command from the vehicle operator;

(i) a media controller, which receives a media stream from a remote node, identifies which input/output systems are disabled (and/or restricted) due to operator command and/or as a result of governing law, and provides the media stream to an input/output system associated with the associated occupant;

(j) an installation supervisor which, for a newly installed software and/or hardware and/or other device (such as an on-board sensor, processing module or component thereof, software application, circuit board, expansion module or component thereof (which expansion module may be hardware, software, or a combination thereof), critical or non-critical device (such as those discussed above with respect to the critical or non-critical system controller(s)), cellular upgrade module (e.g., 2G, 3G, 4G, 5G, LTE, or other cellular standard upgrade or Subscriber Identity Module ("SIM") card, board, or other upgrade module, and the like), determines whether the newly installed component satisfies defined functional and/or source or reuse requirements and/or restrictions for the component, license restrictions, and other criteria, and, if satisfied, creates data structures in the component (if it has a resident memory) and the vehicle memory to bind the component to the current vehicle;

(k) a computational module selector to perform processing load balancing over multiple processing modules;

(l) network security which isolates a component encountering a security breach event and/or isolates the primary processing module from other components in the local network if the former is not possible;

(m) a "cone of silence" capability by the media controller for external computational devices;

(n) an automated caching, potentially by individual input/output systems, by the media controller of media based on various factors;

(o) a presence reporting module considering local laws in determining whether an individual is present (e.g., for unified communications) and, if so, by what communication channel(s) and/or modalities; and (p) a networking module to enable processing modules of different vehicles to wirelessly connect for to exchange vehicle information.

The Vehicle

Figure 3:
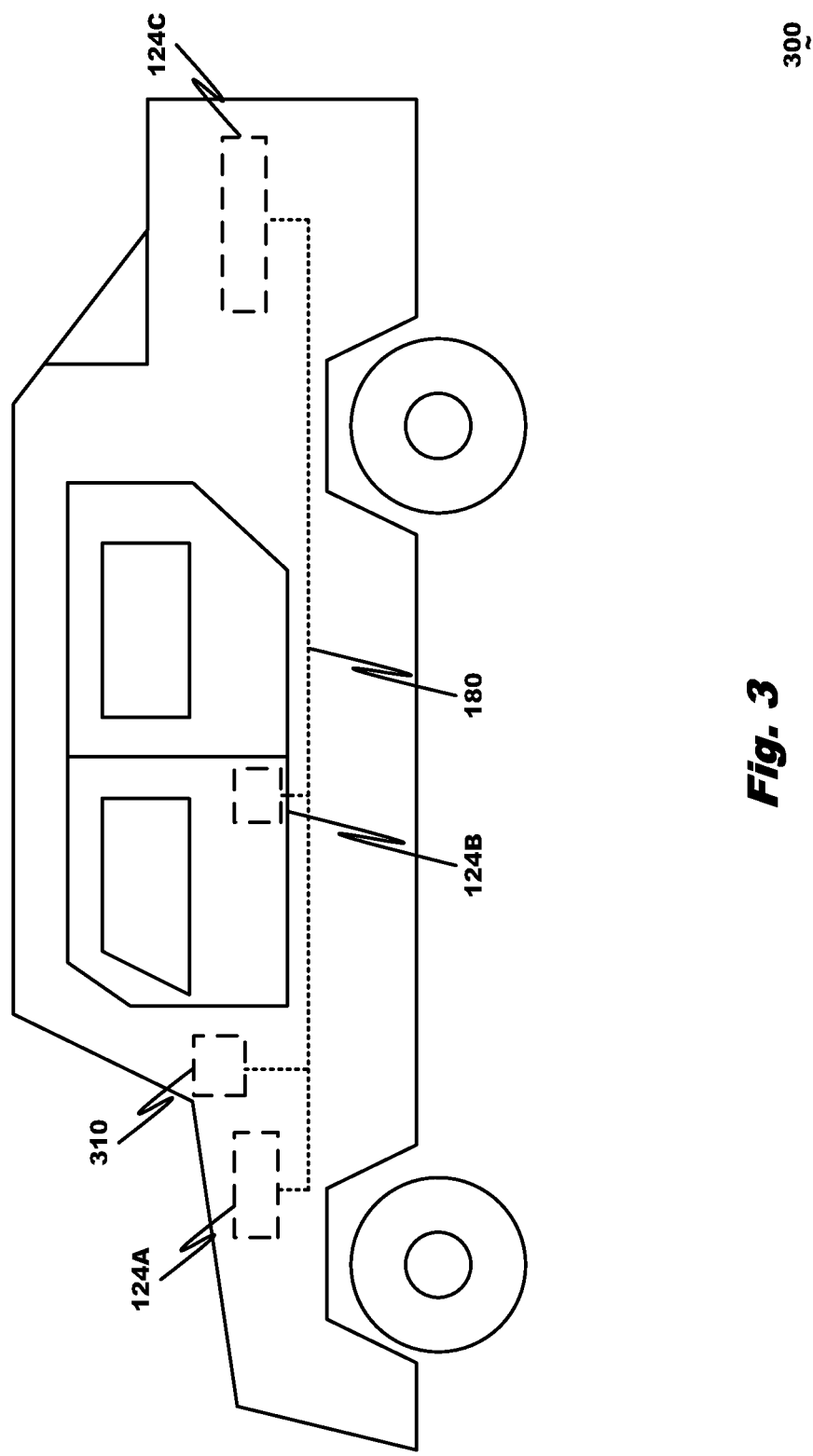
FIG. 3 depicts a vehicle implementing processing modules configured in according with an embodiment.
Figure 15:
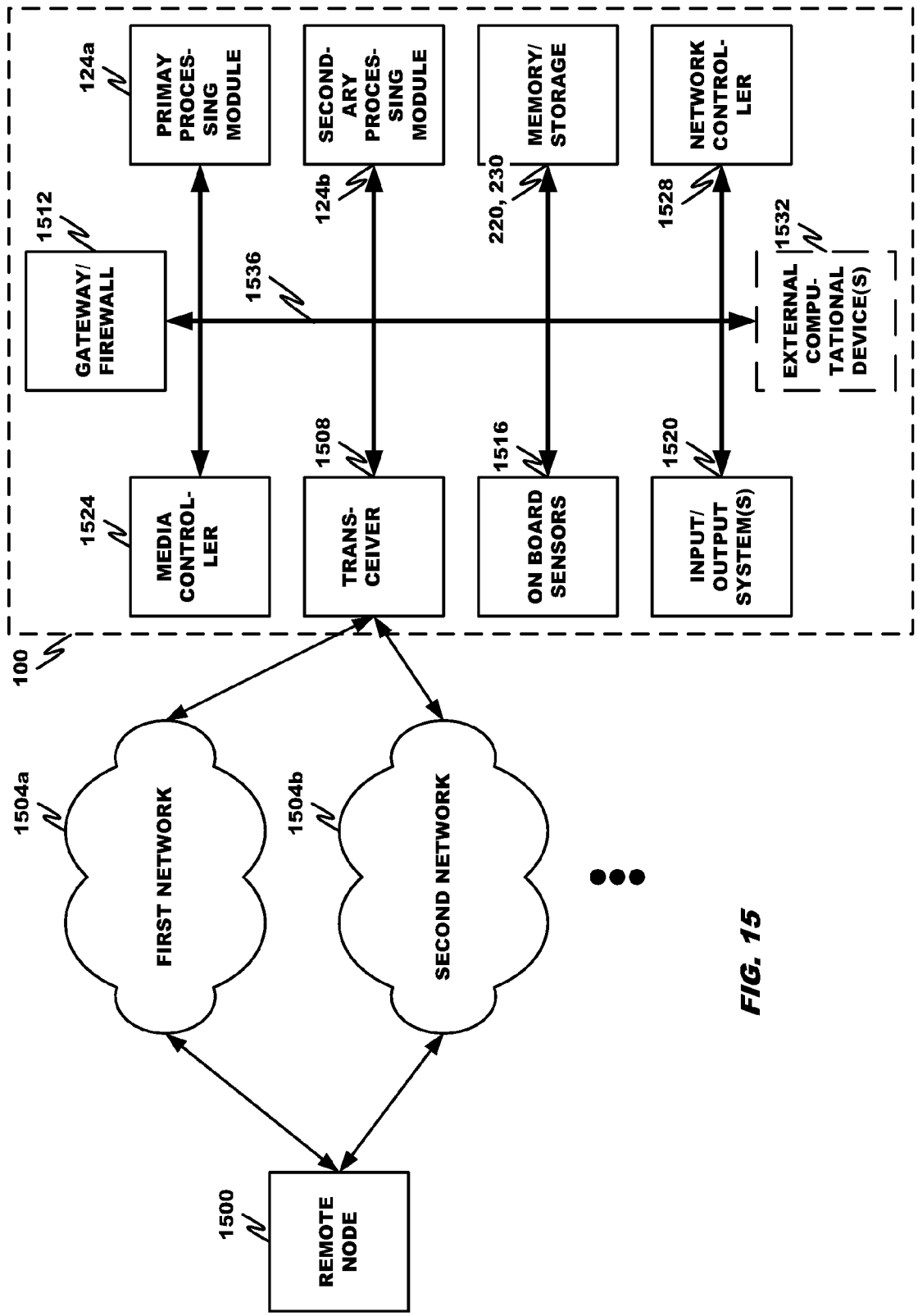
FIG. 15 is a block diagram of a computational system according to an embodiment.

FIGS. 1, 3, and 15 collectively illustrate a vehicle 100 incorporating various features.

Referring to FIG. 1, the vehicle 100 includes, among many components common to vehicles, wheels 104, a power source 108 (such as an engine, motor, or energy storage system (e.g., battery or capacitive energy storage system)), a manual or automatic transmission 112, a manual or automatic transmission gear controller 116, a power controller 120 (such as a throttle), a braking system 136, a steering wheel 140, a display panel 144 (e.g., a dashboard displaying information regarding components in vehicle 100), and an occupant seating system 148.

Other components in vehicle 100 include communication components such as a wireless signal receiver 152 to receive wireless signals from signal sources such as roadside beacons and other electronic roadside devices, and a satellite positioning system receiver 156 (e.g., a Global Positioning System ("GPS") (US), GLONASS (Russia), Galileo positioning system (EU), Compass navigation system (China), and Regional Navigational Satellite System (India) receiver).

The vehicle 100 also includes a number of control units and sensors for the various components of vehicle 100. Exemplary control units and sensors therefore include wheel state sensor 160 to sense one or more of vehicle speed, acceleration, deceleration, wheel rotation, wheel speed (e.g., wheel revolutions-per-minute), wheel slip, and the like. Power source controller and energy output sensor 164 controls the power source and to senses a power output of the power source 108. Example aspects of power source controller and energy output sensor 165 include balancing the mixture of fuel (e.g. gasoline, natural gas, or other sources of fuel) and other elements (e.g. air for combustion) and measuring one or more of current engine speed (e.g., revolutions-per-minute), energy input and/or output (e.g., voltage, current, fuel consumption, and torque), and the like. Switch state control unit 168 activates or deactivates the power source (e.g. the ignition). Transmission control unit ("TCU") 170 sets the current state the transmission (e.g., gear selection or setting) based on the state of gear controller 116. Power control unit 174 sets the throttle for power source 108 given the state of power controller 120. Brake control unit 176 operates the current state (braking or non-braking) of braking system 136 based on the state of the brake controller (which could be linked to power controller 120).

Vehicle 100 also includes other control units and sensors for safety purposes. An airbag deployment system includes an airbag deployment control unit 133 and a collision sensor 132. When a collision is detected by collision sensor 132, data is sent to airbag release control unit 133 which determines whether to deploy the airbag based on the data received (e.g., the speed of the collision and the area of impact to determine whether an airbag deployment can promote safety). Other safety components include seat belt control unit and sensors for setting the seat belt (e.g. engaging or disengaging the seat belt during hard breaking), head light control unit and sensors for headlight 128 and other lights (e.g. emergency light, brake light, parking light, fog light, interior or passenger compartment light, and/or tail light state (on or off)), door settings (locking and unlocking), window settings (opening or closing), one or cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, and other components and sensors as known in the art.

Vehicle 100 further includes components for the convenience and enjoyment of the occupants or operators. Seating system controller and sensor 178 sets the position and other settings of a seat and measure various attributes of an occupant of the seat (e.g., the current weight of seated occupant) in a selected seat of the seating system 148. Entertainment system 190, preferably located in the head unit of the passenger compartment, provides entertainment options such as music or video for occupants of vehicle 100.

Examples of other vehicle components include one or more cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, odometer reading sensor, trip mileage reading sensor, wind speed sensor, radar transmitter/receiver output, brake wear sensor, steering/torque sensor, oxygen sensor, ambient lighting sensor, vision system sensor, ranging sensor, parking sensor, heating, venting, and air conditioning (HVAC) sensor, water sensor, air-fuel ratio meter, blind spot monitor, hall effect sensor, microphone, radio frequency (RF) sensor, infrared (IR) sensor, vehicle control system sensors, wireless network sensor (e.g., Wi-Fi and/or Bluetooth sensor), cellular data sensor, and other sensors known to those of skill in the vehicle art.

Vehicle 100 includes one or more vehicle buses 180 for connecting the various components and systems of vehicle 100 as described above. In modern vehicles, subsystems such as an anti-lock braking system (ABS), which may be used by brake control unit 176 and braking system 136, engine control unit (ECU), which may be used by power source control 164, transmission control unit (TCU), which may be used by transmission control unit 170 and gear controller 116, and supplemental restraint system (SRS), such as airbag deployment control unit 133 and collision sensor 132 and seating system controller and sensor 178, are frequently interconnected using a standardized bus. Standardized buses for use in vehicles include Controller Area Network (CAN), and Local Interconnect Network (LIN) and others, as are known in the art. In particular, these components and subsystems may use the high-speed CAN bus for real-time information. Other components with lower priorities may use the low-speed CAN bus to transmit information. Vehicle bus 180 (which is optional) is illustrated as one bus in FIG. 1. However, vehicle 100 may include one or more of these standardized buses, such as a combination of the high-speed and low-speed CAN, LIN, and/or other buses. Also, vehicle bus 180 may further include and support extensions to standardized buses, such as the FlexCAN extension to the CAN bus. Further, vehicle bus 180 may include standardized communication networks that can be implemented vehicle 100. Well known networks include Ethernet, Wi-Fi, USB, I²C, RS232, RS485 and FireWire.

Vehicle 100 also includes processing module 124. Preferably, processing module 124 is placed in the trunk, hood (not shown), behind the head unit (not shown), and/or other accessible but unseen locations. Processing module 124 is coupled to vehicle bus 180 and provides processing for data related to vehicle bus 180 and other vehicle components.

Processing modules, for example, can perform, monitor, and/or control critical and non-critical tasks, functions, and operations, such as interaction with and/or monitoring and/or control of critical and non-critical on board sensors and vehicle operations (e.g., engine, transmission, throttle, brake power assist/brake lock-up, electronic suspension, traction and stability control, parallel parking assistance, occupant protection systems, power steering assistance, self-diagnostics, event data recorders, steer-by-wire and/or brake-by-wire operations, vehicle-to-vehicle interactions, vehicle-to-infrastructure interactions, partial and/or full automation, telematics, navigation/SPS, multimedia systems, audio systems, rear seat entertainment systems, game consoles, tuners (SDR), heads-up display, night vision, lane departure warning, adaptive cruise control, adaptive headlights, collision warning, blind spot sensors, park/reverse assistance, tire pressure monitoring, traffic signal recognition, vehicle tracking (e.g., LoJack™), dashboard/instrument cluster, lights, seats, climate control, voice recognition, remote keyless entry, security alarm systems, and wiper/window control). Processing modules can be enclosed in an advanced EMI-shielded enclosure containing multiple expansion modules. Processing modules can have a "black box" or flight data recorder technology, containing an event (or driving history) recorder (containing operational information collected from vehicle on board sensors and provided by nearby or roadside signal transmitters), a crash survivable memory unit, an integrated controller and circuitry board, and network interfaces. Processing module 124 is further disclosed with reference to FIG. 2.

As set forth below and as shown in FIG. 3, multiple processing modules 124a-c may be located at various locations in a common vehicle. The disparate, spaced apart locations of the processing modules 124a-c provide redundancy in the event of a collision or other catastrophic event. For example, a collision with the rear of the vehicle 100 may damage the processing module 124c but not the processing modules 124a,b.

As will be appreciated, the multiple processing modules 124a-c may be configured to operate in an active/active and/or active/standby mode. These operating modes describe the manner in which first and second (redundant) devices operate under normal conditions. In active/standby implementations, only the primary device in a pair processes information and issues commands. The standby device sits idle, ready to assume the active role should the primary device fail. The standby device may receive, from the primary device, processing, command, and primary device state information to facilitate stateful failover, but it does not itself commonly perform meaningful work until the primary device fails. In active/active implementations, both devices are online and collaboratively process information and issue commands under normal conditions. When one device fails, all processing is handled by the remaining device.

A user can be an occupant of a vehicle 100 that implements the system of FIG. 1. A user can further be an assembler, technician, or mechanic working on the vehicle to configure the system of FIG. 1 for use by an end-user of the vehicle.

Figure 2:
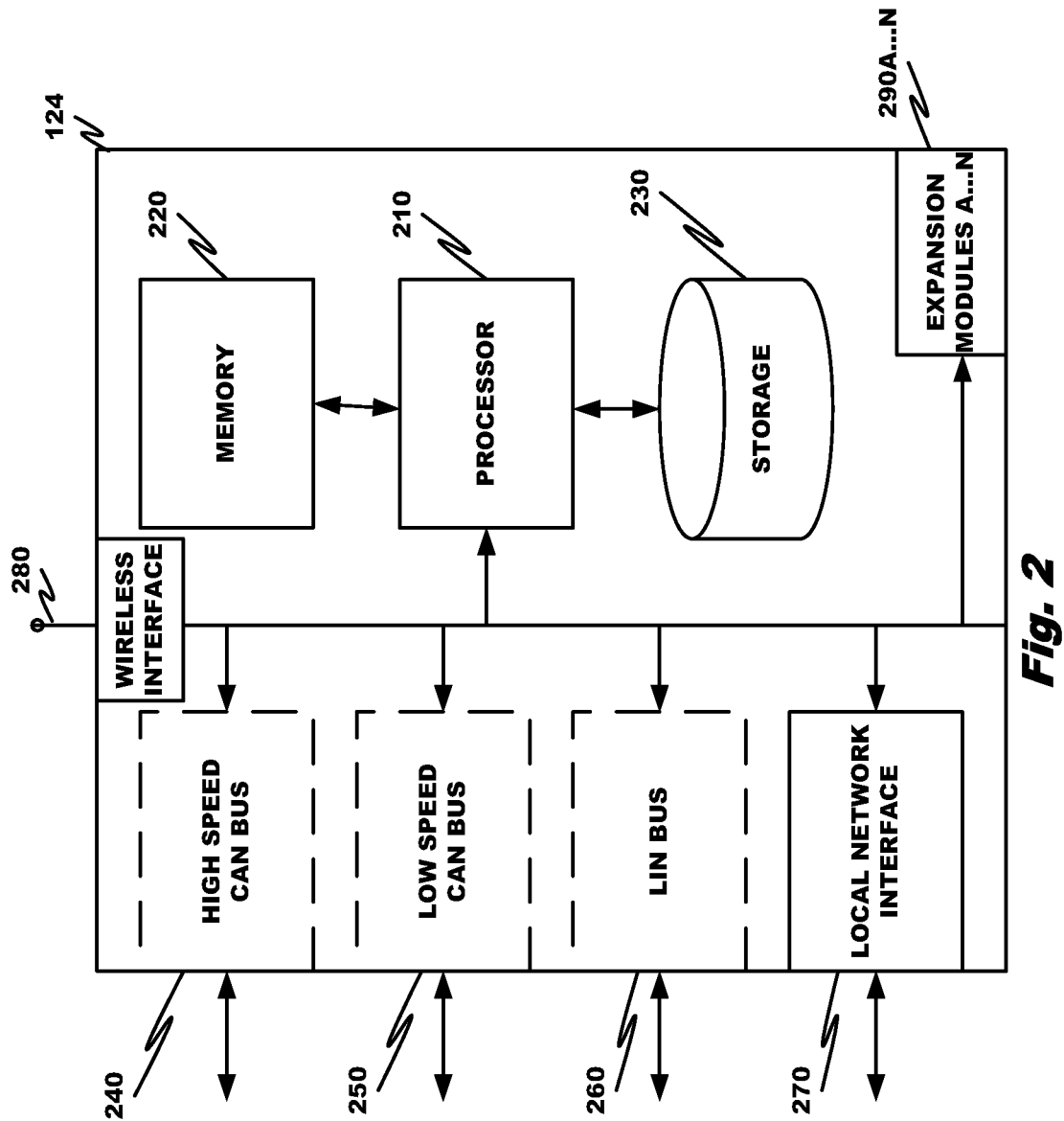
FIG. 2 is a block diagram of a processing module according to an embodiment.

FIG. 2 illustrates an exemplary block diagram for a (primary and/or secondary) processing module 124a-c.

Processing module 124 may include processor 210, memory 220, storage 230, and interfaces for one or more buses 240-270. Among the interfaces 240-270 include high-speed CAN bus 240, low-speed CAN bus 250, LIN bus 260, network interface 270, and/or wireless interface 280. One skilled in the art will recognize that processing module 124 may take other configurations and with other buses as known in the art, and interfaces 240-290 may be implemented with more or fewer buses than those shown.

The operations of processing module 124 will now be described with respect to the high-speed CAN bus interface 240 and low-speed CAN bus interface 250 as an exemplary configuration in one embodiment of the invention. In one implementation, processing module 124 receives data transmitted over vehicle bus 180 through high-speed CAN bus interface 240 and/or low-speed CAN bus interface 250. Data transmitted over the high-speed CAN bus includes priority data from subsystems such as anti-lock braking system (ABS), which may be used by brake control unit 176 and braking system 136, engine control unit (ECU), which may be used by power source control 164, transmission control unit (TCU), which may be used by transmission control unit 170 and gear controller 116, and supplemental restraint system (SRS), such as airbag deployment control unit 133 and collision sensor 132 and seating system controller and sensor 178, as described above. Data transmitted over the low-speed CAN bus includes other noncritical data, such as engine temperature and oil pressure sensor readings.

Wireless interface 280, by contrast, can be a transceiver for one or more long, intermediate, or short range wireless networks, such as a radio (e.g., cellular such as CDMA, GSM, or IS-95 network), 802.X, a WiFi™ network, a Bluetooth™ network, and the like, sending and receiving a wide variety of information, including lower priority information, such as data for the convenience and enjoyment of the occupants in entertainment system 190 or seating system 148. The wireless interface 280 can access information over one or more wireless networks using an appropriate protocol, such as the Wireless Application Protocol, Wireless Internet Protocol, Wireless Session Protocol, Bluetooth Wireless Protocol, Wireless Datagram Protocol, Wireless HART Protocol, Wired Equivalent Privacy (WEP), MiWi and MiWi P2P, RuBee (IEEE standard 1902.1), Wireless USB, Wireless Transport Layer Security (WTLS), and the like. In one vehicle configuration, the wireless interface 280 connects, via a short distance protocol such as Bluetooth™ or WiFi™, to an external computational device, such as a cell phone, personal digital assistant, laptop, personal computer, or tablet computer, for access to remote nodes over the Internet.

Local network interface 270 is a transceiver for signals exchanged with other on board components of the vehicle (including the components discussed above with respect to FIG. 1). The signals may be sent over a wired or wireless (or combination thereof) network. In one configuration, the local network interface is a wireless access point. Any suitable local area network protocol may be used, with the Ethernet protocol and the short-range protocols mentioned above being examples.

The processor 210 may comprise a general purpose programmable (micro) processor or controller for executing application programming or instructions. In accordance with at least some embodiments, the processor 210 may include multiple processor cores, and/or implement multiple virtual processors. In accordance with still other embodiments, the processor 210 may include multiple physical processors. As a particular example, the processor 304 may comprise a specially configured application specific integrated circuit (ASIC) or other integrated circuit, a digital signal processor, a controller, a hardwired electronic or logic circuit, a programmable logic device or gate array, a special purpose computer, or the like. The processor 210 generally functions to run programming code or instructions implementing various functions of the device 200.

Memory 220 for use in connection with the execution of application programming or instructions by the processor 210, and for the temporary or long term storage of program instructions and/or data. As examples, the memory 220 may comprise RAM, DRAM, SDRAM, or other solid state memory. Alternatively or in addition, data storage 230 may be provided. Like the memory 220, the data storage 230 may comprise a solid state memory device or devices. Alternatively or in addition, the data storage 230 may comprise a hard disk drive or other random access memory.

FIG. 3 depicts a vehicle 300 with multiple processing modules according to an embodiment. Vehicle 300 includes bus 180, vehicle component 310, and processing modules 124A-C.

Vehicle component 310 is an exemplary vehicle component for illustration purposes that is connected to bus 380. Vehicle component 310 may represent any of the vehicle components discussed in connection with vehicle 100 (FIG. 1).

Each of the processing modules 124A-C is coupled to bus 180. Processing module 124A is located in the engine compartment of vehicle 300; processing module 124B is located in the passenger compartment of vehicle 300; and processing module 124C is located in the truck of vehicle 300.

In one configuration, some of the processing modules 124A-C may have limited processing functions as compared to the others. For example, processing module 124A may act as the default processing module for vehicle 300 normally because of its location being close to most critical vehicle components in the engine compartment (i.e., ECU, TCU). If the other processing modules 124B-C are only needed for redundancy, they may be implemented to only have limited capabilities (i.e., these processing modules would not be require to have processing all critical and non-critical functions). This implementation has the advantage of reduced costs and/or space as compared to fitting processing module will full capabilities. The processing modules 124A-C may also have cascading levels of capabilities. For example, processing module 124B is fitted in the passenger compartment and is deemed to most likely survive a collision; it may be required to have capabilities critical to vehicle operation but no other capabilities to save space in the passenger compartment. Processing module 124C may have additional capabilities such as a cellular module so that emergency calls may be automatically placed if the default processing module 124A fails.

In another configuration, each of the processing modules 124A-C may have different capabilities. For example, processing module 124A may have capabilities only for critical vehicle functions; processing module 124C may have capabilities only for non-critical vehicle functions; and processing module 124B may be reserved for back-up processing of both critical and non-critical vehicle functions. In one implementation, processing may be off-loaded to another processing module if one module becomes overloaded. This configuration has the advantage of a further reduction in costs and space because processing power is not wasted due to redundancy. In the case where one processing module malfunctions, the other processing modules may pick up processing duties via a processor off-load procedure. If there is not enough processing power for all wanted functionalities, the processing modules may work together to prioritize critical vehicle functions ahead of non-critical functions.

Figure 20:
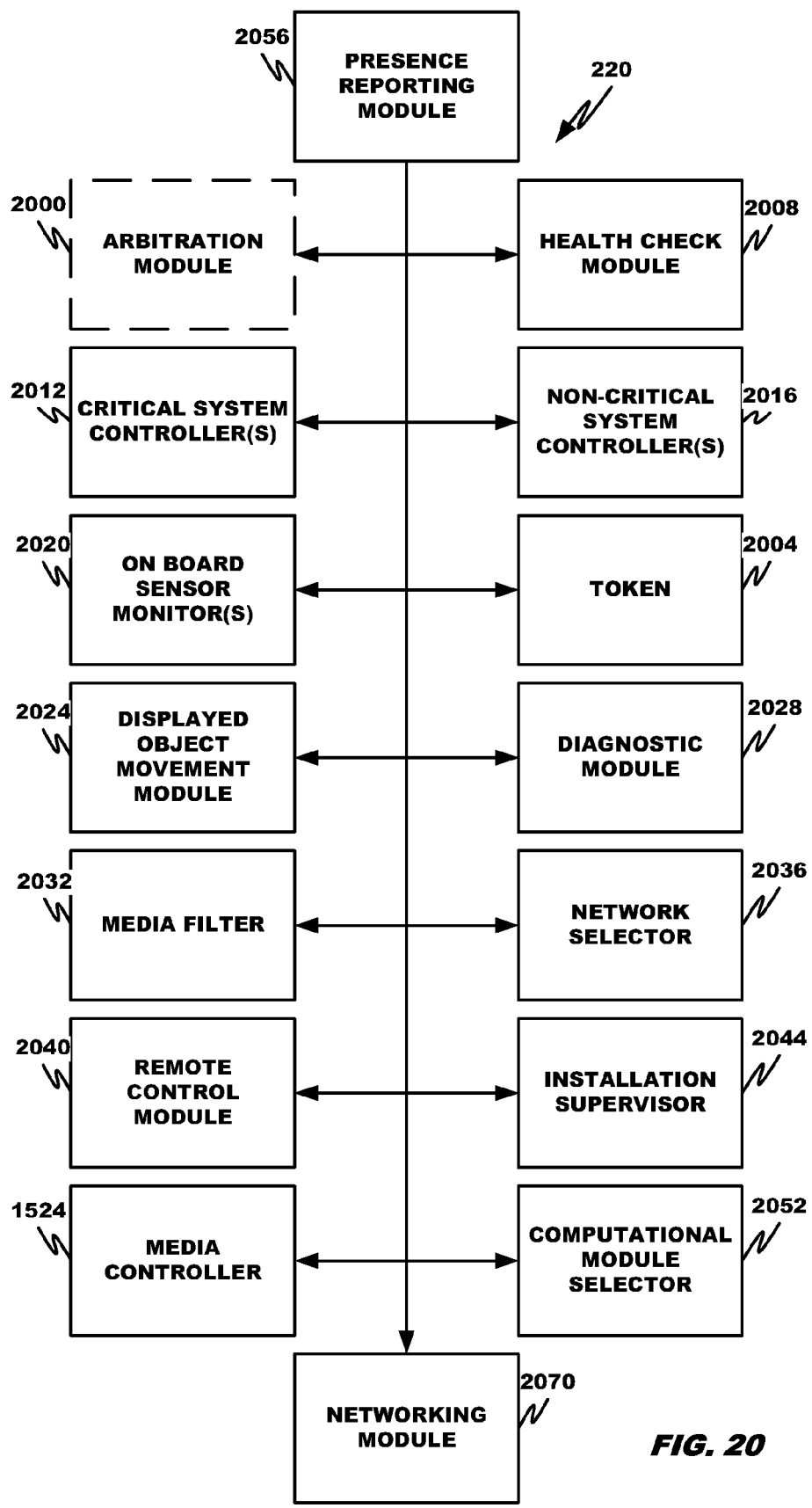
FIG. 20 is a block diagram of a vehicle computational system according to an embodiment.

FIG. 20 depicts computational modules and data structures in memory 220 according to an embodiment.

An arbitration module 2000 selects a processing module to currently possess or own token 2004 (which is used to designate the processing module 124, in an active-standby configuration, being the active or standby processing module or, in an active-active configuration, having the responsibility for certain tasks, functions, or operations, such as critical tasks, operations, or functions, while the other processing module has responsibility for other different tasks, operations, or functions, such as non-critical tasks, operations, or functions.

A heath check module 2008 performs checks or tests, in response to internally generated interrupts or requests from the other processing module, its ability to perform both critical and non-critical tasks, functions, and operations. Individual scores and composite or cumulative scores for the tasks, functions, and operations can be determined and compared to thresholds to determine an absolute state of health and/or to the individual and/or cumulative scores of the other processing module to determine a relative state of health.

Critical system controller(s) control, monitor, and/or operate critical systems.

Critical systems can include one or more of (depending on the particular vehicle) monitoring, controlling, and/or operating the ECU, TCU, door settings, window settings, and/or blind spot monitor, monitoring, controlling, and/or operating the safety equipment (e.g., airbag deployment control unit 133, collision sensor 132, nearby object sensing system, seat belt control unit, sensors for setting the seat belt, etc.), monitoring and/or controlling certain critical sensors such as the power source controller and energy output sensor 164, engine temperature, oil pressure sensing, hydraulic pressure sensors, sensors for headlight 128 and other lights (e.g., emergency light, brake light, parking light, fog light, interior or passenger compartment light, and/or tail light state (on or off)), vehicle control system sensors, wireless network sensor (e.g., Wi-Fi and/or Bluetooth sensor), cellular data sensor, and/or steering/torque sensor, controlling the operation of the engine (e.g., ignition), head light control unit, power steering, display panel, switch state control unit 168, power control unit 174, and/or brake control unit 176, and/or issuing alerts to a user and/or remote monitoring entity of potential problems with a vehicle operation.

Non-critical system controller(s) 2016 control, monitor, and/or operate non-critical systems. Non-critical systems can include one or more of (depending on the particular vehicle) monitoring, controlling, and/or operating a non-critical system, emissions control, seating system controller and sensor 178, entertainment system 190, monitoring certain non-critical sensors such as ambient (outdoor) weather readings (e.g., temperature, precipitation, wind speed, and the like), odometer reading sensor, trip mileage reading sensor, road condition sensors (e.g., wet, icy, etc.), radar transmitter/receiver output, brake wear sensor, oxygen sensor, ambient lighting sensor, vision system sensor, ranging sensor, parking sensor, heating, venting, and air conditioning (HVAC) system and sensor, water sensor, air-fuel ratio meter, hall effect sensor, microphone, radio frequency (RF) sensor, and/or infrared (IR) sensor.

On board sensor monitor(s) 2020 include interfaces to receive signals from and transmit signals to a corresponding on-board sensor, including the on-board sensors discussed above, and the logic to monitor sensor operation and readings.

The displayed object movement module 2024 monitors display input received from occupants for commands to move a displayed object from a first display to a different second display in the vehicle for viewing by, for instance, a different occupant. The display input may include, for example, a sensed gesture, an icon selection, or other input indicative to a desire or request to move a displayed object from the first display to the second display. The moved object may or may not be retained for view on the first display after movement.

The diagnostic module 2028 handles warning/error signals in a predetermined manner. The signals, for instance, can be presented to a third party and/or occupant and/or cause the performance of on board diagnostics.

The media filter 2032 filters third party sourced signals, particularly multimedia signals, in a manner consistent with a vehicle universal or occupant-specific whitelist, blacklist, or other user preference, sensed occupant context, and/or a governing federal, state, provincial, or local law or regulation.

The network selector 2036 selects a network for signal transmission based on network/node status, signal/noise ratio, type of signal, available and/or unavailable bandwidth, network performance parameter(s) (e.g., availability, packet drop or loss, jitter, latency, buffer capacity, throughput, and the like) quality of service, and/or other parameters and configures the signal for transmission over the selected network.

The remote control module 2040 receives a request from a remote source or third party to command a vehicle function (which function may be identified by a suitable function-specific code), authenticates the requestor, and if successfully authenticated and if privileged to request the performance of the vehicle function, executes the request notwithstanding a contrary command from the vehicle operator. The requestor can, for example, be a vehicle owner, a law enforcement authority, a vehicle manufacturer, a lender having a loan collateralized by the vehicle, and the like.

The installation supervisor 2044, for a newly installed software and/or hardware and/or other device (such as an on-board sensor, processing module 124 or component thereof, software application, circuit board, expansion module 290 or component thereof (which expansion module 290 may be hardware, software, or a combination thereof), critical or non-critical device (such as those discussed above with respect to the critical or non-critical system controller(s) 2012 and 2016), cellular upgrade module (e.g., 2G, 3G, 4G, 5G, LTE, or other cellular standard upgrade or Subscriber Identity Module ("SIM") card, board, or other upgrade module, and the like), determines whether the newly installed component satisfies defined functional and/or source or reuse requirements and/or restrictions for the component, license restrictions, and other criteria, and, if satisfied, creates data structures in the component (if it has a resident memory) and the vehicle memory 220 to bind the component to the current vehicle.

The media controller 1524 receives a media stream from a remote node, identifies which input/output systems are disabled due to operator command and/or as a result of governing law, and provides the media stream to an input/output system associated with the associated occupant.

The computational module selector 2052 identifies the computational modules, particularly software applications, currently available within the local area network of the vehicle, the identification including not only the type (e.g., game, multimedia, music, utility, and the like), source or vendor (e.g., Apple, Microsoft, and the like), capabilities and requirements (e.g., operating system, processing, memory, display, and other requirements) but also the version of the computational module, and records this information in memory 220. The selector 2052 can select not only, for duplicated computational modules, a most current version of the duplicated module to execute and a computational platform (e.g., first, second, . . . processing module or external computational device 1532) for the execution.

The presence reporting module 2056 considers local laws, individual (contactee) context, and other factors in determining whether an individual (contactee) is present (e.g., for unified communications) and, if so, by what communication channel(s).

The social networking module 2070 creates, manages, and/or maintains a social networking session with one or more other vehicles. The social networking module 2070 can identify operational vehicles having an occupant in a social networking relationship with an occupant of the selected vehicle, notify one or both occupants of the capability of instantiating a social networking session, and effectuate and maintain such a session.

In one application, processing module 124 is configured to process information sent over the CAN buses. As priority data is received by processing module 124 from high-speed CAN bus interface 240 and/or low-speed CAN bus 250, processing module 124 may determine the nature of the received data and independently do further processing on the received data. In a preferred embodiment, processor 210 executes instructions stored in memory 220 to perform these functions. Further, memory 220 serves as stores and retrieves for data by processor 210.

In one configuration, processing module 124 only receives data over high-speed CAN bus 240 and may send the data back over low-speed CAN bus 250. As the CAN bus provides arbitration-free transmission, processing module 124 may passively listen to information traffic, which includes priority data from the various components as discussed, sent over high-speed CAN bus 240. Processing module 124 then determines if a piece of received information may need further processing and should be sent to devices via low-speed CAN bus 250.

For example, collision sensor 132 may have detected a frontal collision. In one data path, collision sensor 132 may send a signal with details to the collision (i.e., areas of impact and/or force and/or velocity of impact) over high-speed CAN bus 240 with specific target to airbag release control unit 133 to potentially deploy the airbags once airbag release control unit 133 determines that it is suitable to do so upon the receipt of the sent data. Since the CAN bus is arbitration-free, processing module 124 also receives the collision information from collision sensor 132. Processing module 124 then processes the information received to determine to relay the information to an information display (i.e., display console of entertainment system 190) via the low speed CAN bus 250.

It is noted that the data rate is limited in the current implementations of the CAN bus. However, future implementations may allow for higher speeds such that the CAN bus may support data rate suitable for multimedia application. In these implementations, processing module 200 may be configured to leverage the CAN bus for multimedia use. For example, real-time multimedia information (i.e., analog/digital radio or television signal) may be received by an antenna and transmitted through a CAN bus via processing unit 200 to entertainment system 190. At some point in time, one component of vehicle 100 may have suffered a malfunction that requires information the driver. In the default implementation of the CAN bus, the higher priority signal from the malfunctioning component will have priority over the multimedia information. With the leveraged CAN bus by processing module 200, the high priority signal from the malfunctioning component can be further processed by processor 210. If processor 210 determines that the malfunction is minor, processor 210 may relay the malfunction information to the low speed CAN bus 250 but being mixed in with the multimedia information such that there is little disruption to playing backing the multimedia information. Further, processor 210 may also consider if the malfunction requires further processing such as notification to a repair facility or emergency services.

In another configuration, processing module 200 may leverage other buses such as the network interface 270 and/or wireless interface 280 that have more bandwidth for the data. For example, while the present implementation of the CAN bus would not support multimedia information with any substantial bit rate, the network interface 270 may be leveraged such that while CAN bus information is received via the high speed CAN bus 240, multimedia information is relayed separately via the network interface 270. This enables the processing module 200 to implement the previous example discussed involving relaying information regarding malfunctioning component without waiting for a future implementation of the CAN bus.

In another application, a processing module 124 may add further expansion modules 290A-N for further capabilities. For example, expansion modules 290A-N may contain a cellular telephony module. The cellular telephony module can comprise a GSM, CDMA, FDMA, or other digital cellular telephony transceiver and/or analog cellular telephony transceiver capable of supporting voice, multimedia and/or data transfers over a cellular network. Additionally, expansion modules 290A-N can include other cellular telephony modules from different providers or modes for other wireless communications protocols. As examples, the modules for other wireless communications protocols can include a Wi-Fi, BLUETOOTH™, WiMax, infrared, or other wireless communications link. The cellular telephony module and the other wireless communications module can each be associated with a shared or a dedicated antenna. Further, expansion modules 290A-N may also include other wired bus modules that may connect to additional essential and nonessential vehicle components that may be installed or upgraded in the future. Processing modules 290A-N may contain functions critical to the operation of the vehicle such as engine control (ECU), transmission control (TCU), airbag control, various sensors, or other operational or safety related components. Further, processing modules 290 may take on more processing duties from a vehicle component 310 connected to bus 380. Thus, processing modules 124A-C benefits from redundancy in the case that one of modules malfunctions. Further, in a vehicle collision, it is expected that at least some of the processing modules may totally malfunction. In these cases, the remaining processing modules may take over limited or full processing duties of the malfunctioning vehicle components 310 or processing modules 390A-C.

In one configuration, processor 210, memory 220, storage 230, and the bus interfaces 240-280 may also be expansion modules similar to 290A-N. For example, processor 210 may be initially implemented as an OMAP 4 processor. In the future, OMAP 5 processors may be developed and processor 210 may be upgraded as a modular component.

In another application, processing module 124 is able to support additional vehicle hardware and/or software components that are added to the vehicle and is connected to processing module 124 via a bus. For example, vehicle 100 may have installed an additional entertainment system. In one configuration, processing module 124 can treat the additional component that is connected to processing module 200 via a bus as an expansion module 290A-N.

In another configuration, the additional hardware and/or software component may require further processing for it to work with processing module 124. For example, the bus protocol may need to be modified to support communicating with the additional component because the additional component has capabilities beyond the existing protocol (i.e., an extension to an existing bus architecture). In one implementation, processing module 124 must first check to ensure that the additional component complies with OEM defined standards such that rogue components not recognized for a particular vehicle would not be supported.

FIG. 15 depicts the vehicle 100 in communication, via first, second, . . . networks 1504 a, b, . . . , with a remote node 1500, such as a computational device, e.g., a server, mobile phone, tablet computer, laptop computer, personal computer, and the like, of the vehicle owner, law enforcement authority, insurance company, vehicle or parts manufacturer/vendor (e.g., to provide vehicle diagnostics, maintenance alerts, vehicle or part recall notifications, and/or predictive analytics), a service provider (e.g., a convenience service provider such as a service to connect the vehicle operator with a dealer, a service to locate the vehicle, a service to provide vehicle information and/or feature assistance, an automotive navigation system service and a service to start a vehicle (OnStar™ being an example), a location-based service provider (e.g., traffic and/or weather reporting and/or adviser on gas, accommodations, navigation, parking assistance, and/or food), Internet content provider, software vendor, concierge service provider, a processing module of another vehicle, a roadside monitor, sign, beacon, and the like, to name a few.

The first, second, . . . networks 1504a,b, . . . can be any wireless network, such as a radio or cellular network (e.g., CDMA, CDMA2000, AMPS, D-AMPS, TACS, ETACS, CSK, CDMAOne, GSM, EDGE, GPRS, HSCSD, UMTS, WCDMA, HSPA, WIMAX, WIMAX ADVANCED, LTE ADVANCED, or FDMA in accordance with the 1G, 2G, 2G transitional, 3G, 3G transitional, 4G or 5G cellular network standards), a Wi Fi network, a Bluetooth network, and the like.

The vehicle 100 includes a transceiver 1508 to send and receive signals over a selected one of the first, second, . . . networks 1504 a, b, . . . , a gateway/firewall 1512 to provide secure connectivity between the various components of the vehicle 100 and the first, second, . . . networks 1504*a*, *b*, . . . , primary and secondary processing modules 124*a* and *b*, memory/storage 220 or 230, on board sensors 1516 (discussed above with reference to FIG. 1), input/output system(s) 1520 and associated media controller (discussed below) to manage and control the output presented by the input/output system(s) to the user, network controller 1528 to supervise local networks and nodes thereof and identify and, if possible, isolate malfunctioning networks and/or nodes to avoid detrimental impact on other networks and/or nodes of the vehicle 100, and external computational device(s) 1532 of occupants, such as wireless capable mobile phones, personal digital assistants, tablet computers, laptop computers, and the like. As will be appreciated, the logic for the gateway/firewall 1512, media controller 1524 and network controller 1528 can be contained within memory/storage 220, 330. The various components are connected by a bus, wireless network, or combination thereof (denoted by reference 1536).

The gateway/firewall can be any suitable module that can maintain secure connectivity. The need for the gateway/firewall is necessitated by the assignment of a wireless data network address, such as defined by IPv6 (Internet Protocol version 6), with the corresponding processing module 124. As will be appreciated, IPv6 addresses, as commonly displayed to users, consist of eight groups of four hexadecimal digits separated by colons, for example 2001:0 db8:85a3: 0042:0000:8a2e:0370:7334.

Each processing module 124 can have an independent network address or use a common network address. The gateway can be any module equipped for interfacing with another network that uses one or more different communication protocols. The firewall can use any technique to maintain security, including network address translation, network layer or packet filtration, application-layer firewall, and the like.

Figure 16:
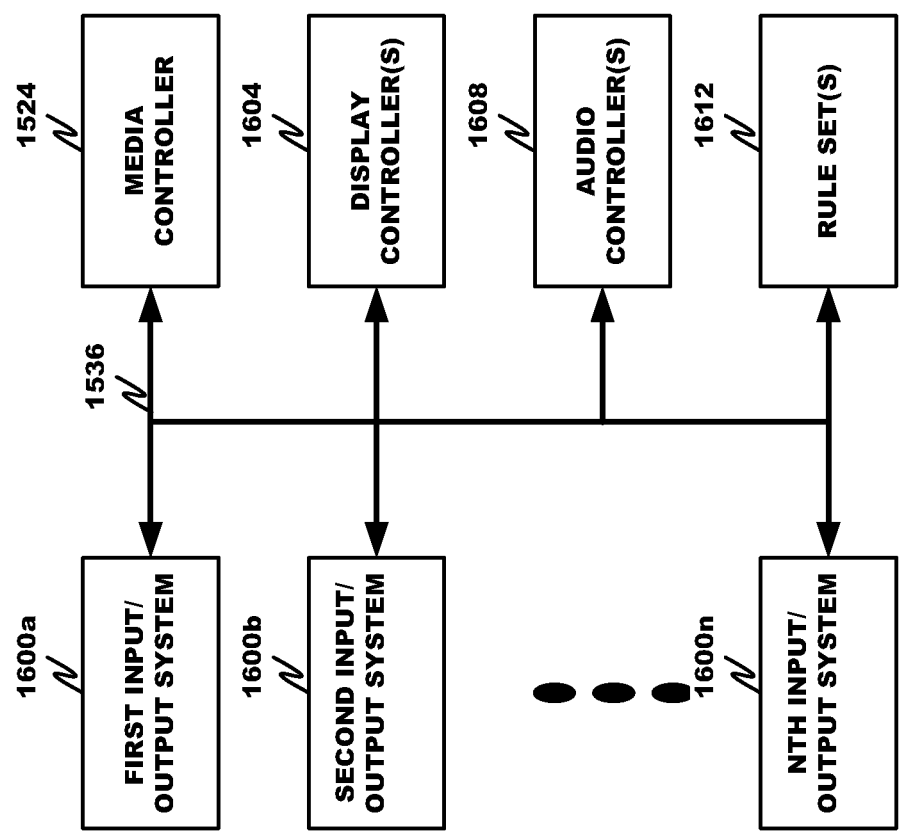
FIG. 16 is a block diagram of an input/output system according to an embodiment.

FIG. 16 depicts an exemplary input/output architecture for the vehicle 100. The architecture includes first, second, . . . nth input/output systems 1600*a-n*, the media controller 1524, display controller(s) 1604 to receive user input via the input/output system(s) and configure the output presented by the input/output system(s) to the user, audio controller(s) 1608 to control audio output to the user, and rule sets 1612 (stored in memory/storage 220, 230) to regulate corresponding features/functions of the vehicle 100, particularly the information and/or other output provided to each occupant by a respective input/output system. Generally, each of the multiple occupants has a separate and corresponding input/output system 1600. For example, each seat 148 can have a corresponding input/output system 1600.

As can be appreciated, the functionality disclosed herein may be affected by the geographical location and/or movement of a vehicle. A vehicle may cross a jurisdictional line where different laws exist that concern behavior in or about vehicles. These laws may be stored, as one or more rule set(s) 1612, in a database on-board and/or remotely accessible by the vehicle. A vehicle may use its location-based features to determine the appropriate applicable laws and enable or disable certain features to a user. For example, in the event that an individual crosses a state line where the local laws prohibit texting while driving, the vehicle may disable texting for the vehicle operator. This blocking would not prevent others in a vehicle from texting, and if allowed may provide for the operator to continue to send voice-activated texts, etc. Movement and location of the vehicle may be determined using location-based features as described herein. Moreover, to prevent false blocking of features, a specific user device position may be determined by sensors on the device, sensors in the vehicle, and/or combinations thereof. Although described with reference to blocking the texting ability of a specific user, it can be appreciated that the ability to surf the Internet, view photos, access streaming content, and other predetermined distractions may also be disabled.

For an additional external computational device 1532 that connects to processing module 124 via wireless interface 280, a secured connection protocol is needed. Unlike a wired bus connection, which is generally electronically confined to vehicle 100, a wireless connection via wireless interface 280 may be broadcast to other communication systems within the vicinity of vehicle 100. Thus, other wireless communication hardware, systems, and networks might be able to communicate with the communication system of the vehicle 100. This ability is potentially a security hazard.

To resolve this issue, wireless security rules should be used to ensure that only trusted devices, such as the external computational device 1532, communicate wirelessly, via the wireless interface 280, with the on board vehicle components through the wireless interface 280. Such security is provided by the gateway/firewall 1512 applying known security algorithms. In one implementation, wireless security may be implemented by the gateway/firewall 1512 using the current security setup in the 802.11 standard such as Wired Equivalent Privacy (WEP) or Wi-Fi Protected Access (WPA) or other security systems as known in the art. OEMs may also choose to implement security by using a propriety security system and/or wireless protocol to work with the in-vehicle wireless communication network.

Upgrading the vehicle 100 using different processing modules and/or other on board components, such as on board sensors 1516, can be done securely and seamlessly. A limit may be imposed on the place and manner in which an additional component communicating via the in-vehicle wireless network may be added to the vehicle 100. For example, installation of the additional component may only be available at an automobile shop or may even more limited to only in OEM approved shops or dealership to ensure that the newly installed component is fully tested to communicate only with vehicle 100 and not with other adjacent vehicles.

To facilitate this process, a handshake procedure may be used during the initial installation of the component. In one implementation, an OEM approved shop may have codes that will allow the new component to accept a link with vehicle 100. During this handshake procedure, vehicle 100 and its relevant components, such as processing module 200, may negotiate a protocol and/or security settings to communicate with the new component. For example, a symmetric or asymmetric code or key pair may be developed for encrypting communications. Alternatively, codes for WEP, WPA, or other security systems as known in the art may be developed for secured communication. After this initial handshake procedure, the new component and vehicle 100 will not have to do any further security setup in the future to prevent leaking the secured codes. In a further implementation, the new component is considered married or bound to vehicle 100 and may not communicate with any other vehicles unless unmarried or unbound when the component is removed at an approved shop. The dedication of the component to the vehicle may be done by using a unique code, such as a serial number of the component or vehicle, to enable a type of routine licensing compliance check when the car is activated. This can be done, for example, by comparing a unique code received by the installed component from another vehicle component or by the other vehicle component from the installed component. The licensing check is successful when the received code matches a code stored in memory of the receiving device.

In another configuration, the additional, or installed, component may also communicate wirelessly with other vehicle components of vehicle 100 without needed processing module 200 to relay any communication. This may be done by sharing a vehicle encryption scheme and code for the wireless use. This may be useful for emergency purposes (i.e., the police may have a need to control certain components in a vehicle).

Operation of Arbitration and Health Check Modules 2000 and 2008

The processing modules 124 can use any of a variety of techniques to determine relative status and/or processing role of each. For example, under one technique a token is passed to signify the active or passive processing module or the processing module performing a specified set of processing operations. The processing module in possession of the token at any one time has the status and/or is responsible for the set of processing operations associated with the token. Rules may be used to arbitrate between the processing modules when each asserts ownership and/or non-ownership of the token.

By way of illustration, the processing modules 124 can determine which module is active and which is standby by employing the following rules. Upon detection of a selected stimulus (e.g., at vehicle start-up, processing module power-up, and/or periodically during vehicle or processing module operation), the health check module 2008 in each processing module 124 runs self-tests or queries the health check module 2008 other processing module 124 to perform selected computational tasks and provide the result. The processing modules 124 thus exchange messages with each other. Based on the results of its self-test (or queried tests), each processing module 124 decides whether it can become active. If so, the processing module 124 asserts an available signal to an arbitration module 2000, which propagates the signal to the other processing module 124. The arbitration module 2000, applying rules, chooses the active processing module 124 and forwards the token to the selected processing module 124, along with an interrupt. Rules may include a default selection, an ordered, random or pseudorandom periodic change in which processing module 124 is active and which is standby, which processing module 124 is healthier (or has a higher state of health score, the relative capabilities of the processing modules 124 (with the more capable processing module being active), and the like. The arbitration module 2000 propagates a token non-ownership signal to the other processing module 124, along with an interrupt. Each processing module 124, in response, sets its status in memory to "primary" or "standby". If the active processing module 124 is removed, powered down, or voluntarily de-asserts ownership or possession of the token, the standby processing module immediately receives the available token 2004, along with an interrupt. It then assumes, and records in memory, the primary state.

Figure 4:
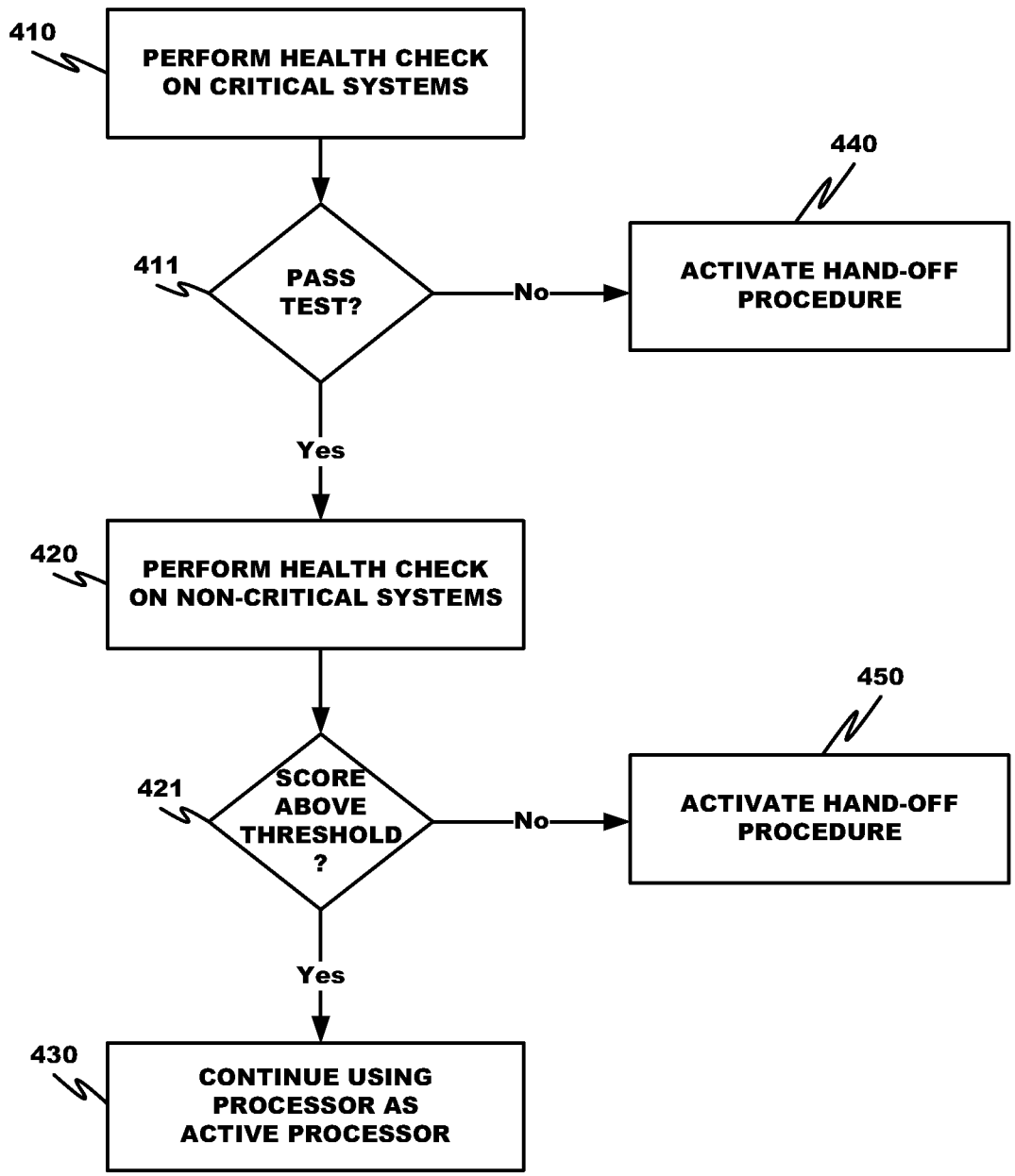
FIG. 4 depicts a flow diagram of a health-check method according to an embodiment.

In one variation, arbitration is performed by the arbitration module 2000 using a health check procedure 400 shown in FIG. 4.

Health check procedure 400 by the health check module 2008 is one way in which each processing modules 124A-C may self-check to determine a respective state of health (e.g., if the processing modules remains fully functional or is only partially functional). Health check procedure 400 may be activated by each processing module 124 or one of the other processing modules 124 at a certain time interval or may be manually activated by user (i.e., a user directly activating the module or whenever the ignition is started). Health check procedure 400 may also be continuously running while the vehicle 300 is running to ensure the fastest response time in case a collision occurs resulting in an immediate loss of processing functions.

In step 410, the health check module 2008 in each processing module 124 performs a health check on its critical tasks, functions or operations of which losing one would result in a potentially critical loss to vehicle operation. As discussed previously, the critical tasks, functions or operations may include, for example (depending on the particular vehicle), monitoring, controlling, and/or operating a critical system. Health check 410 may involve procedures such as testing or monitoring that each critical function or operation is operating within predetermined or selected operating parameters and/or causing each critical component (safety equipment, selected sensors, engine, power steering, and/or brakes) to operate within selected operating parameters. In some configurations, a critical system, such as the ECU, may include both critical (i.e., engine failure) and non-critical tasks or functions (i.e., minor oil leak). Health check 410 may be configured to check only the critical tasks or functions.

Figure 5:
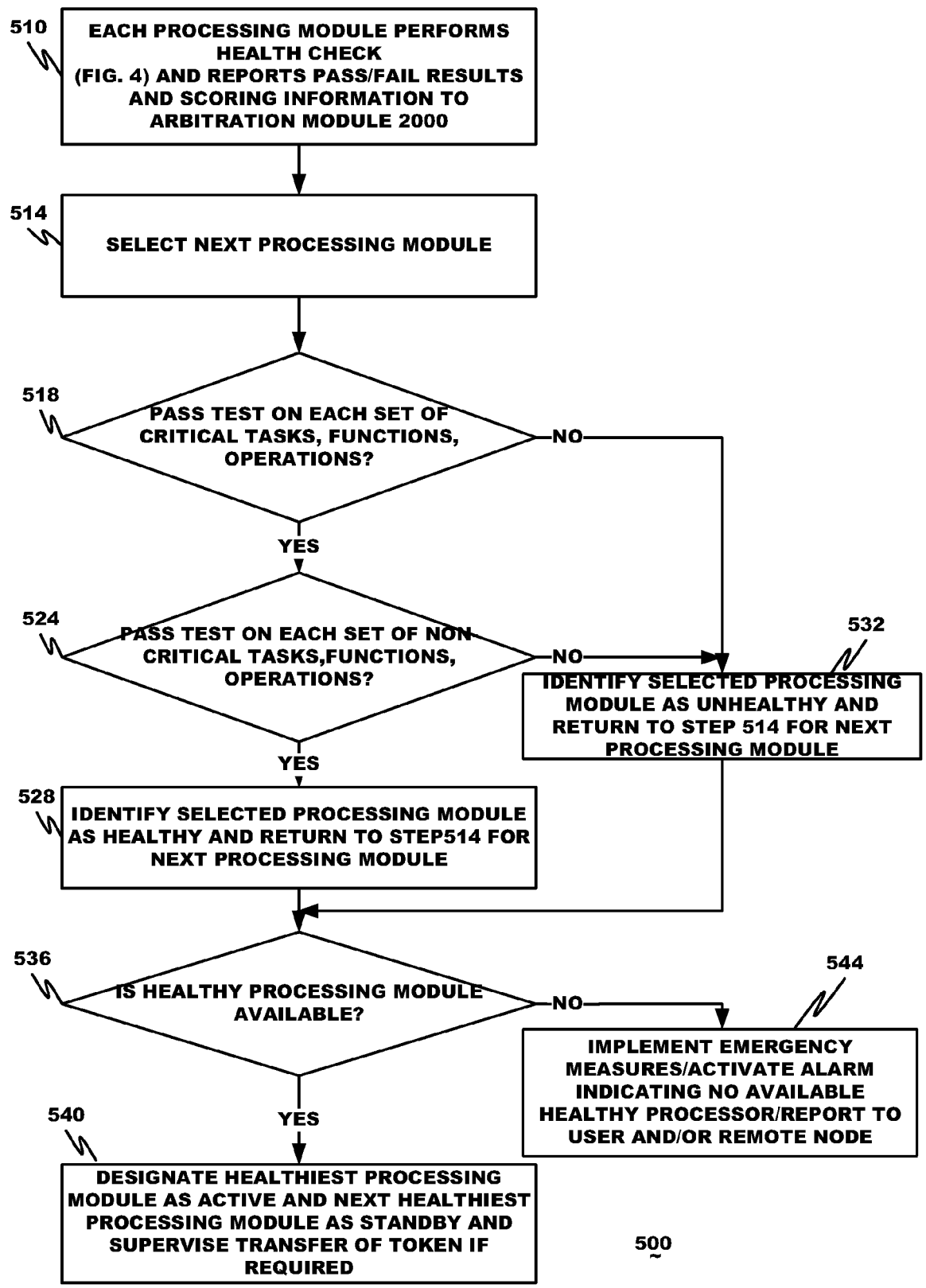
FIG. 5 depicts a flow diagram of a hand-off procedure method according to an embodiment.

In pass test check 411, if any malfunction to a critical task, function or operation is detected, the procedure activates hand-off procedure in step 440, which will be discussed with reference to FIG. 5. In one variation, a cumulative score is computed for all critical tasks, functions, and operations. The individual scores of the tasks, functions, and operations and cumulative score for the processing module is provided to the arbitration module 2000, which compares both sets of scores for the two processing modules 124 and selects and designates the healthier of the two processing modules 124 as the primary or active processing module 124.

If the processing module 124 passes test check 411, health check on non-critical tasks, functions or operations 420 is performed. Non-critical tasks, functions or operations may include, for example (depending on the particular vehicle) monitoring, controlling, and/or operating a non-critical system. In step 420, health check is done on various functions of the non-critical system, with each function having a score for passing the health check. The score may be adjusted according to the level non-criticality of the system. For example, an emissions control unit, while it may be non-critical to vehicle operation, may nonetheless be fairly important so as to comply with environmental regulations; therefore an emissions control unit could be weighted a comparatively high score for passing. In contrast, an entertainment system's failure may not be deemed to be important (except for operator/occupant inconvenience) and may be weighted with a relatively low score for passing.

In step 421, the score is tabulated for all non-critical systems and compared to see if it is above a certain threshold. If the score is below the threshold, a hand-off procedure is activated in step 450. For example, if emissions control by the processing module 124 is detected to be failing, causing or potentially causing harmful gas emissions to rise significantly above the legal limit, health check 421 may give a very low score to this non-critical system. Therefore, even if the entertainment system is working perfectly, health check may still give a score that is below the threshold and hand-off procedure will be activated.

In one configuration, the score weight for each non-critical system may be defined dynamically according to the location of the vehicle or other factors. For example, vehicle-use laws may affect how a non-critical system should be weighted (i.e., the stringency of emissions law, noise control law, or other laws in one area). Thus, vehicle-use laws may be provided by an organization, governmental entity, group, individual, and/or combinations thereof. The laws may be stored locally or retrieved from a remotely located storage. The vehicle-in-use laws may be statutes and/or regulations that are enforced by a government entity, such as a city, municipality, county, province, state, country, and the like. These laws may define vehicle, traffic, transportation, and/or safety rules associated with a given geographical region. An exemplary vehicle-in-use law governs texting, cellular phone use, and video availability to the operator when the car is in motion and the like). The laws may be updated from time to time to, among other things, account for changes in the laws. Thus, a first task, operation, or function may be critical in a first geographic location but noncritical in a different second geographic location. Likewise, a first task, operation, or function may be non-critical and have a first score (if operating properly) in a first geographic location but be non-critical and have a lower second score (if operating properly) in a second geographic location.

In step 430, if the score for non-critical systems is above the threshold, the active processing module 124 may be continued to be used as the active processor. In one variation, a cumulative score is computed for all non-critical tasks, functions, and operations. The individual scores of the tasks, functions, and operations and cumulative score for the processing module is provided to the arbitration module, which compares both sets of scores for the two processing modules and selects and designates the healthier of the two processing modules as the primary or active processing module.

The operation of a an arbitration module 2000 procedure 500 for a processing module will now be discussed with reference to FIG. 5.

The arbitration module 2000 can activate a token arbitration procedure 500 by steps 440 and 450 (FIG. 4) where either (a) the one or more critical tasks, functions, and operations has failed health check or (b) where one or more non-critical tasks, functions, and operations has not tabulated enough score to represent that the selected processing module is healthy enough for processing. Arbitration may be based on an absolute and/or relative state-of-health.

In step 510, a health check is performed, by a respective health check module 2008, on each processing module 124 and the pass/fail results and scoring information reported to the other processing modules 124 and/or the arbitration module 2000.

In step 514, the arbitration module 2000 selects a next processing module 124 (until all are considered) and proceeds to decision diamond 518.

In decision diamond 518, the arbitration module 2000 determines whether the selected processing module 124 passes the health test on set of critical tasks, functions, and operations. If so, the arbitration module 2000 proceeds to decision diamond 524.

In decision diamond 524, the arbitration module 2000 determines whether the selected processing module 124 passes the health test on set of non-critical tasks, functions, and operations. If so, the arbitration module 2000 proceeds to step 528.

In step 528, the arbitration module 2000 creates or updates data structures indicating that the selected processing module 124 is healthy and recording the selected processing module's respective scoring information. Optionally, the arbitration module 2000 can determine and record the relative state-of-health of the selected processing module 124 relative to other processing modules.

When the selected processing module 124 fails to pass one or more sets of critical tasks, functions, and operations (decision diamond 518) or non-critical tasks, functions, and operations (decision diamond 524), the arbitration module 2000 proceeds to step 532 and creates or updates data structures indicating that the selected processing module 124 is unhealthy and recording the selected processing module's respective scoring information. Optionally, the arbitration module 2000 can determine and record the relative state-of-health of the selected processing module 124 relative to other processing modules.

After performing steps 528 or 532, as appropriate, and when no processing module 124 remains to be analyzed, the arbitration module 2000 proceeds to decision diamond 536. In decision diamond 536, the arbitration module 2000 determines whether a healthy processing module 124 is available and, when available, designates, in step 540, the healthiest (based on absolute or relative state-of-health or both) processing module 124 as the active processing module 124 (or, in an active-active configuration, as being primarily responsible for handling critical tasks, functions, and operations).

When no healthy processing module 124 is available, the arbitration module 2000 implements emergency measures, activates an alarm indicating that there is currently no available healthy processing module 124, and reports the alarm to the user and/or a remote node 1500, such as the vendor, manufacturer, servicing entity, roadside service, and the like.

The emergency measures implemented can vary by application. In one application, the emergency measure is to identify which processing module 124 is healthy to perform each set of critical and optionally non-critical tasks, functions and operations. If a healthy processing module exists for each set of critical and optionally non-critical tasks, functions and operations, the arbitration module 2000 assigns each set of critical and optionally non-critical tasks, functions, and operations to a processing module 124 having a sufficiently high health score (e.g., above a selected threshold) to perform the selected set of critical and optionally non-critical tasks, functions and operations. Where multiple processing modules are healthy enough to perform the selected set of critical and optionally non-critical tasks, functions and operations, the arbitration module 2000 can select the processing module having the highest health score for the selected set of critical and optionally non-critical tasks, functions and operations and/or having the highest available or unused processing units or resources to perform the selected set of critical and optionally non-critical tasks, functions and operations. Where no processing module 124 is healthy to perform a selected set of critical and optionally non-critical tasks, functions and operations, the selected set of critical and optionally non-critical tasks, functions, and operations can be performed by a remote node, via first, second, . . . network 1504a, b, . . . . The remote node 1500 can be, for example, the vendor, manufacturer, servicing entity, roadside service, and the like. In one application, the critical and optionally non-critical tasks, functions, and operations are performed by a remote node 1500, via first, second, . . . network 1504a, b, . . . , rather than by a local or on board processing module 124.

An important aspect of an active-standby configuration can be how to maintain synchronicity between the active and standby processing modules to enable "hot" hand-offs, which can be particularly important for automotive applications, without loss of memory as to the current operational state of the vehicle and its component tasks, functions, and operations. One technique is to have the standby processing module 124 perform "shadow" processing in which it receives all input received by the active processing module 124 and performs the same processing tasks, functions, and operations as the active processing module 124. The assumption is that the two processing modules 124 have identical processing rates and therefore, at any one time, precisely duplicate the other as to processing state of completion as to any task, function, and/or operation. Due to varying processing loads on the processing modules, delays in signal transmissions, and other factors, this assumption may or may not be true. Another technique is to have the standby processing module 124 receive, and store in memory 220, time-stamped processing state information from the active processing module 124. The time-stamped processing state information relates to any processing task, function or operation currently being performed by the active processing module 124 and the results thereof. A potential issue with this approach is latency between the current and reported states of the active processing module 124. Another technique is a combination of the foregoing techniques. In this technique, the standby processing module 124 performs "shadow processing" but periodically checks its processing state information against the time-stamped processing state information received from the active processing module 124 and resets, alters, or updates its state information to reflect the received processing state information. Where a processing string is being performed correctly, it does not typically need to be revised to reflect a potentially earlier point reflected in the received and time stamped state information (which may be delayed). A reset to an earlier point in the processing string may be appropriate where the standby processing module 124 is too far ahead of the active processing module 124. The primary purpose of this combined approach is to confirm processing accuracy by the standby processing module 124 and to keep the standby processing module 124 from getting too far in advance of the active processing module 124 in processing information.

Operation of Remote Control Module 2040

Figure 27:
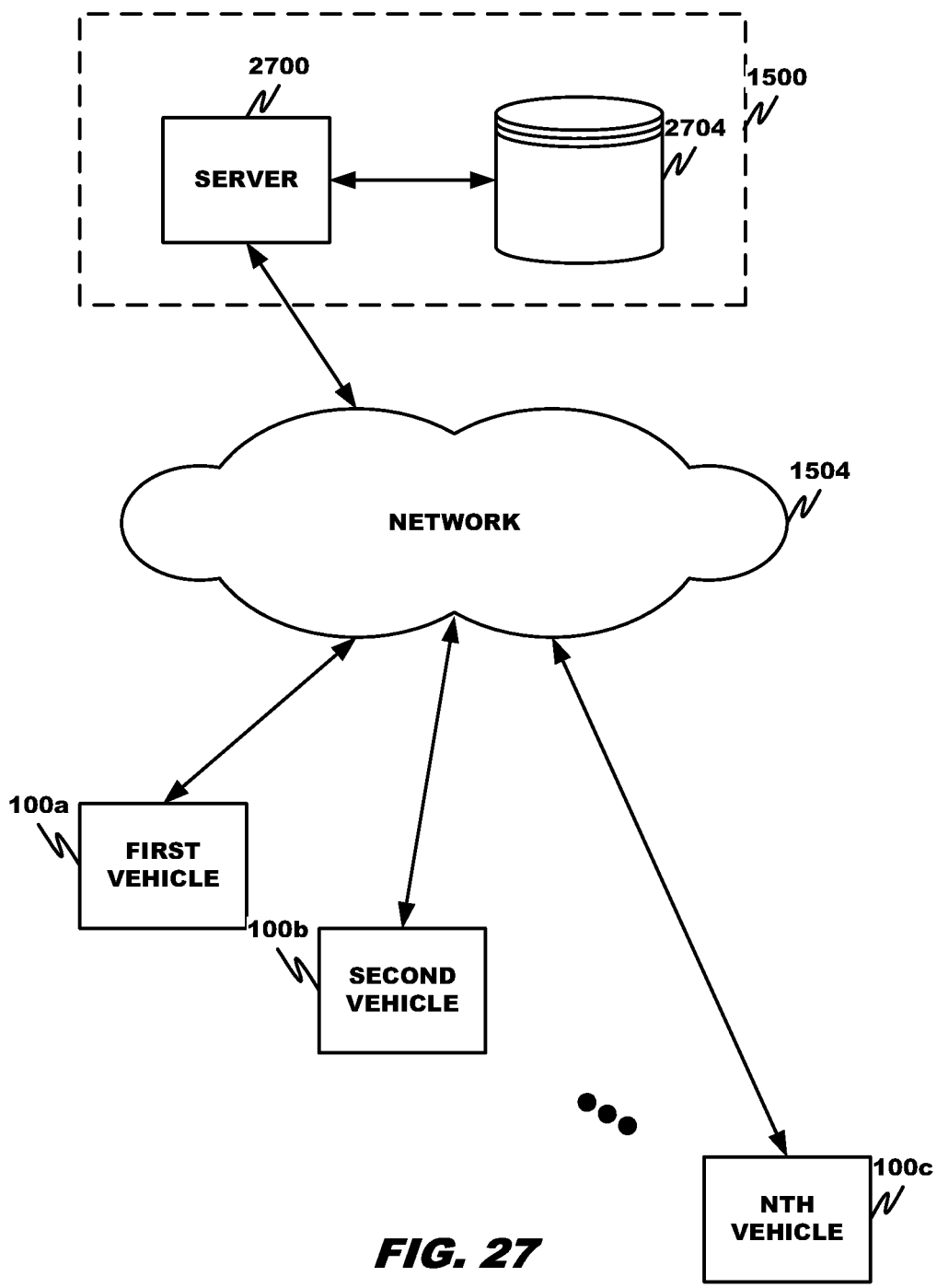
FIG. 27 depicts a communication system according to an embodiment.

FIG. 27 depicts a particular configuration of a remote node 1500. The remote node 1500, configured as a central repository for vehicle information, includes a server 2700 and associated database 2704. The remote node 1500 is in wireless communication, via network 1504, with first, second, . . . nth vehicles 100*a-n*. Currently, car drivers have the option to sign up for a service like General Motors OnStar® to remotely unlock cars, and provide other features such as remote start, tracking vehicles, and/or locking cars, etc.

In some embodiments, the present disclosure is directed to a central repository 2704 that can be used in conjunction with an individual vehicle. The central repository may be stored remotely (as shown) or on-board the vehicle. In the event that the central repository is stored remotely, it may be supervised by a law enforcement agency, or secure administrative agency. It is anticipated that strong security procedures may be employed to avoid hacker attacks, especially if stored at a remote central repository like the Department of Motor Vehicles (DMV), or other security-approved location. In the event that a vehicle is stolen, the true owner of a vehicle may prove ownership to the central repository and locate, lock, shutdown, etc. the vehicle.

Commonly, the requested vehicle function is one or more of accelerate, decelerate, activate, deactivate, provide current vehicle location, broadcast audible and/or visual message to vehicle operator, brake, set a maximum, vehicle velocity, and lock doors. The requested vehicle function can be identified by a function-specific code. The remote control module can map the function-specific code in a look up table indexing function-specific codes with corresponding vehicle functions to determine the requested vehicle function to be performed.

In another embodiment, a police device may communicate to another vehicle to slowly reduce that vehicle's speed, shutdown the engine, cut power, etc. The communication can be securely effected using unique codes or other cryptographic techniques. Moreover, the communication may be through a server associated with a central repository. It is anticipated that the module controlling these functions is securely guarded and designed to prevent hacking attempts.

Figure 6:
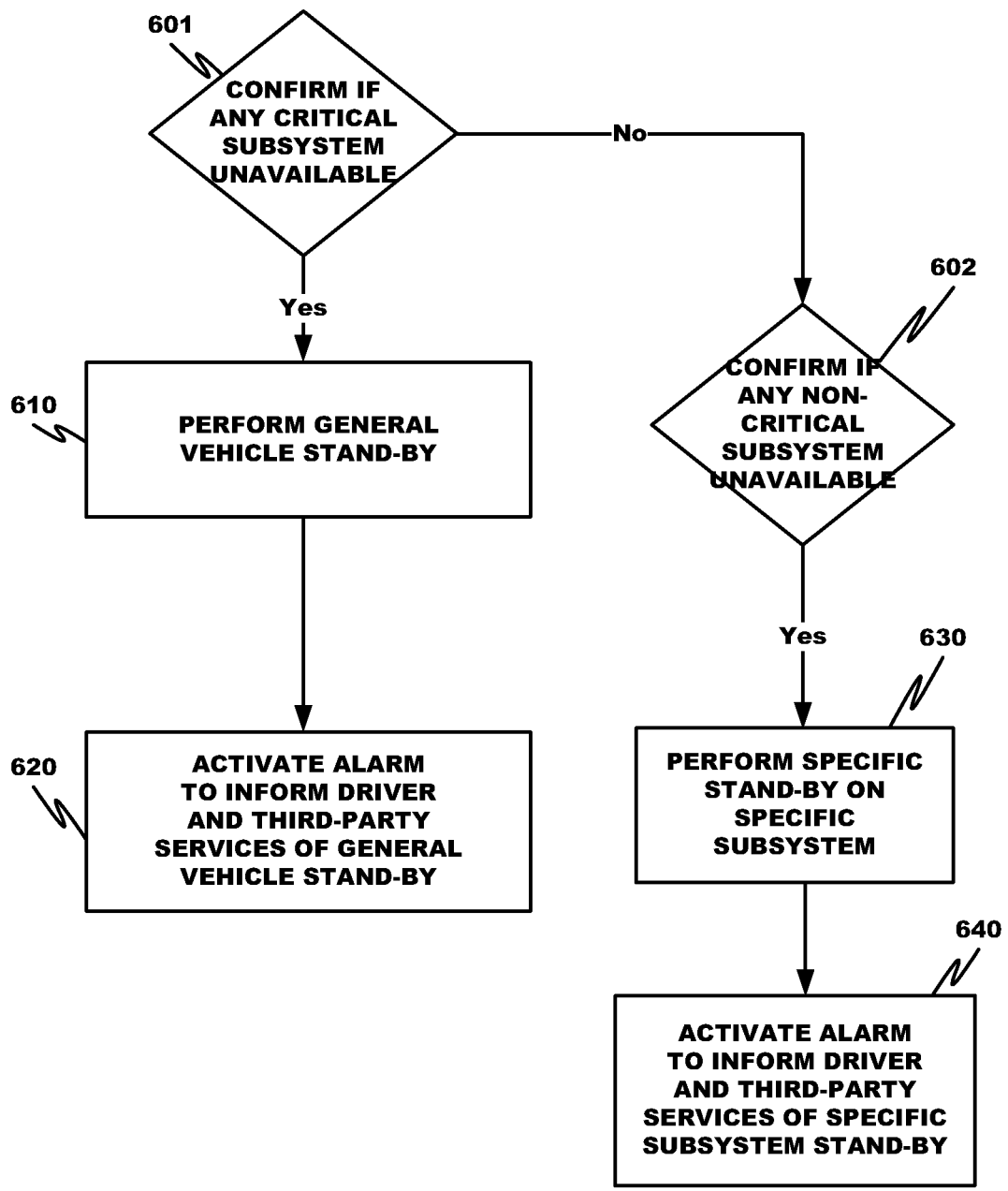
FIG. 6 depicts a flow diagram of a system stand-by method according to an embodiment.

The operation of a system stand-by procedure 600 implemented by a remote control module 2040 and/or other component of a processing module 124 will now be discussed with reference to FIG. 6. Stand-by procedure 600 may be activated when the selected processing module 124 transitions from active to standby or standby to active or in response to a command from the operator or the remote node 1500. In one configuration, stand-by procedure 600 may also be activated manually by the driver of the vehicle or by another third party. For example, the driver or another third party may wish to disable certain aspects of vehicle 300 (i.e., the driver may wish to disable certain functions, either critical or non-critical, of the vehicle to prevent another user of the vehicle, such as a valet, from accessing them, a third party, which may be the police or a theft prevention service such as On-Star, may wish to disable a stolen vehicle or a vehicle which is otherwise in violation of the law).

Manual activation of stand-by procedure 600 may be done locally or remotely. For local activation, an additional component in the form of a switch may be added and connected to the processing module via a bus or as a expansion module 290A-N. The driver may then manually activate the switch as needed.

Most likely, manual activation of stand-by procedure 600 is done remotely (i.e., by the police, theft prevention service, or the owner of the vehicle at a remote location). As such, in one implementation, the corresponding processing module may be accessed via a non-physical bus such as by wireless interface 280. However, this is not the preferred method. As discussed previously, vehicle components communicating with a processing module wirelessly should only work with a secured scheme. The in-vehicle wireless network should not be accessible to third parties for further security purposes. A direct access to the in-vehicle wireless bus would defeat these principles. The wireless interface 280 may have a limited range such that connection and control can only be effected within the vicinity of the vehicle. Nevertheless, this implementation may be useful in cases where there is an emergency that is within the vicinity of the vehicle (i.e., emergency road closure) that requires a third party such as the police to disable passing vehicles for safety reasons. In such cases, the authorized third party may activates codes that bypasses securities of the in-vehicle wireless network that is normally off-limit and directly access the processing module.

In another implementation, the vehicle may have a cellular or satellite communication component that has the capability of accessing an outside cellular or other communication network. Alternatively, this communication component may be installed as an additional expansion module 290A-N as discussed previously. Access to processing module is granted through a valid security verification within this component. Therefore, access to the processing module using this implementation does not require open access to the in-vehicle wireless bus.

In another configuration, stand-by procedure 600 may also be activated by a control system within the vehicle when some automated condition is met. For example, a leased or rental car company may wish to limit the geographical location where the vehicle can be driven. The vehicle may be automatically disabled if it is detected that the vehicle has left the allowed zone of operation (i.e., detected via a GPS).

In step 601, the method confirms if any critical subsystem would be unavailable. As discussed above, a critical subsystem may be unavailable because it did not pass the health check, because it was disabled by the driver or a third party, or because some automated condition has been met.

If critical subsystems are unavailable, step 610 performs general vehicle stand-by. In one configuration, general vehicle stand-by disables all components of the vehicle rendering the vehicle unusable. However, this may lead to safety issues where a sudden shut-down of the vehicle while operating on the road may be hazardous to both the driver of the vehicle and other vehicle on the road. In another configuration, general vehicle stand-by performs a shut-down of non-critical systems while placing a limit on critical system designed to bring the vehicle to stop. For example, a speed limiter may limit the speed of the vehicle to a minimal speed so that the vehicle can be bought to a safe stop subsequently but cannot operate effectively. After the vehicle is brought to a stop, general shut-down that disables all components of the vehicle may be performed.

In step 620, an alarm is activated to inform about the status of a general stand-by. Here, similar to step 540, an alarm is normally sent to at least components like display 144 or entertainment system 190 of vehicle 100 via a reliable bus such as the high speed CAN bus to inform the driver of the generally stand-by. In one implementation, an alarm may also be sent to a remote node 1500, such as a service or maintenance provider, e.g., a nearby or a default car repair facility with possible system diagnosis information, emergency services if it is detected that a emergency affecting road safety has occurred, and/or to car manufacturers for data collection and other purposes.

If critical subsystems are not unavailable in step 601, the method further confirms if any non-critical subsystem is unavailable 602. If any of the non-critical subsystem is indeed unavailable, the method performs specific stand-by on the specific subsystem 630.

Specific stand-by 630 involves performing stand-by only for a specific non-critical subsystem. For example, if entertainment system 190 malfunctions, entertainment system 190 can be safely turned off without affecting the operation of the vehicle. However, some non-critical functions may be affected such as an alarm function announcing certain information that is pre-disposed to be announced by entertainment system 190. In this case, specific stand-by 630 may include rerouting the information to display 144, perhaps with the information to be presented in abbreviated form to ensure the information will be presentable on display 144. Specific stand-by 630 for entertainment system 190 may also involve rerouting information to other perceptible methods such as by light or sound.

In step 640, the method activates an alarm to information driver and third-party services of specific subsystem stand-by similar to step 620.

Figure 9:
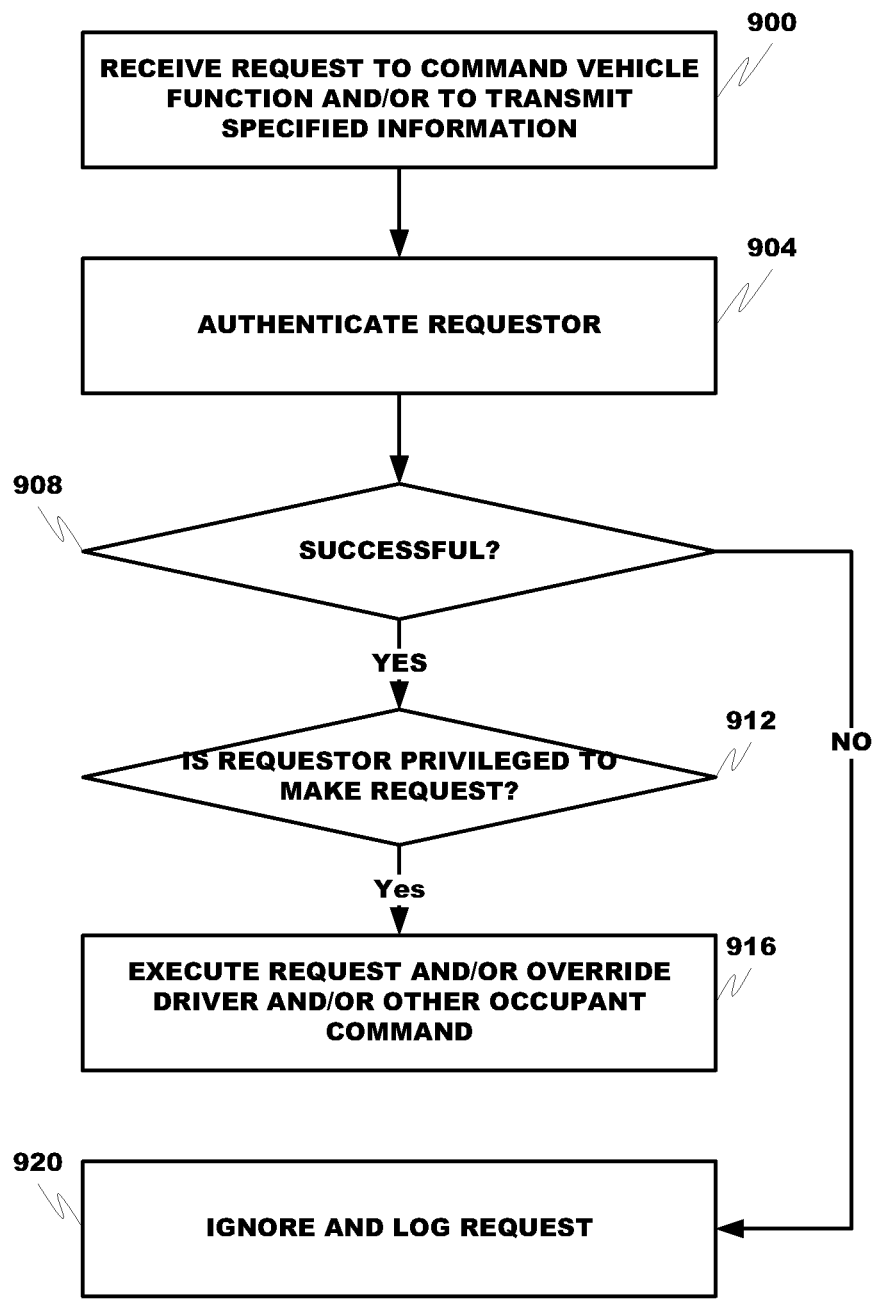
FIG. 9 depicts a flow diagram according to an embodiment.

FIG. 9 depicts a method of operation of the remote control module 2040. There are a number of examples of operation by a remote control module 2040.

In one example, a police officer or other law enforcement authority and/or rule trap sensor can "ping" an automobile for information relating to its speed and driving conditions. By comparing this received data from the automobile to known data relating to stop signs, speed limits, and the like, a decision can be made on whether the law has been broken. For example, the sensor itself may not necessarily determine the speed of a vehicle. The sensor asks the vehicle to respond to the sensor with the vehicle's speed and possibly other information. Therefore, the speed detection is achieved through responding to a sensor's question and the vehicle's answer. It is anticipated that a specific sensor may use alternate detection methods to verify the accuracy of a received signal. For instance, if a vehicle is asked to respond with a current speed value, and does so, the sensor may send a radar signal to verify the response. If the response does not match the verification signal, a note is made of the anomaly and the data is recorded. This data may be used by law enforcement to later identify vehicles that are malfunctioning and/or have been compromised. The identity of the car, including serial number, owner identity (e.g., name, home address, and contact information), driver's license number, insurance information (e.g., name and address of insurance company, owner's insurance policy identification, and coverage limits), and the like), and/or licensing information (e.g., license plate number) can be provided by the vehicle to the requestor.

In another example, a law enforcement authority, owner, or other privileged entity may request a critical or non-critical task, function or operation to be disabled or behave in a selected manner. For instance, a law enforcement officer can cause the vehicle to decelerate in a high speed pursuit or, for a high speed pursuit or stolen car, can disable the engine.

In another example, a remote node 1500, such as a law enforcement authority, an insurance company, an intelligent sign or traffic signal, a roadside monitor, or the owner himself or herself requests historic or current vehicle operating information, such as speed, and/or information received by the vehicle from an external source, such as a stop light, speed limit sign, yield or stop sign, and the like. This information can be compared to identify poor driving practices and/or breaking of the law. It can also be used in accident reconstruction to determine who is at fault in an automobile accident where vehicle operators frequently dishonestly represent who is at fault. Currently, responsible drivers pay inflated insurance premiums because the insurance industry cannot guaranty a particular driver's adherence to the law or general driving behavior. To address this concern, current insurance companies may allow a driver to install a device in a vehicle to randomly monitor behavior. This device can only monitor certain functions and requires the installation of a device separate from the vehicle's ecosystem. The present disclosure is directed to using various data compiled by the system to analyze factors contributing to an individual's driving behavior and/or habits. In the event that an individual wishes to receive better insurance rates for responsible driving, a lower quantity of driving, or other good driving indicators, the driver may agree to provide insurance tracking information. The insurance tracking system may consider GPS and other location-based information (to compare actual speed with speed limit data), g-force sensors (to detect rapid acceleration, hard turns, etc.), perimeter sensors (to detect close-calls, inattention while changing lanes, etc), in order to determine conformance with the good-driving terms established by an insurance company. Because the device may be integrated, and/or associated, with the vehicle's ecosystem total behavioral data may be recorded and sent in real-time to a receiving module. Moreover, the system may detect the user and provide accurate information for each user of a vehicle.

Referring to FIG. 9, the remote control module 2040, in step 900, receives a request to command a vehicle task, function and/or operation and/or to transmit specified information to the requestor.

In step 904, the remote control module 2040 attempts to authenticate the requestor. User authentication is a way of identifying a user and verifying that the user is allowed to access some restricted service. Authentication can be performed by, for example, by encrypted symmetric or asymmetric key exchange, public and private key cryptography, a secure remote password, multi-factor authentication (e.g., three major factors include verification by something a user knows (such as a password or PIN), something the user has (such as a smart card, ATM card, or a security token), and something the user is (such as the use of biometrics, such as a fingerprint or retina scan)), time-based authentication, a unique digital identity, closed-loop authentication, access control service, and the like.

Control then passes to decision diamond 908 where the remote control module determines whether authentication was successful. When authentication is successful, the remote control module, in decision diamond 912, determines whether the requestor is privileged to make the request. In other words, a first requestor is entitled to a first set of privileges with respect to access to vehicle information and/or control of vehicle tasks, functions, and operations while a second requestor is entitled to a different second set of privileges with respect to access to vehicle information and/or control of vehicle tasks, functions, and operations. A law enforcement entity or vehicle owner, for example, will generally have a highest level of privilege (enabling broad access to vehicle information and/or control of vehicle tasks, functions, and operations) while an insurance company or servicing entity will not have the highest level of privilege.

When the requestor is entitled to make the request, the remote control module, in step 916, executes or causes execution of the request in accordance with rules governing what the privilege accorded the requestor, which may override operator and/or other occupant commands.

When the requestor is not entitled to make the request, the remote control module, in step 920, ignores the request and logs in memory 220 the information surrounding the request, e.g., the identity of the requestor, the time stamp of the request, and the request itself.

The remote control module 2040 can perform other functions at the request of the vehicle owner and/or a vehicle family member. The remote control module 2040 can receive vehicle configuration commands from a remote node 1500 that cause the remote control module 2040 to implement the configuration commands. The configuration commands respect the configuration of any vehicle component, including on board input/output system display appearance and/or content and/or icon configuration, programmable hard button function mapping, on board cached media selection, alteration of vehicle performance parameters, and vehicle status.

A number of examples will be described to illustrate these remote control module functions. In a first example, a vehicle owner or family member, via a remote node 1500, such as a home computer, tablet or laptop computer, smart phone, and the like, can customize his or her input/output system display settings, appearance, sounds, wall paper, icon selection and location, and the like. Manufacturer or after market defined templates may be provided to assist the user in configuring the input/output system. The user, for instance, could move graphical objects, such as icons, around to where he or she wants them to be. He or she could put in or remove graphics. He or she could add a digital tachometer or navigation application, such as one downloaded from an application store over the Internet. He or she could rearrange preferences. For instance, he or she may cause the default configuration on the infotainment or entertainment system to be the radio presets or the navigation. Because the vehicle is web-based, the user can download third party displays from a commercial entity, such as an on line application store, or even trade with friends. He or she could configure programmable hard buttons, such as stereo or radio buttons, so that a selected button that currently causes the radio to scan can be made to trigger the on board navigation application. Users can apply software-based skins, such as wall paper, that are decorative ways to add personal style to the vehicle. Users can add functionality to the vehicle. For example, he or she can download, over the Internet, media, such as digital movies from an on line rental service, such as Netflix, and digital games to the vehicle memory. He or she can customize vehicle performance, such as by tuning the vehicle through the remote connection. For instance, if the user moves the vehicle to a sport mode, shifting points would be altered and, if the user moves the vehicle into economy mode, cylinders could be disabled at different speeds. He or she can connect to obtain and/or run diagnostics of a selected vehicle component. He or she could use the diagnostics to obtain quotes for and/or schedule repair or maintenance operations by selected service personnel. He or she could check states of selected vehicle operations, including whether cabin lights are on or off, whether headlights are on or off, whether windows are up or down, whether the on board alarm is on or off, whether the on board alarm has been triggered, and whether the sun roof is open or closed. The remote node 1500 could then be used to reset the state as desired, e.g., turn cabin lights off, turn headlights off, close windows and/or sunroof, activate alarm, and the like. The user could also set up communication paths and/or modalities for vehicle-generated alarms. Exemplary communication paths and/or modalities, including phone call, instant messaging, emails, and the like.

A hard reset could be performed to reset all vehicle components to factory default settings.

This operation of the remote control module 2040 will be discussed with reference to FIG. 31.

Figure 31:
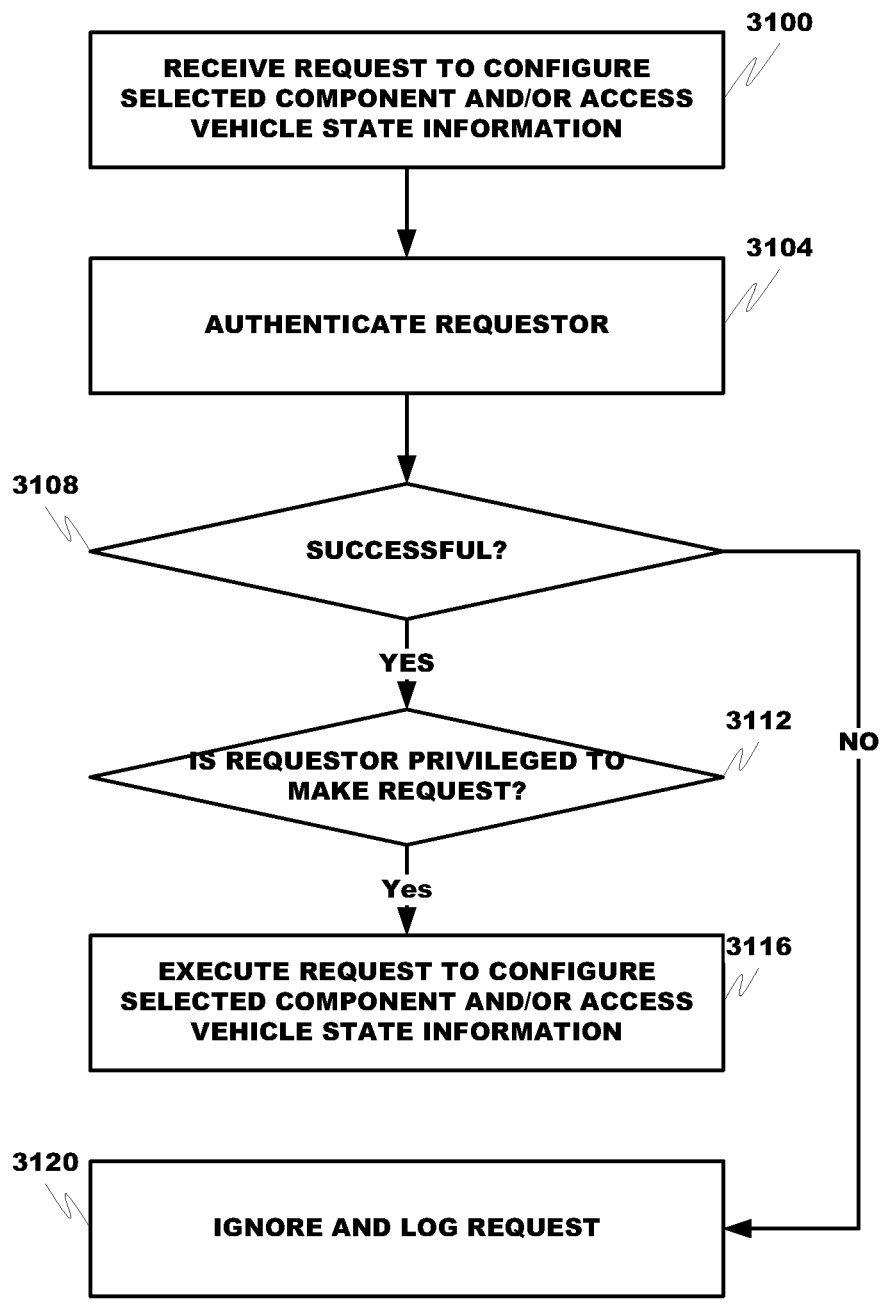
FIG. 31 depicts a flow diagram according to an embodiment.

Referring to FIG. 31, the remote control module 2040, in step 3100, receives a request, via a remote node 1500 and from an owner or family member of the owner, to configure a selected component of the vehicle, such as an on board input/output system, and/or to access vehicle state information.

In step 3104, the remote control module 2040 attempts to authenticate the requestor. User authentication is a way of identifying a user and verifying that the user is allowed to access some restricted service. Authentication can be performed by, for example, by encrypted symmetric or asymmetric key exchange, public and private key cryptography, a secure remote password, multi-factor authentication (e.g., three major factors include verification by something a user knows (such as a password or PIN), something the user has (such as a smart card, ATM card, or a security token), and something the user is (such as the use of biometrics, such as a fingerprint or retina scan)), time-based authentication, a unique digital identity, closed-loop authentication, access control service, and the like.

Control then passes to decision diamond 3108 where the remote control module determines whether authentication was successful. When authentication is successful, the remote control module, in decision diamond 3112, determines whether the requestor is privileged to make the request. In other words, a first requestor is entitled to a first set of privileges with respect to access to vehicle information and/or control of vehicle tasks, functions, and operations while a second requestor is entitled to a different second set of privileges with respect to access to vehicle information and/or control of vehicle tasks, functions, and operations.

When the requestor is entitled to make the request, the remote control module, in step 3116, executes or causes execution of the request in accordance with rules governing what the privilege accorded the requestor, which may override operator and/or other occupant commands.

When the requestor is not entitled to make the request, the remote control module, in step 1320, ignores the request and logs in memory 220 the information surrounding the request, e.g., the identity of the requestor, the time stamp of the request, and the request itself.

This functionality can enable a vehicle to have multiple configurations for a selected vehicle component, such as an input/output system, that is indexed or associated with a specific occupant. Techniques can be used to determine where each occupant is seated in the vehicle, map the identified occupant to the set of data structures correlating each occupant with selected vehicle component configuration and configuring the respective input/output system accordingly. Thus, the vehicle can have plural differently configured input/output systems at any one time. When the selected component is a component other than an input/output system, the particular configuration of the selected component to be employed is dependent on who the identified operator of the vehicle is.

In addition to the techniques described elsewhere for identifying a vehicle occupant, other techniques that may be employed include ignition keys that are identified uniquely to an occupant, user input such as selection of one or more keys, entry of an identification code or other identity, or biometric data, such as a fingerprint or retinal scan, and login. When the occupant is identified and associated with a particular seating position, the selected component will auto configure.

Operation of Computational Module Selector 2052

Figure 7:
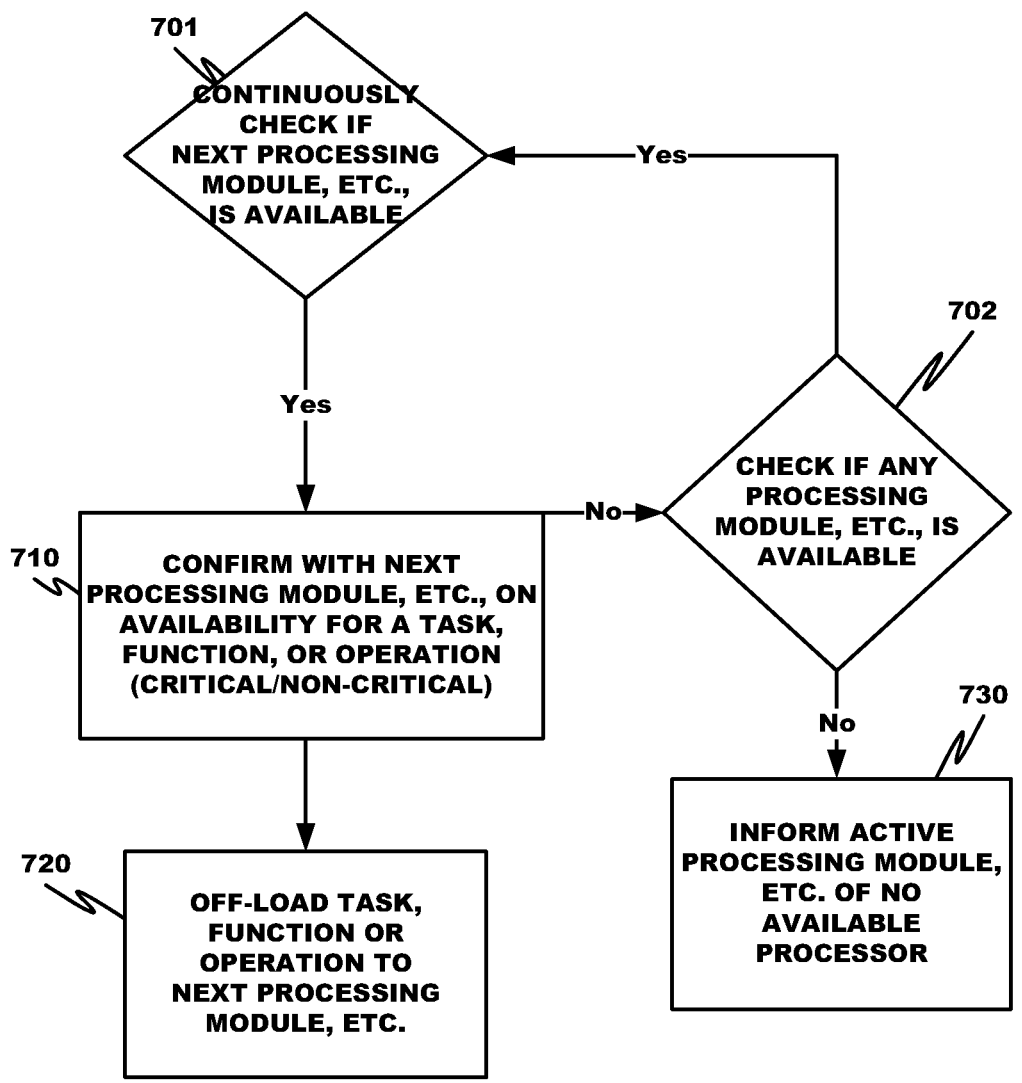
FIG. 7 depicts a flow diagram of a processor off-load method according to an embodiment.

The operation of a processor off-load procedure 700 by computational module selector 2052 one or more processing module(s) will now be discussed with reference to FIG. 7. This operation is particularly beneficial in an active-active configuration but may be used in an active-standby configuration. As discussed with respect to vehicle 300 of FIG. 3, some configurations of expansion modules 290A-C may require processor off-load to share processing functions of tasks among a number of expansion modules in a common host processing module 124 or across different processing modules 124. For example, a first expansion module 290A and/or host processing module 124 may be specialized for critical functions while a different second expansion module 290B and/or host processing module 124 is specialized for non-critical functions. In an event where the first expansion module 290A and/or its host processing module 124 loses some processing power, the first expansion module 290A and/or its host processing module 124 may be able to off-load some critical function to second expansion module 290B and/or its host processing module 124.

In step 701, the method continuously checks if a next processing module, expansion module, and/or external computational device(s) 1532 (in wireless communication with the network controller 1528 via the gateway/firewall 1512) is available with excess processing power. If a next processing module, expansion module, and/or external computational device(s) 1532 is not available, the method will check at some time interval later to see if a new processing module, expansion module, and/or external computational device(s) 1532 would have a change in a number of available and/or unavailable processing power units and/or bandwidth. Other stimuli for this step 701 include a user request to initiate execution of an application, notification of a processing resource having unused bandwidth below a selected threshold, notification of a processing resource having used bandwidth above a selected threshold, a power level of a processing resource falling below a selected threshold, notification of a processing resource having an operational error, malfunction, or outage, and the like.

If a next processing module, expansion module, and/or external computational device(s) 1532 is available, the method confirms with the next processing module, expansion module, and/or external computational device(s) 1532 on its available processing power units and/or bandwidth for a task 710. Other factors considered in determining whether a selected processing module, expansion module, and/or external computational device is available include not only the processing resources available but also the application and operating system requirements as compared to the capabilities of the selected processing module, expansion module, and/or external computational device and power level in the selected processing module, expansion module, and/or external computational device.

In one configuration, processing module, expansion module, and/or external computational device(s) 1532 may be distinguished depending on the type of processing needed. For example, a critical function might not be suitable for a processing module that deals only with non-critical functions and vice versa due to safety, security, or other concerns. In other configurations, a critical function might look for a processing module that is tasked with a disproportionally high non-critical function load to balance the processing load.

If the selected processing module, expansion module, and/or external computational device(s) 1532 is available to process a given task, function or operation 710, the task is off-loaded to the selected processing module, expansion module, and/or external computational device(s) 1532.

If the selected processing module, expansion module, and/or external computational device(s) 1532 is not available to process a given task, function or operation 710, the procedure continues to check if any other processing module, expansion module, and/or external computational device(s) 1532 is available 702. If there is a different processing module, expansion module, and/or external computational device(s) 1532 available, the method returns to step 701.

If there is no other processing module, expansion module, and/or external computational device(s) 1532 available, the method informs the active processing module, expansion module, and/or external computational device(s) 1532 of no available offload capacity 730. In one configuration, the active processing module may decide to drop the task that it is unable to handle. The active processing module, expansion module, and/or external computational device(s) 1532 may also decide to return to step 701 to continue to check for a next available processing module, expansion module, and/or external computational device(s) 1532.

Figure 23:
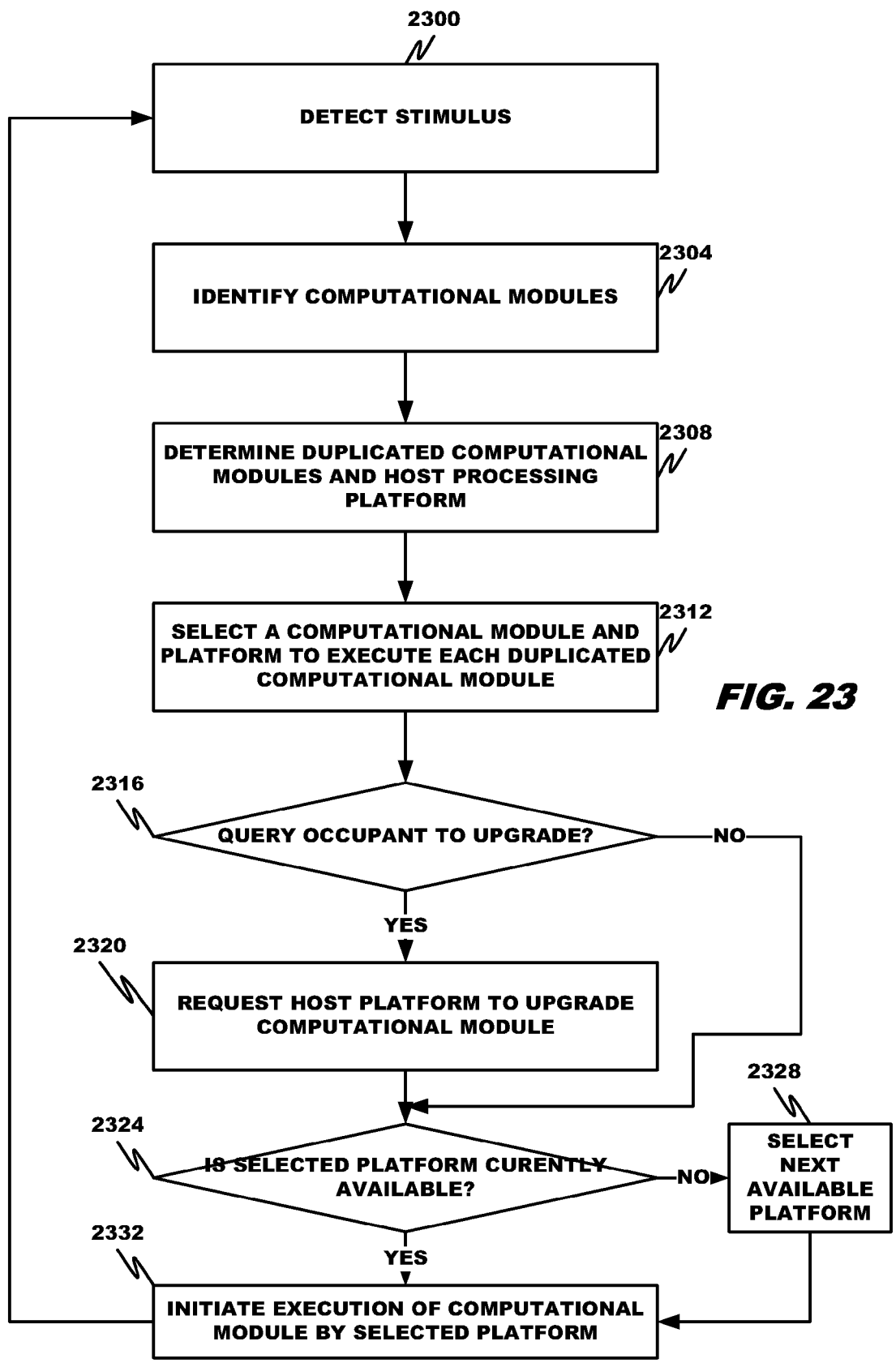
FIG. 23 depicts a flow diagram according to an embodiment.

A further set of operations for the computational module selector 2052 will now be discussed with reference to FIG. 23. This set of operations identifies, for a selected computational module, such as an expansion module, software application, or other computational module, which processing modules or external computational device(s) 1532 contain the selected computational module for purposes of computational module selection. While the prior flow chart depicts a method to balance processing load amongst plural processing devices, the present flow chart selects which duplicative computational module should perform a request by a user.

In step 2300, the computational module selector 2052 detects a stimulus. Exemplary stimuli include a user or operator request to initiate a computational module and/or perform a selected task, function, or operation, an interrupt based on a passage of a predetermined time, installation of a computational module, a request by a different user to use a platform currently executing the computational module, notification of a processing resource having unused bandwidth below a selected threshold, notification of a processing resource having used bandwidth above a selected threshold, a power level of a processing resource falling below a selected threshold, notification of a processing resource having an operational error, malfunction, or outage, and the like.

In step 2304, the computational module selector 2052, in step 2308, determines duplicated computational modules and the host processing platform(s) therefore. Host processing platforms can include a processing module, expansion module, and/or external computational device(s) 1532. Duplication may be for a specific computational device (e.g., from a common vendor and commonly named) or for a common type of computational device. For example, duplication may be determined for the differing versions of automotive navigation system applications GPS Drive™ by MotionX™, Garmin GPS™, Magellan GPS™, Tomtom GPS™, and other SPS systems or for all navigation applications generally regardless of vendor, application identity, or version.

In step 2312, the computational module selector 2052 selects a computational module and platform to execute each duplicated computational module. For example, if an occupant requests, by an input/output system of the vehicle, a game or multimedia application and if different versions of the game or multimedia application are on a processing module 124 and external computational device(s) 1532, the computational module selector 2052 can select the most recent version of the game or multimedia application and host platform containing same, regardless of whether the host platform is a processing module or external computational device 1532 currently in communication with a processing module and by what device, whether an input/output system or user interface of the external computational device 1532 receiving the request. If the request were to be received by an input/output system 1600 to initiate a game and the most recent version of the game were located on a processing module, the processing module would be selected to execute the game and output would be provided to an occupant by the corresponding input/output system 1600. If the request were to be received by an input/output system 1600 to initiate a game and the most recent version of the game were located on an external computational device 1532, the external computational device 1532 would be selected to execute the game and output would be provided to processing module for presentation to an occupant by the occupant's input/output system 1600. If the request were to be received by an external computational device 1532 to initiate a game and the most recent version of the game were located on a processing module, the processing module would be selected to execute the game and output would be provided to an occupant by the external computational device 1532. If the request were to be received by external computational device 1532 to initiate a game and the most recent version of the game were located on the external computational device 1532, the external computational device 1532 would be selected to execute the game and output would be provided to processing module for presentation to an occupant by the external computational device 1532.

In decision diamond 2316, the processing module, or external computational device 1532, by the user interface receiving the stimulus, whether an input/output system or the user interface of the external computational device 1532, queries the user whether or not the older versions of the computational module should be updated to the newer locally available or newest remotely available version.

If no or a negative response is received, the computational module selector 2352 proceeds to decision diamond 2324.

If a positive response is received, the computational module selector 2052, in step 2320, requests the host platform to upgrade the computational module.

In decision diamond 2324, the computational module selector 2052 determines whether the selected platform is currently available to execute the computational module. The selected platform may currently be executing other computational modules and have insufficient available processing resources for execution. The computational module selector 2052, in that event, would attempt to off load some of the processing to another platform to free up sufficient processing resources for execution. In other words, the computational module selector 2052 would perform processing load balancing to more optimally use processing resources. A user may currently be using the selected platform, such as engaged in a call if the selected platform is a cellular phone or watching multimedia content. The computational module selector 2052 would determine if the platform can request the user for permission to use the platform for processing the computational module. When the user is on a call, such a request cannot be made. If a request can be made, the user is requested. The platform is only deemed to be available when the user provides input indicating availability.

When the platform is not available, the computational module selector 2052 in step 2328 selects a next available platform even though the platform may contain an older version of the computational module.

When the selected module is currently available or when the computational module selector 2052 selects a different platform in step 2328, the computational module selector in step 2328, initiates execution, by the selected platform, of the computational module.

Operation of Network Controller 1528

Figure 24:
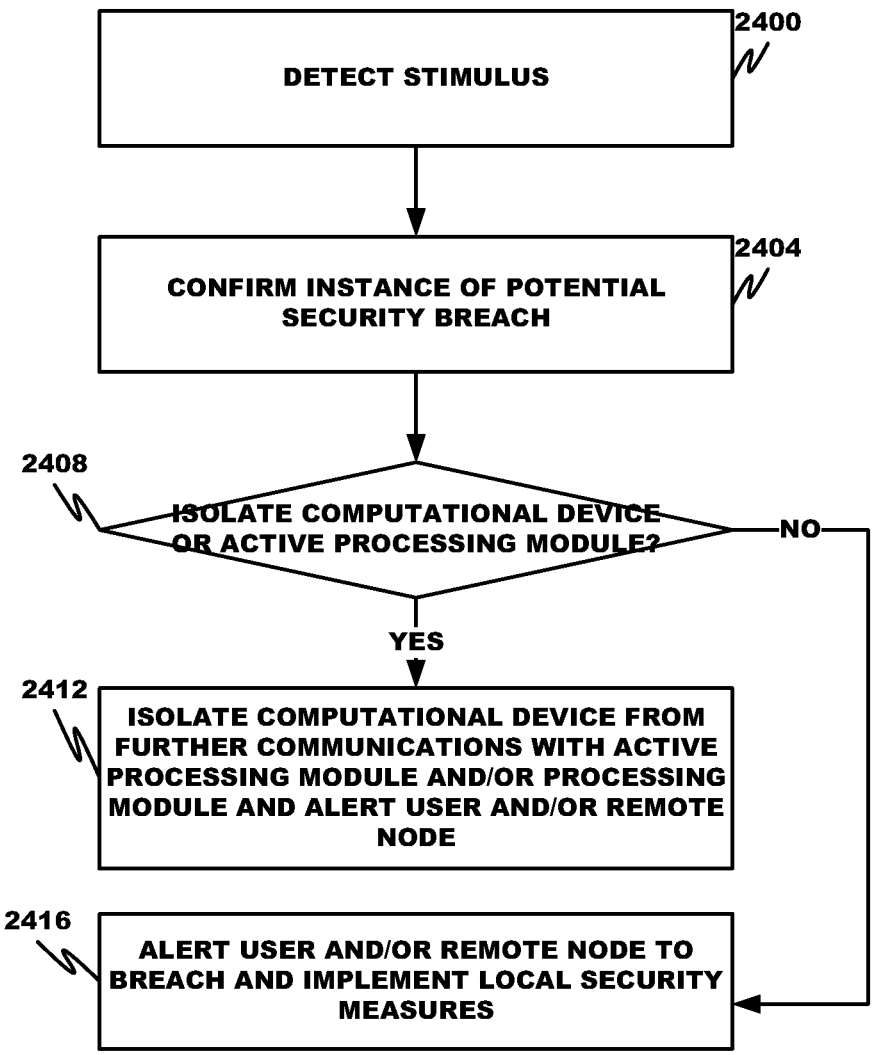
FIG. 24 depicts a flow diagram according to an embodiment.

FIG. 24 depicts another operation of the network controller 1528. As noted, security for cyber attacks is important for an Internet-enabled vehicle. Drivers are accessing data from Internet service providers via smart phone, tablet computer, and/or on board or embedded technologies as well as utilizing hands-free communication technology to send and receive phone calls and text messages. Automotive manufacturers are sending and receiving data based on electronic sensor readings and event data recording. Due to the potentially dire consequences of a security breach event on on-board processing module operation, rigorous security measures should be deployed. While the vehicular network can employ passive techniques, such as configuration of access restrictions in access points (such as encryption, checks on MAC addresses, disabling ESSID broadcasting, isolation of the vehicular network by the firewall and gateway, hiding the SSID (Service Set Identifier), MAC ID filtering (allowing access from know, pre-approved MAC addresses, static IP addressing, IEEE 802.11, 802.11i, and/or 802.1x security, use of the wired equivalent privacy encryption, TKIP, EAP, LEAP, PEAP, WPAv 1, and/or WPAv2 protocols, end-to-end encryption (in one or more of 2, 3, and/or application layer), and RF shielding substantially surrounding the interior of the vehicle (to attenuate signals and prevent wireless signals from propagating outside the vehicle), active techniques may also be employed. Communications with external computational devices 1532 can be channeled through the gateway/firewall 1512.

One active technique is depicted in FIG. 24.

In step 2400, the network controller 1528 detects a stimulus, such as an instance of a virus, malware, unauthorized access, misuse, modification, denial-of-service attack, spoofing, man-in-the-middle attack, ARP poisoning, smurf attack, buffer overflow, heap overflow, format string attack, SQL injection, identity theft (or MAC spoofing), network injection, caffe latte attack, or denial of a computer network and/or network-accessible resource. The stimulus may be a warning signal received by the network controller 1528 from the gateway/firewall 1512, a honeypot (which is a decoy network-assistant resource to provide network surveillance and early-warning tool, a network node, mapping a template corresponding to a specific attack type to received signals, a network probe, and the like.

In step 2404, the network controller 1528 attempts to confirm the instance of potential security breach event. This can be done by reviewing historical behavior, such as shown by communication logs (containing signal description (e.g., type, source, destination, protocol, and payload type) and signal receipt timestamps) not only for the current node but also for other nodes and comparing the behavior to templates characteristic of differing types of attacks and/or applying rules to the historical behavior. The security breach event details, signal description (e.g., type, source, destination, protocol, and payload type) and signal receipt timestamps), are recorded in memory 220 and firewall settings, including whitelists and blacklists, are updated.

In decision diamond 2408, the network controller 1528 determines whether or not the computational devices impacted or potentially impacted by the security breach event can be isolated from other vehicular network components or whether the active processing module can be isolated from other non-critical computational components. This can depend, for example, on whether the affected computational component is physically and/or logically within or internal and/or external to a Dimilitarized Zone ("DMZ") or perimeter network. As will be appreciated, a DMZ is a physical or logical subnetwork, within the vehicular wireless network, that contains and exposes the network's external-facing services to a larger untrusted network, usually the Internet. The purpose of a DMZ is to add an additional layer of security to the vehicular wireless network; that is, an external attacker only has access to equipment in the DMZ, rather than any other part of the network. The DMZ typically includes services, such as Web servers, mail servers, FTP servers, and voice mail servers. For an external computational device 1532 (outside the DMZ), such as a tablet computer, smart phone, laptop computer, personal digital assistant, and the like, and/or device within the DMZ isolation is possible simply by denying vehicular wireless network access or access, by a component of the vehicular wireless network, to the external computational device 1532. For components in the vehicular wireless network, communications to and from the affected components, which normally do not pass through the gateway/firewall, can be redirected through and filtered by the gateway/firewall or, depending on the criticality of the affected component(s), such communications can be blocked. For the active processing module 124, non-critical communications to and from other non-critical computational components, which normally do not pass through the gateway/firewall, can be redirected through and filtered by the gateway/firewall before being provided to the active processing module or, depending on the criticality of the communication(s), such communications can be blocked. Critical communications, or communications with critical components, typically cannot be delayed by firewall processing. In one variation, a critical communication security mechanism is activated for the components physically and/or logically within the vehicular wireless network and internal to the DMZ when a security breach event is detected. The security mechanism can include, for example, one or more of encrypting access restrictions in critical components and the active processing module (such as encryption, checks on MAC addresses, disabling ESSID broadcasting, hiding the SSID (Service Set Identifier), MAC ID filtering (allowing access from known pre-approved MAC addresses, static IP addressing, IEEE 802.11, 802.11i, and/or 802.1x security, use of wired equivalent privacy encryption, TKIP, EAP, LEAP, PEAP, WPAv 1, and/or WPAv2 protocols, and end-to-end encryption (in one or more of 2, 3, and/or application layer(s))).

When isolation is possible, the network controller 1528, in step 2412, isolates the affected computational device(s) from further communications with or filters communications with the active processing module 124 or the active processing module from further communications with the affected computational component(s) and alerts the user and/or a remote node 1500 of the security breach event and details regarding it.

When isolation is not possible, the network controller 1528 alerts the user and/or a remote node 1500 of the security breach event and details regarding it. The critical security mechanism may be activated to protect the critical components and active processing module.

Operation of Network Selector 2036

Figure 10:
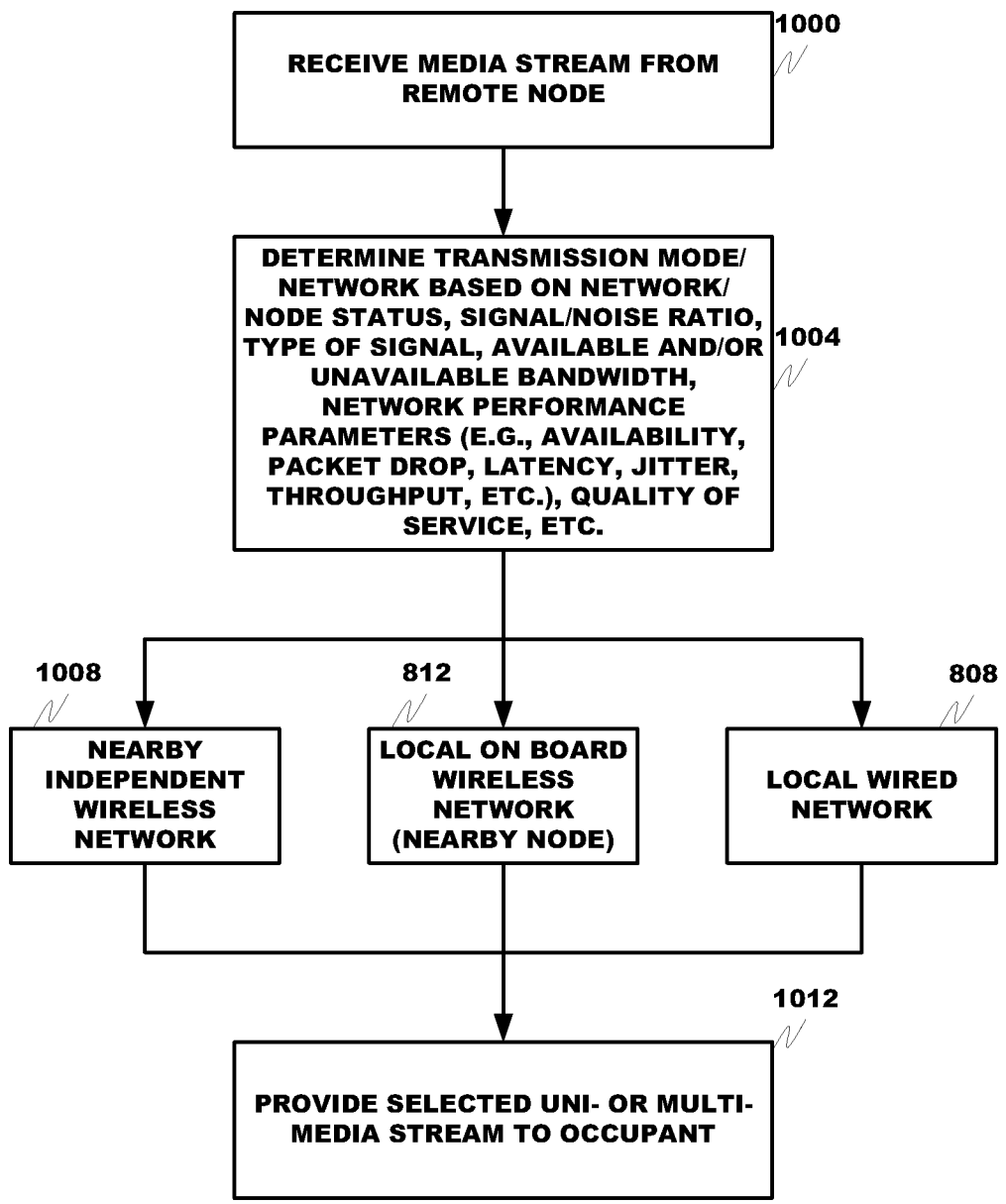
FIG. 10 depicts a flow diagram according to an embodiment.
Figure 11:
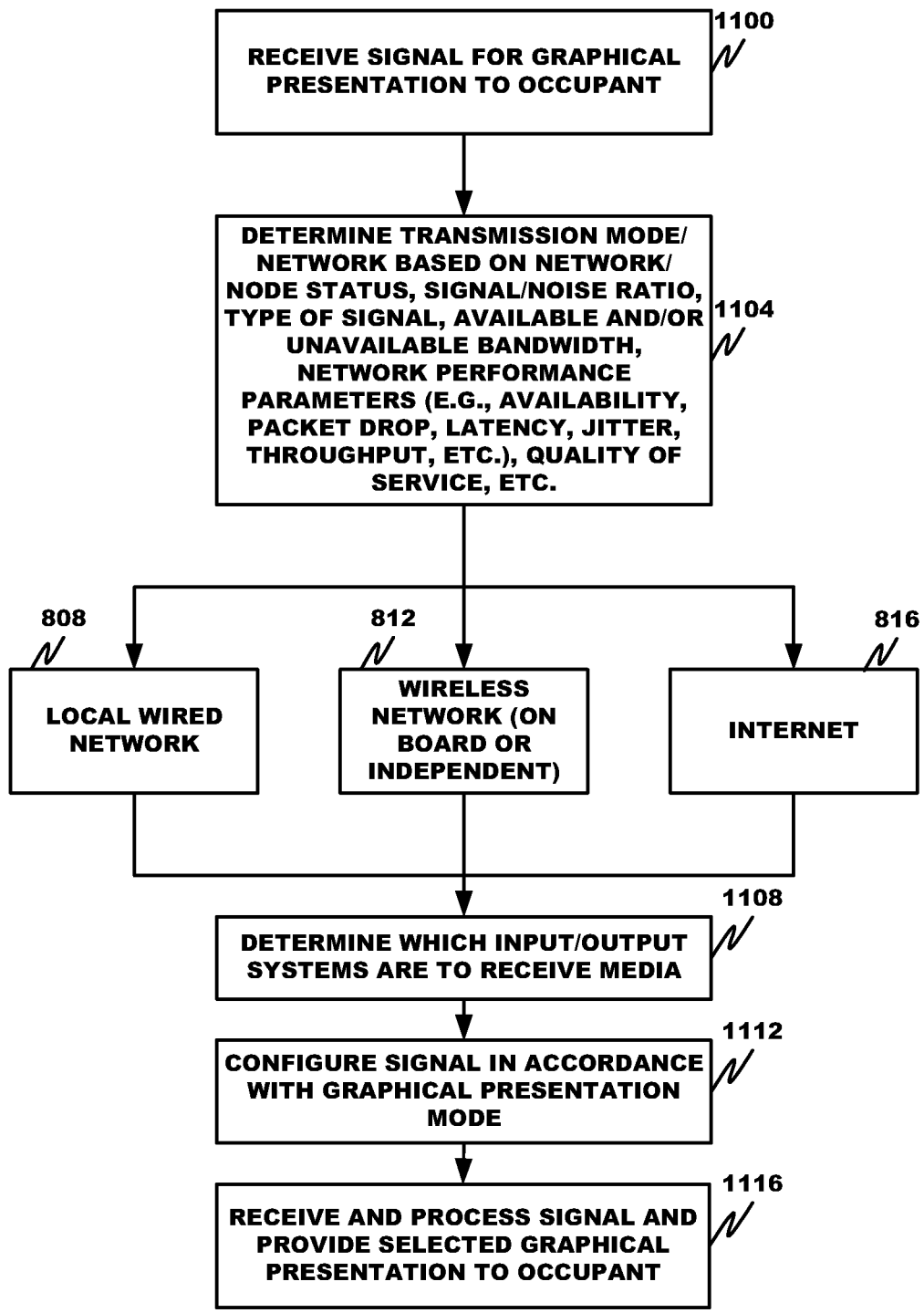
FIG. 11 depicts a flow diagram according to an embodiment.

The operation of the network selector 2036, a subcomponent of the network controller 1528, will now be discussed with reference to FIGS. 8 and 10-11.

Figure 8:
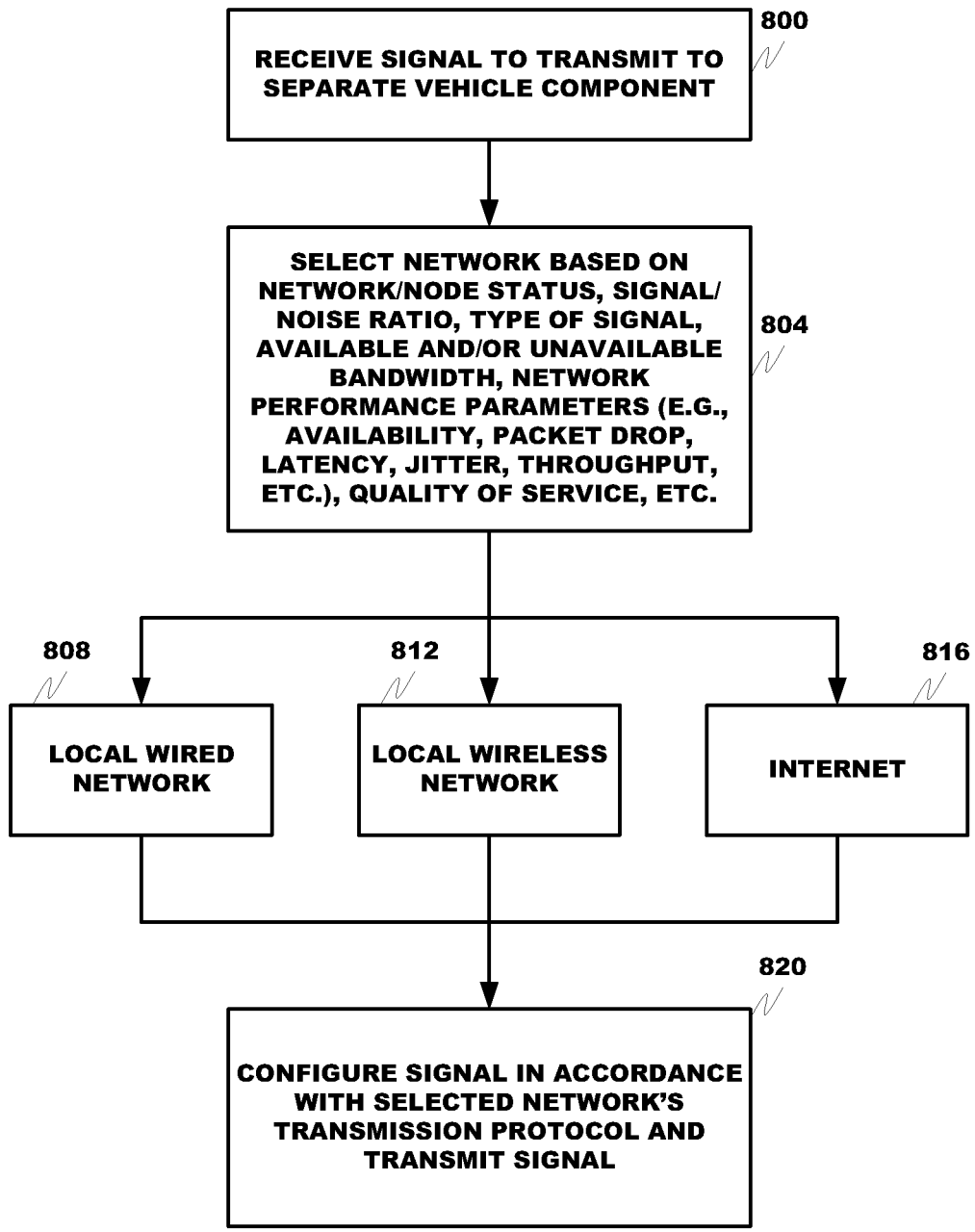
FIG. 8 depicts a flow diagram according to an embodiment.

Referring to FIG. 8, an active processing module 124, in step 800, receives a signal to transmit to a separate vehicle component. The signal can be, for example, from any on board computational component, including an on board sensor 1516 (including those discussed above), a critical or non-critical system controller 2012 or 2016, an on board sensor monitor 2020, the displayed object movement module 2024, the diagnostic module 2028, the media filter 2032, the remote control module 2040, the installation supervisor 2044, the multimedia control module 2048, the computational module selector 2052, the media controller 1524, the gateway/firewall 1512, another processing module 124, the transceiver 1508, an input/output system 1520, a network controller 1528, and/or an external computational device 1532.

The network selector 2036, in step 804, selects a network compatible with the type and/or required format of the signal, such as one or more of local wired network 808, local wireless network 812, and/or the internet 816, to deliver the signal to a selected local or remote endpoint, including those set forth in the prior paragraph. The selection is based on one or more factors, including a type, urgency, importance and/or requirements of the signal (e.g., whether the signal contains an urgent flag or other urgency indicator, a source of the signal (such as from an on-board sensor or sensor monitor, a critical component, a non-critical component, and the like), a type of signal payload (such as whether the signal contains multimedia), transmission and/or bandwidth requirements for the signal (e.g., requisite maximum latency, packet loss, jitter, and/or transmission rate, transport protocol, quality of service, and the like)), an operational status (e.g., operational or nonoperational) of each of the compatible networks, an operational status of an intermediate node on the compatible networks, a signal/noise ratio over each of the compatible networks, available and/or unavailable bandwidth for each of the compatible networks, current compatible network performance parameters (e.g., packet drop, latency, jitter, throughput, quality of service, availability, bandwidth utilization, error rate, delay, and the like), and other factors influencing signal quality, reliability, and/or transmission speed.

Network and node performance parameters and characteristics can be collected by any number of techniques. One technique uses the Simple Network Management Protocol (SNMP), which is a protocol for sending and transmitting network performance information. Network performance monitoring tools vary from simple one device applications to a complex hierarchical system. These systems employ a variety of monitoring techniques. Some systems use passive monitoring to gather information about network traffic while others actively poll network devices to gather network performance data. Exemplary network performance monitoring tools include packet sniffers, flow monitors, and application monitors. Flow monitoring aggregates network traffic based on individual connections, users, protocols, or applications. The network selector can obtain information regarding network and node performance by accessing a node's management information base (MIB). A MIB is a database used to store management information in networks. MIBs are used by network management systems to identify network data objects that are stored, retrieved and set by the system. A MIB uses a hierarchical tree structure to store an extensible collection of data. A subset of Abstract Syntax Notation One (ASN.1) is used to specify an object. The network selector can be configured as a network management system, which includes a centralized network management station and management agents running on network devices. Using a management protocol, the management station polls agents distributed throughout the network, such as in network nodes, for information about the network devices. Agents return requested information ranging from bandwidth usage to CPU load. Using this information, the network management system provides performance and error reporting information.

Generally, the network selector 2036 determines the type, urgency, importance and/or requirements of the signal and one or more of the above parameters for each of the compatible networks, compares the signal parameters with the compatible network parameters and selects the compatible network able to currently best satisfy the requisite signal parameters. For example, a signal from a critical component generally is transmitted by a local wired network 808, such as a bus, due to the high signal quality, reliability and/or transmission speed required for the signal. A multimedia signal would generally not be transmitted by a local wired network as it is not commonly incompatible with the signal payload. Such a signal would more typically be transmitted by a local wireless network 812 (e.g., by Bluetooth™ or WiFi™ or a "hot spot") or, if the signal recipient (whether or not an on board component or remote node) has a corresponding IP address, by the internet 816.

In one configuration, the network selector 2036 determines, for each of the plural communication networks, a corresponding one or more of a network status, a node status, a signal/noise ratio, an available and/or unavailable bandwidth, a current performance parameter(s), and a quality of service and selects the selected network based on one or more relative values associated with the corresponding value(s). The network selector can, for example, determine a composite value for each of the plural networks. The composite value is based on one or more of the corresponding one or more of a network status, a node status, a signal/noise ratio, an available and/or unavailable bandwidth, a current performance parameter(s), and a quality of service. The composite value computational algorithm can weight (or hierarchically rank) some of the individual values of network status, node status, signal/noise ratio, available and/or unavailable bandwidth, current performance parameter(s), and quality of service more or higher than others. The composite is used, rather than multiple values, in selecting the selected network.

By way of example, a signal relating to a critical task, function, and/or operation is deemed to have a higher level of importance than a signal relating to a non-critical task, function, and/or operation. The former signal may be transmitted by a low error-rate and low latency network, such as a bus-type network, while the latter signal may be transmitted over a wireless network or even the Internet.

Once the compatible network is selected for signal transmission, the network selector 2036, in step 820, configures or causes to be configured the signal in accordance with the selected network's transmission protocol. For example, when the signal is to be transmitted over a local wireless network 812, the signal payload and/or signal itself would generally be packaged (such as by a protocol stack) in a header and trailer in accordance with an appropriate one of the WiFi™ or Bluetooth™ protocols. By way of further example, when the signal is to be transmitted over the Internet 816, the signal payload and/or signal itself would generally be packaged (such as by a protocol stack) in a header and trailer in accordance with TCP/IP suite of protocols.

The properly configured or formatted signal is then transmitted over the selected compatible network.

A further operation of the network selector 2036 will now be discussed with reference to FIG. 10. In this operation, the network selector 2036 receives a media stream from a remote node 1500, such as a radio or television station or other Web site, and selects an intermediate local network to carry the media stream to an input/output system for presentation to an occupant of the vehicle.

In step 1000, a processing module 124 receives the media stream from the remote node 1500. The media stream packets contain destination information associating the media stream with one or more input/output systems of the vehicle.

In step 1004, the network selector 2036 determines the transmission mode and/or network based on various parameters, including network status, intermediate node status, signal/nose ratio of the network, type and/or source of media, available and/or unavailable bandwidth, network performance parameters (e.g., availability, packet drop, latency, jitter, throughput, etc.), quality of service, and the like. The network selector 2036 selects which of the local on board wireless network 812 (e.g., generated by a on board or portable component within the vehicle), local wired network 808, and nearby independent wireless network 1008 (e.g., generated by a component external to the vehicle) is to carry the media to the destination input/output system(s) of the vehicle.

In step 1012, the media is provided, over the selected network, to the destination input/output system(s).

Operation of Media Controller 1524

A further operation of the network selector 2036 and operations of the media controller 1524 will now be discussed with reference to FIG. 11. In this operation, the network selector 2036 receives a signal, which typically includes a media payload, from a local or remote node and selects an intermediate local compatible network to carry the media stream to an input/output system for presentation to an occupant of the vehicle. Depending on an input/output system mode, the signal is directed by the media controller 1524 only to a subset or to all of the input/output systems. In a dependent mode, common content is provided synchronously to each of the input/output systems while in an independent mode different content is provided to different ones of the input/output systems. While each occupant controls his or her input/output system in independent mode, the operator controls all input/output systems in the dependent mode. This is particularly beneficial for young children as occupants. The operator typically selects which of the modes is in effect in the vehicle at any one time.

In step 1100, the processing module 124 receives a signal for graphical presentation to one or more occupants. The signal typically comprises media as a payload.

In step 1104, the network selector 2036 determines the transmission mode and/or compatible network based on various parameters, including network status, intermediate node status, signal/nose ratio of the network, type and/or source of media, available and/or unavailable bandwidth, network performance parameters (e.g., availability, packet drop, latency, jitter, throughput, etc.), quality of service, and the like. The network selector 2036 selects which of the local on board wireless network 812 (e.g., generated by a on board or portable component within the vehicle), local wired network 808, and Internet 818 is to carry the media to the destination input/output system(s) of the vehicle.

In step 1108, the media controller 1524 determines which of the input/output systems are to receive the media. There are a number of factors that can influence this decision. The first is whether the input/output systems are in dependent or independent mode. The second is whether an applicable law, whether federal, state, provincial, or local, limits the operation of one or more of the input/output systems. The satellite positioning system receiver on board the vehicle can provide, at any time, the precise vehicle position to a processing module. The processing module can use the position coordinates to determine a set of applicable laws and, from the set of applicable laws, determine one or more restrictions on input/output systems of vehicles within that jurisdiction. Restrictions may also be configured by the operator of the vehicle. These legal and operator restrictions are collectively referred to as rule set(s) 1612. For example, exemplary restrictions, or rule sets 1612, include not providing videos to the operator when the vehicle is in gear or moving, banning texting in the vehicle when the vehicle is in gear or moving, and banning cellular calls when the vehicle is in gear or moving. Restrictions may, alternatively, require the media to be presented to the operator and/or occupant in a specific manner. For example, the audio channel of a video may be permitted to be played in the absence of the video channel of the video. A cellular call may be permitted using a hands-free mode but not using a handheld phone.

In step 1112, the media controller 1524 configures and transmits the signal in accordance with the selected network and the restrictions, if any, determined in step 1108. Configuration refers not only to formatting and including the addresses of the input/output systems to receive the signal but also to changing the media payload, such as, for instance, removing video content while leaving audio content.

Upon receipt, the signal is processed by the display and/or audio controllers 1604 and 1608 and presented, by the recipient input/output system and over the corresponding input/output system to the occupant.

Figure 17:
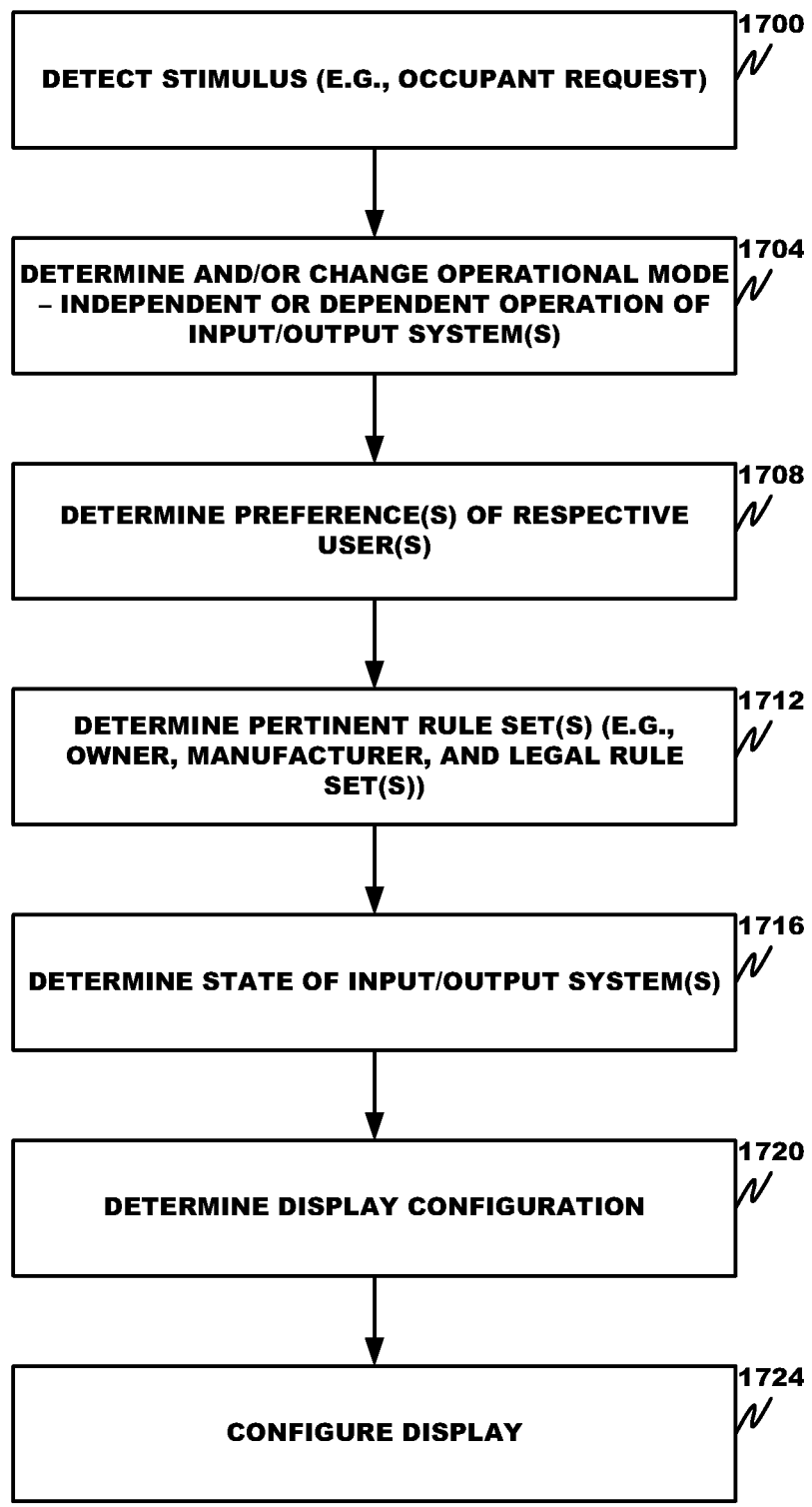
FIG. 17 depicts a flow diagram according to an embodiment.

FIG. 17 depicts another operation of the media controller 1524.

In step 1700, the media controller 1524 detects a stimulus, such as an occupant request to change the operational mode of an input/output system.

In step 1704, the media controller 1524 determines a current operational mode of the input/output system associated with each of the occupants (e.g., independent or dependent operation) and whether the occupant has authority or is privileged to request the change. The mode is changed only when the occupant is authorized or privileged to make the change.

In step 1708, the media controller 1524 determines when the requestor is authorized or privileged to request the operational mode change, the input/output system preferences of each of the occupant user(s) including the requestor.

In step 1712, the media controller 1524 determines when the requestor is authorized or privileged to request the operational mode change, the pertinent rule set(s) 1612. As noted, the rule set(s) 1612 include rules set by the owner or operator of the vehicle, manufacturer of the vehicle, and as a matter of applicable law.

In step 1716, the media controller 1524 determines, when the requestor is authorized or privileged to request the operational mode change, a current state of each of the input/output system(s). The current state includes not only the on/off status and settings but also the content being displayed and operations currently being performed by the occupant for each of the input/output systems.

In step 1720, the media controller 1524 determines when the requestor is authorized or privileged to request the operational mode change, a current display configuration of each of the input/output systems.

In step 1724 and when the requestor is authorized or privileged to request the operational mode change, the media controller 1524 configures or reconfigures each of the input/output systems and the corresponding displays as required by the new operational mode. For example, when the current operational mode is independent and the new operational mode is dependent, the media controller 1524 blocks content currently being provided to each of the subservient input/output displays in favor of providing to each of the subservient input/output displays the content provided to the master input/output display controlled by the requestor or to display content selected by the requestor. When the current operational mode is dependent and the new operational mode is independent, the media controller 1524 continues to provide the content formerly provided to all of the input/output systems to the requestor's input/output system but returns each of the other input/output systems to a default display. From the default display, the respective user can select customized content, which may be the same as or different from the content being provided to the requestor's input/output system.

Figure 18:
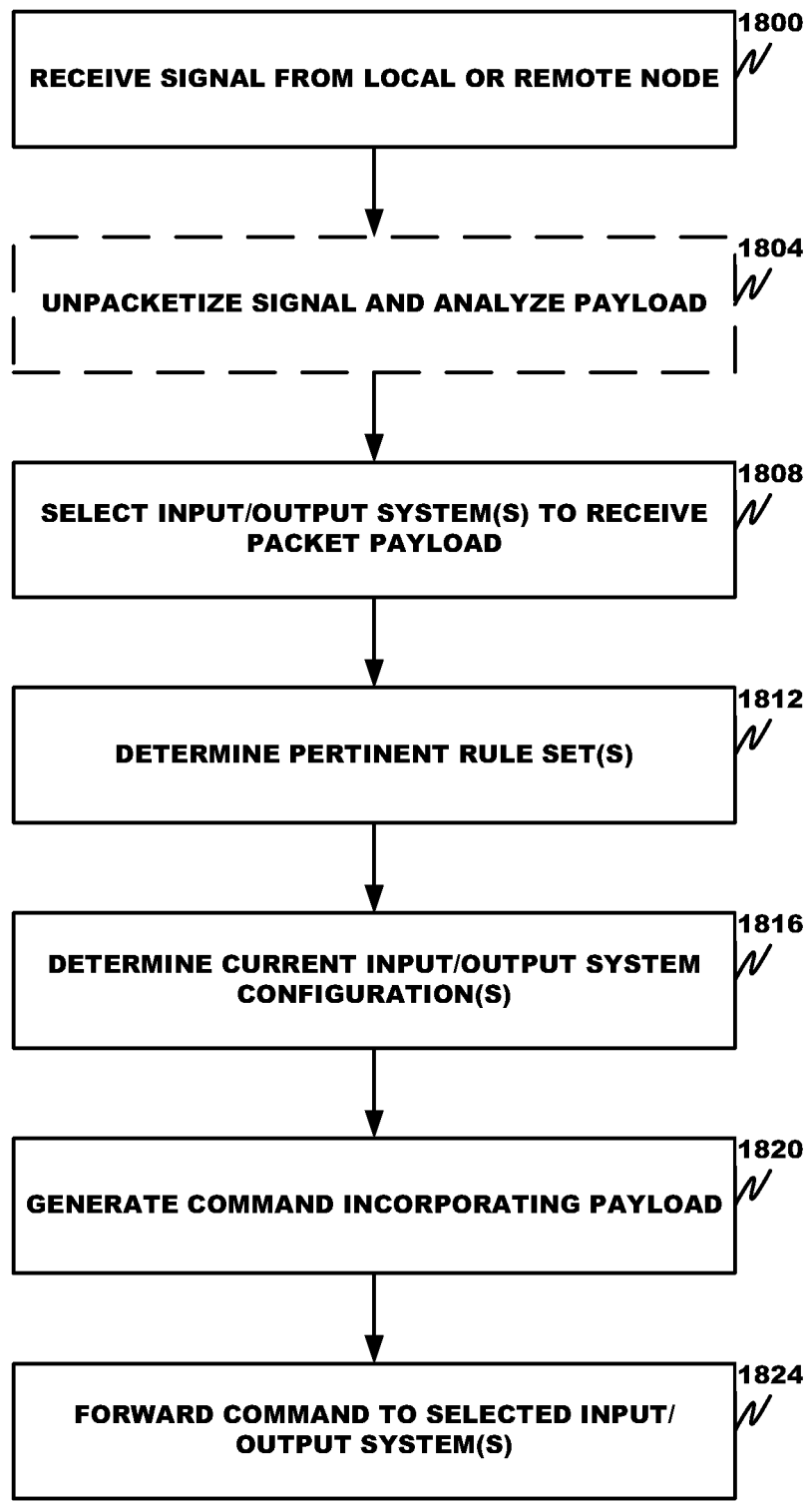
FIG. 18 depicts a flow diagram according to an embodiment.

FIG. 18 depicts another operation of the media controller 1524.

In step 1800, the media controller 1524 receives a signal from a local or remote node 1500. The signal includes, for example, media from a web site or server or communication from a third party.

In optional step 1804, the media controller 1524 unpacketizes the signal and analyzes the payload. This is done, for example, when the destination for the signal and/or type of payload is not clear from the packet header and/or trailer.

In step 1808, the media controller 1524 selects an input/output system to receive the packet payload. This can be based, for example, on the destination information in the header and/or results of the analysis of optional step 1804.

In step 1812, the media controller 1524 determines the applicable rule set 1612 (or set of restrictions), if any, governing the destination input/output system and/or payload type or content.

In step 1816, the media controller 1524 determines a current input/output system configuration(s). The current configuration includes not only settings and capabilities but also whether the input/output system is in the dependent or independent operational mode.

Based on the above information, the media controller 1524 determines whether the payload can be provided to each of the destination input/output systems and, if so, generates a command incorporating the payload and including commands to the input/output system on how to render and display the content. As noted, the payload cannot be provided to a subservient input/output system when in the dependent operational mode and the content differs from that provided to the master input/output system. It cannot be provided when an applicable rule set 1612 prohibits such presentation. It may need to be filtered to remove some of the payload to comply with the applicable rule set 1612.

In step 1824, the command is forwarded to each of the destination input/output systems.

Figure 19:
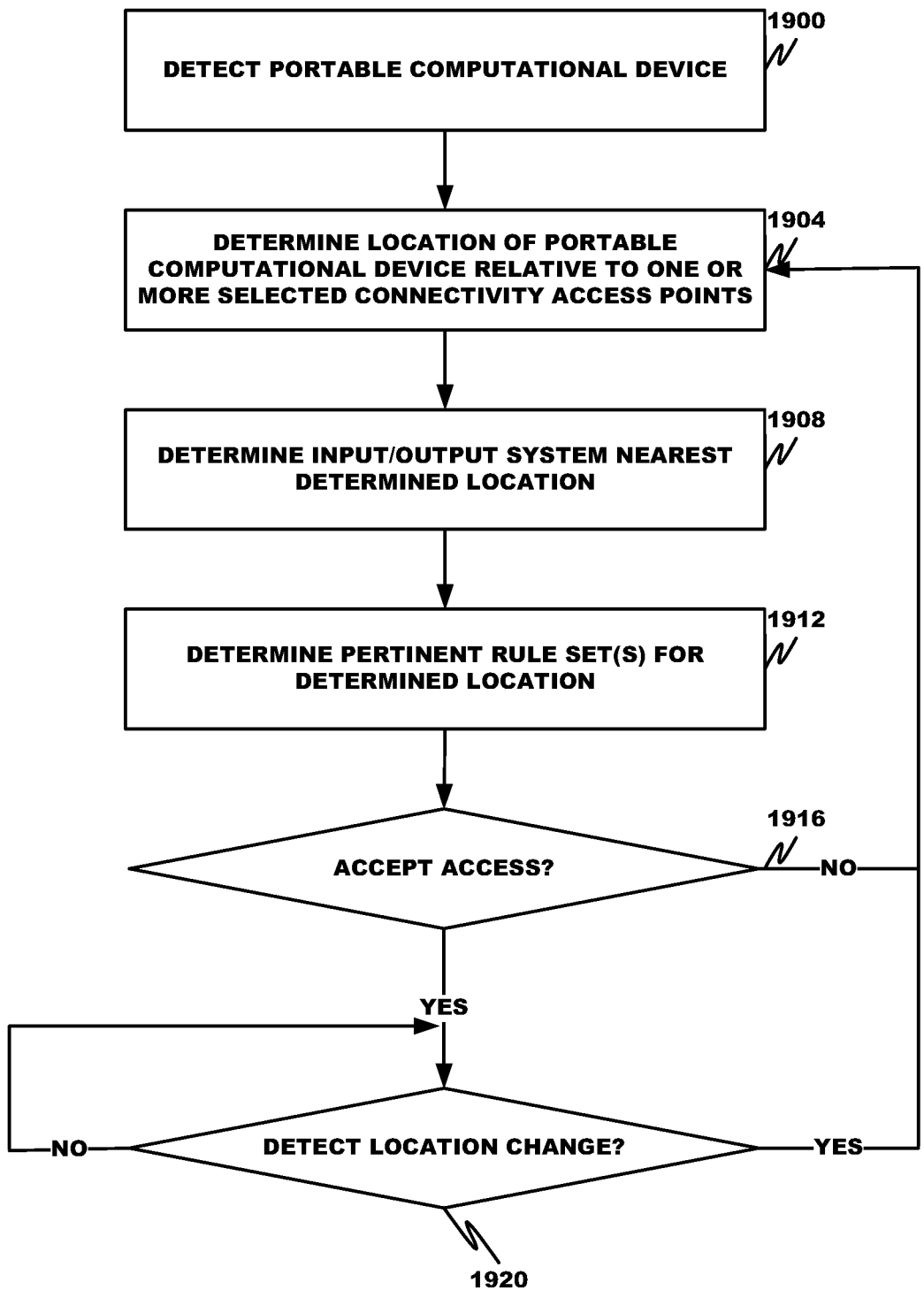
FIG. 19 depicts a flow diagram according to an embodiment.

FIG. 19 depicts another operation of the media controller 1524.

In step 1900, the media controller 1524 determines a location of each external computational device 1532 by a suitable technique. In one example, a signal receiver or transceiver or other connectivity access point, such as a wireless access point, WiFi™ antenna, and the like is placed at each input/output system and/or near each occupant seating location and/or at the operator's seat. The network interface on the network controller can force external computational devices to connect via a specified communication protocol, such as by Bluetooth™ or WiFi™

In step 1904, the media controller 1524 determines a spatial location of each of the external computational devices relative to one or more selected connectivity access points. Continuing the example of the prior paragraph, the media controller 1524 measures, at each connectivity access point, a signal strength for each detected external computational device and, using the measured signal strengths and a suitable algorithm such as triangulation, determines a spatial location of each external computational device and, in step 1908 for each located external computational device, a nearest input/output system and/or occupant seat.

In step 1912, the media controller 1524 determines a pertinent rule set 1612 for the determined location of each external computational device.

In decision diamond 1916, the media controller 1524, based on the pertinent rule set 1612, determines whether or not to accept connectivity access by each of the external computational devices or what limitations to place on such access. In the latter case, specific tasks, functions, and/or operations may be permitted by the pertinent rule set but not others. For example, a cellular phone may be forced into hands free calling mode or prevented from texting or using an instant messaging application or protocol when located at the operator's seat. The rule set 1612 may be configured as a table listing, by vehicle location, an applicable set of legal restrictions and/or permissions and the restrictions or permissions on specific tasks, functions, and/or operations.

When unlimited or limited access is permitted by the rule set 1612, such access is provided by the media controller.

In decision diamond 1920, the media controller 1524 monitors each of the external computational devices for a change in spatial location. In other words, the media controller detects movement of any external computational device from a first connectivity access point or input/output system or seat governed by a first rule set to a second different connectivity access point or input/output system or seat governed by a different rule set. This is so because each connectivity access point or input/output system or seat has a corresponding rule set. When no change detected, decision diamond 1920 is repeated by the media controller substantially continuously or periodically.

When limited or unlimited access is not accepted (decision diamond 1916) or a location change is detected (decision diamond 1920), the media controller returns to step 1904.

Figure 25:
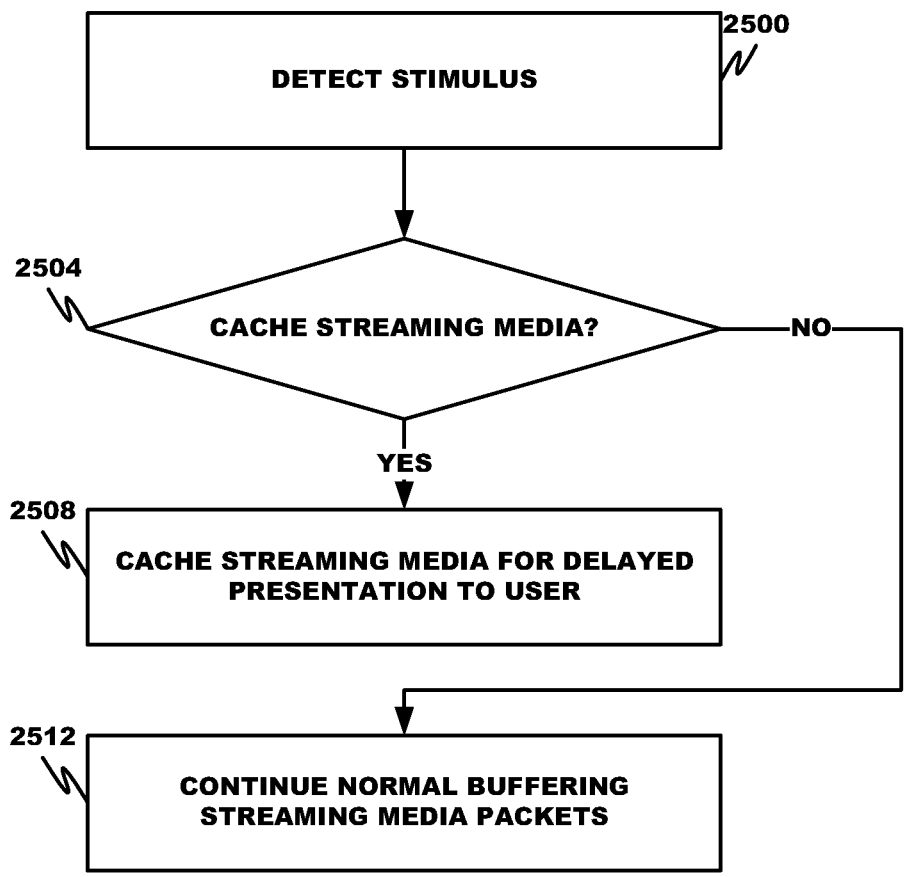
FIG. 25 depicts a flow diagram according to an embodiment.

FIG. 25 depicts a further operation of the media controller 1524. Currently, a particular vehicle radio may have access to XM, AM, FM, and in some cases "streaming audio" capabilities through separate sources (remote node(s) 1500). However, it is necessary to change the input on a console to receive the information and music from a specific source.

It is an aspect of the present disclosure to provide a console capable of compiling and playing music and multimedia information (such as a streaming video) by a general and/or specific category. It is anticipated that the console may adaptively select the source providing the content according to specific rules, such as music type. For example, the console may select the strongest signal, or highest quality of channel. Furthermore the data is collected regardless of the source and represented by icons (independent of source) on the console. These icons may be selected by the user to access content. In one configuration, the icon corresponds to a type of music. The music is band and/or communication mode independent. For example, a "classical music" icon indexes and/or links to all classical music channels, whether AM, FM, streaming, XM, etc.

In some cases, a user may be listening to one station/source while media information is being received and cached from another station/source. In the event that the first signal is lost, the cached media signal or stream may play. Additionally, the system may adaptively "signal surf," for a given category, to determine the best channel to receive the highest or best quality signal (e.g., S/N ratio, stream or radio wave). Moreover, the system may be able to determine that a reception limit is being neared (by pilot signal back or satellite positioning system receiver location) and may push delayed broadcast media information or other content to a vehicle computer to be cached and listened to after coverage is lost.

In step 2500, the media controller 1524 detects a stimulus indicating that caching of media content is to be performed. This may be a request by a user, a media signal falling below a specified signal-noise ratio, the vehicle nearing an estimated broadcast limit or range of the media source (or remote node 1500), a request by a remote node 1500 (or signal source) to forward content to the vehicle for caching for later presentation to the user, a user action requiring the media not to be presented by the vehicle (e.g., the vehicle operation moves from being "parked" to being in gear (or in "drive" or "reverse"), and the like. As will be appreciated, many jurisdictions' laws prohibit displaying media to a driver while a vehicle is in operation.

In decision diamond 2504, the media controller 1524 determines whether or not to cache media. Depending on the stimulus, rules configured by the user or default rules, may cause the stimulus to be ignored. For example, when the request is from a remote node 1500 the media controller 1524 may have a rule denying such SPAM-like requests, may determine that insufficient memory resources are available to cache the content, may determine that the media content or remote node 1500 constitutes a potential security breach event, or may have the remote node 1500 address, identity, or other identifier on a blacklist. When the media is a video, the video may be cached for one input/output system, namely that of the driver, but not for another input/output system, namely that of a passenger.

In step 2508, when caching is to be performed the media controller 1524 commences caching the streaming media for delayed presentation to the user. As will be appreciated, the media controller 1524 can continue normal buffering of streaming media packets.

In step 2512, when caching is not to be performed, the media controller 1524 can continue normal buffering of streaming media packets but does not perform media caching.

Figure 26:
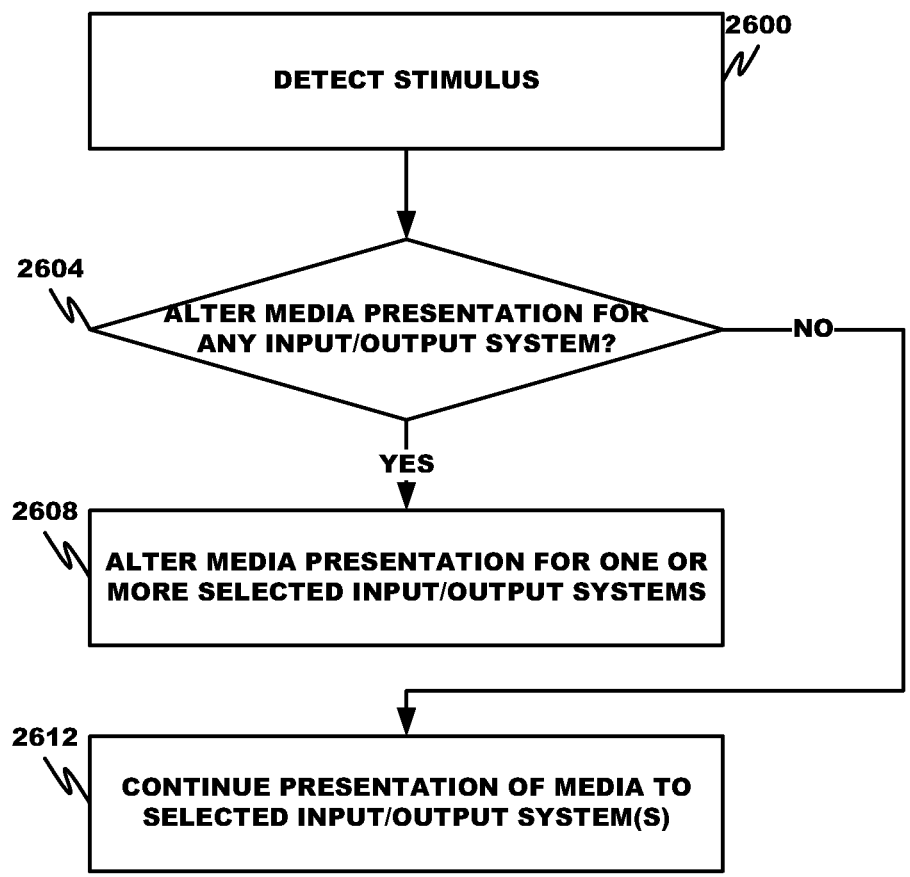
FIG. 26 depicts a flow diagram according to an embodiment.

FIG. 26 depicts a further operation of the media controller 1524. The operation involves conforming media presentation, by input/output system, in a manner comply with a pertinent rule set 1612. For example, instant messages, RSS feeds, Twitter messages, can, in response to a vehicle moving from a parked (non-operational) to an operational (in motion) state, cease displaying this content to the driver and, instead, audibly present the content and message source identifier to the driver, such as reading the source name or address and RSS feeds or Twitter or instant messages or enabling the audio channel for streaming multimedia while disabling the video channel.

In step 2600, the media controller 1524 detects a stimulus indicating that media presentation is to be altered for one or more input/output systems. This may be a request by a user or a change in vehicle state from operational to non-operational or from non-operational to operational (e.g., a user action requiring the media not to be presented by the vehicle (e.g., the vehicle operation moves from being "parked" or a non-operational state to being in gear (or in "drive" or "reverse" or in motion), or an operational state). As will be appreciated, many jurisdictions' laws prohibit displaying media to a driver while a vehicle is in operation.

In decision diamond 2604, the media controller 1524 determines whether or not to alter the media presentation for a selected input/output system. When, for example, the vehicle moves from an operational to a non-operational state, the media presentation for the selected input/output system can revert automatically to a more functional format. For instance, multimedia can have all channels, both audio and video, enabled for presentation, by the selected input/output system to the user. An RSS feed or Twitter or instant message, among others, can revert to text presentation, with automated reading being disabled.

In step 2608, the media presentation is altered, as determined, for one or more selected input/output systems.

In step 2612, media continues to be presented, in an unchanged format, on the selected input/output system.

Operation of Installation Supervisor 2044

Figure 12:
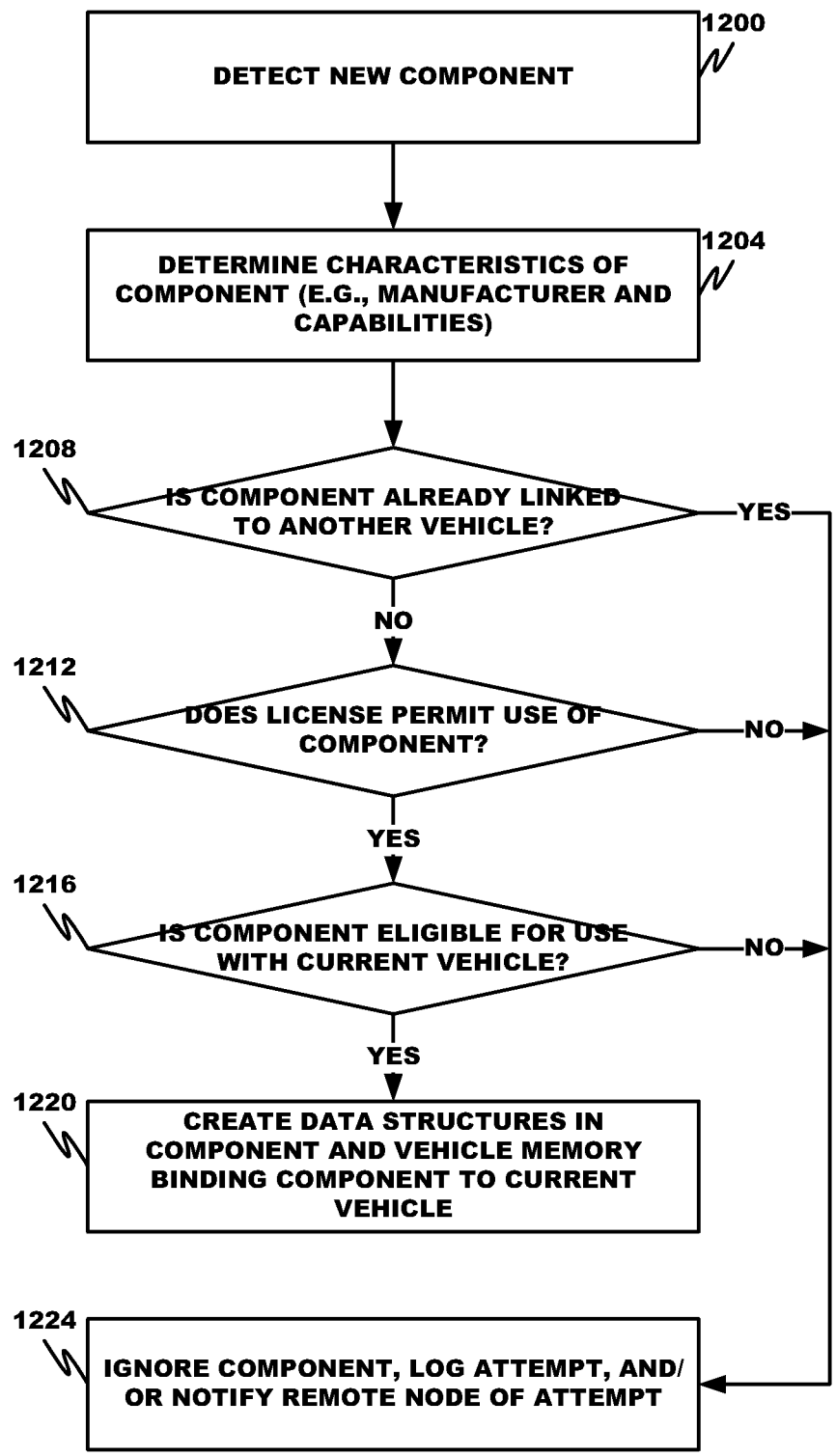
FIG. 12 depicts a flow diagram according to an embodiment.

An operation of the installation supervisor 2044 will now be discussed with reference to FIG. 12. The operation can provide a plug-and-play functionality for automotive components, whether device, hardware and/or software.

In step 1200, the installation supervisor 2044 detects an attempt to install a new computational component in the vehicle. The attempt can be detected by receipt of an installation notification or request from a user or the computational component itself. The computational component can be software, hardware, or a combination thereof. Exemplary computational components include an on board sensor 1516, a media controller 1524, a gateway/firewall 1512, a processing module 124, a network controller 1528, an input/output system 1520, a display and/or audio controller 1604 and/or 1608, an arbitration module 2000, a health check module 2008, a critical system controller 2012, a non-critical system controller 2016, an on board sensor monitor 2020, a displayed object movement module 2024, a diagnostic module 2028, a media filter 2032, a network selector 2036, a remote control module 2040, a computational module selector 2052, an expansion module 290, an application, a plug-in module, and the like.

In step 1204, the installation supervisor 2044 determines the characteristics of the computational component. Exemplary characteristics include manufacturer, model number, serial number, date of manufacturer, and capabilities.

In decision diamond 1208, the installation supervisor 2044 determines whether the component is already linked to another vehicle. This can be done by accessing the memory of the installation component itself to check for a prior installation or accessing the records of the manufacturer via remote node 1500.

When the component has not yet been linked to another vehicle, the installation supervisor 2044, in decision diamond 1212, determines whether the installation is in compliance with licensing restrictions on the use of the computational component. Licensing conditions and/or restrictions can include payment of funds to vendor, use restrictions (e.g., user-based license restrictions (e.g., authorized user, concurrent user, floating user, and user value unit restrictions), capacity-based license restrictions (e.g., install, processor value unit, server and virtual server restrictions), territorial restrictions (e.g., use permitted only in certain countries, states, provinces, and the like), and other license restrictions (e.g., client device (or host vehicle-based restrictions) and resource value unit restrictions)), and other conditions and/or restrictions.

When the component installation is in compliance with applicable license restrictions, the installation supervisor 2044, in decision diamond 1216, determines whether the computational component is eligible for use in the current vehicle. Eligibility is based not only on specifications and capabilities of the computational component but also vehicle manufacturer approval or disapproval of the computational component for vehicles having this particular make, model and year of manufacture.

When the computational component is eligible for use in the current vehicle, the installation supervisor 2044, in step 1220, creates data structures in the memories of the computational component and computational module binding the computational component to the vehicle. This can be done, for example, by creating data structures in the memory of the computational component containing a serial number or vehicle identification number of the vehicle and in the memory 220 of the processing module containing a serial number or other unique identifier for the computational component and a description of the type, make, model, year of manufacture, and date of installation of the computational component.

When any of the following is true, namely the computational component is already linked to another vehicle (decision diamond 1208), the license does not permit the installation of the computational component (decision diamond 1212), and/or the component is ineligible for use with the current vehicle (decision diamond 1216), the installation supervisor 2044, in step 1224, ignores the computational component, and therefore refuses installation of same, logs the attempted installation (including a description of the computational component and time stamp associated with the attempted installation) and/or notifies a remote node 1500 (such as a manufacturer for purposes of warranty invalidation) and/or the operator of the invalid attempt.

Operation of Media Filter 2032

Figure 13:
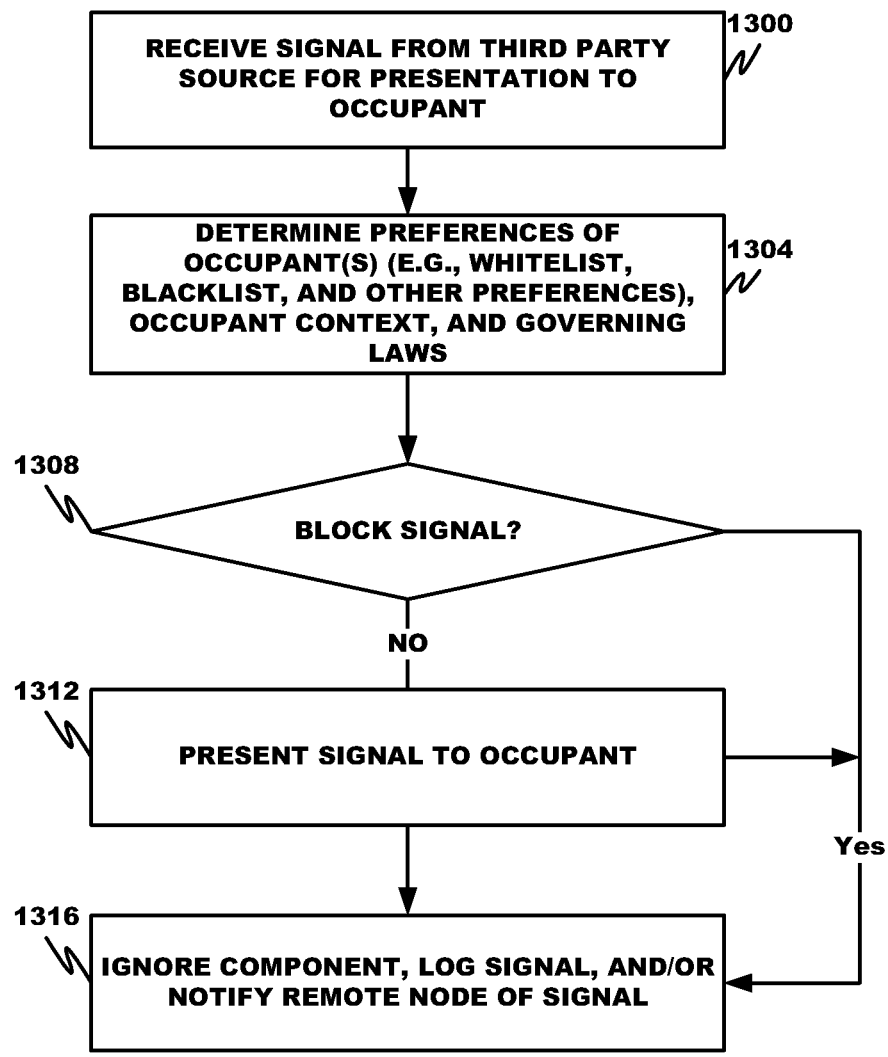
FIG. 13 depicts a flow diagram according to an embodiment.

An operation of the media filter 2032 will be discussed with reference to FIG. 13.

In step 1300, a processing module 124 receives a signal from a third party source, such as a web site or server (in response to web browsing) or a communication from a third party, such as email, text, cellular call, and the like, for presentation to an occupant.

In step 1304, the media filter 2032 determines preferences of the occupant and/or other restrictions. Preferences include, for example, a white or black list (of approved or disapproved message sources respectively), presence of the destination occupant as received from a presence server or service associated with the destination occupant, preferences of or rules relating to the destination occupant as determined by another occupant having privileges to control content presented to the destination occupant (e.g., parental control of content and/or communications presented to a child), context of the destination occupant (e.g., driving the vehicle, engaging in an unrelated higher priority activity on the input/output system associated therewith, etc.), and governing laws (or an applicable rule set 1612).

In decision diamond 1308, the media filter 2032 determines, based on the determined preferences and/or restrictions from step 1304, whether or not to block the signal or alter the payload of the signal to conform with the preferences and/or restrictions.

When the signal is not to be blocked, the media filter 2032 proceeds to step 1312 and presents the signal or its payload to the destination occupant. The signal may be blocked, for example, when it is a call to an operator while the vehicle is in motion (to comply with a state or local law). Electronic SPAM may be blocked.

When the signal is to be blocked, the media filter 2032 proceeds to step 1316 and blocks the signal. The signal may be blocked, for example, when it is a call to an operator while the vehicle is in motion (to comply with a state or local law). Electronic SPAM may be blocked.

Operation of Diagnostic Module 2028

The diagnostic module 2028 queries on board sensors 1516 and/or on board sensor monitor(s) 2020, and/or critical and/or non-critical system controller(s) 2012 and 2016 to determine states of various parts, components, subsystems, tasks, functions, and/or operations of the vehicle. The diagnostic module 2028 can then perform diagnostics using locally stored or remotely stored (at remote node 1500) pre-determined logic to identify faults, malfunctions, or other problems and, optionally, generate repair advice and/or warnings and/or instructions and/or recommendations to the vehicle operator. This diagnosis can also locate and/or determine and/or identify any parts or components required to repair the vehicle, the source and/or source(s) for replacement parts and/or components, identify a nearest and/or preferred service or repair facility or service, provide an estimate of the repair cost at a selected facility and/or comparative estimates at different facilities in proximity to the vehicle's current location, and/or obtain any manufacturer's and/or vendor's update information required to repair or resolve the identified fault, malfunction, or other problem. The diagnostic module 2028 can provide any repair instructions and/or recommendations to the operator, pre-order the replacement parts and/or components, contact the nearest and/or preferred service facility for a repair estimate, contact the nearest and/or preferred service facility to schedule an appointment for the repair or service, and/or forward, optionally at the owner's and/or operator's instructions, the collected information regarding the fault, malfunction, or other problem to a remote node 1500 (specified by the operator and/or owner) for monitoring and/or evaluation. The owner and/or operator can have a default location or select a location for fault, malfunction, or other problem analysis assistance.

Figure 14:
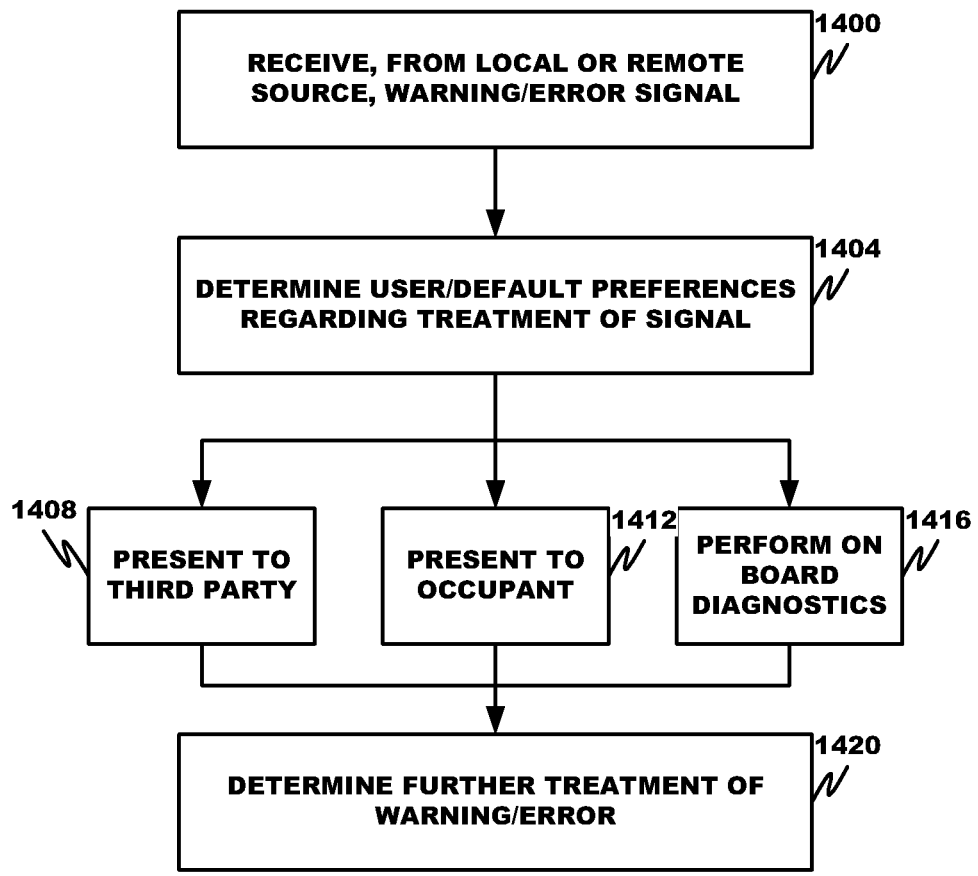
FIG. 14 depicts a flow diagram according to an embodiment.

FIG. 14 depicts an operation of the diagnostic module 2028.

In step 1400, the diagnostic module 2028 receives, from a local or remote source (such as the remote node 1500), a signal warning of an actual or potential malfunction of an on board component, including any of the components discussed above.

In step 1404, the diagnostic module 2028, in step 1404, determines user and/or default preferences regarding treatment of the signal. The various options include one or more of present the signal to a third party such as a manufacturer or servicing entity (option 1408), presenting the signal to an occupant of the vehicle (option 1412), contacting an emergency service provider or first responder (e.g., request tow truck or roadside service provider, contact police, and/or request dispatch of an ambulance), a service facility located in proximity to a current vehicle location, a manufacturer, a replacement part source, and a remotely located diagnostic service to diagnose a cause of the warning and/or error signal and performing on board diagnostics (option 1416) to obtain more diagnostic information regarding the actual or potential malfunction followed by option 1408 or 1412. In one application, the signal is forwarded to a manufacturer or repair service vendor that compares the reported fault and vehicle-specific parameters (e.g., mileage, date of last service, and/or environmental conditions) to the maintenance and/or fault history for the vehicle model and provides, to the vehicle operator, the result of the comparison along with a probability of the diagnosis being correct. The signal can include, for example, a current (SPS or map) location of the vehicle, an identity of the vehicle and/or vehicle owner or occupant, and diagnostic information and/or diagnosed cause of the warning signal. The manufacturer or service vendor also updates its database for the particular model of the vehicle to reflect the reported fault. The manufacturer or service vendor can dispatch an emergency service provider or first responder to the location reported by the vehicle SPS, and/or schedules the workload for the repair shop and pre-orders the required part(s) for the repair shop. The diagnostic module can recommend a source of conduct or action (including those discussed above) for the vehicle operator and, if accepted, execute or cause execution of same.

In step 1420, the diagnostic module 2028 determines a further treatment of the warning or error signal. The determination may be based, for instance, on a command or request received from the third party or occupant or an applicable set of rules and/or policies.

Figure 28:
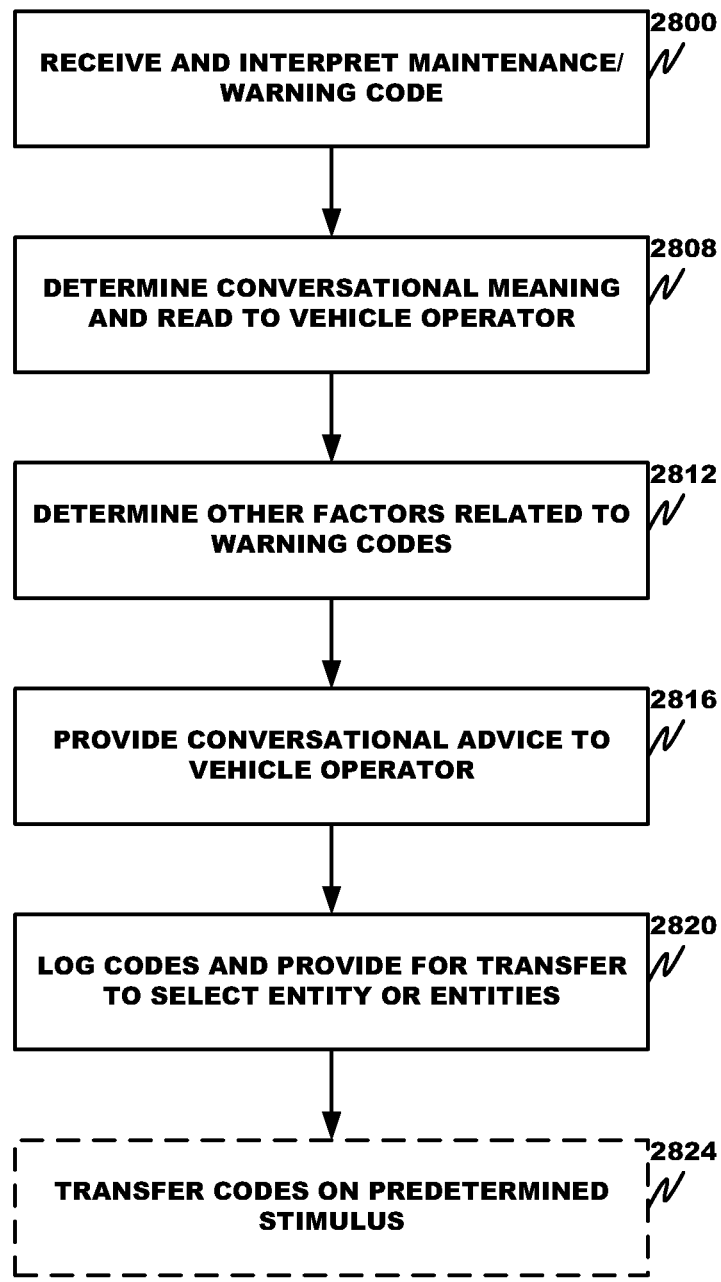
FIG. 28 depicts a flow diagram according to an embodiment.

FIG. 28 depicts another operation of the diagnostic module 2028.

FIG. 28 depicts a vehicle ecosystem capable of providing accurate indications for purposes of service and maintenance in accordance with embodiments of the present disclosure. Currently, vehicles may offer a warning light and/or series of lights to provide information to a user regarding vehicle condition. These lights may have a multitude of meanings that may require further inspection by a mechanic or other qualified individual. In order to interpret and decode the meanings behind a light combination, the user is routinely required to consult the owner's manual, the Internet, or to call the dealer. In some cases, these lights are only maintenance reminders and need not be immediately addressed. However, in other cases, the lights are urgent and require immediate attention.

The present disclosure can provide an Internet enabled car that is capable of transmitting vehicle codes, error code readings, and to remotely diagnose and display these codes to a user and/or a mechanic. This diagnostic information may be performed on-board or remotely. It is anticipated that the information may be accessed according to chosen preferences. Additionally, it is anticipated that based on the type of warning/error code, the system may suggest a recommended course of action. For example, if the error code indicates a severe or catastrophic failure the system may suggest to pull-over, stop the car, and proceed to a safe area away from the automobile.

In some embodiments, the system may provide "conversational" warnings to a user. These warnings and associated codes may also be simultaneously transmitted to a selected garage and/or postponed for approval to transmit to the nearest garage (either wired or wirelessly). In addition, the system may estimate an approximate time to fix (based on past garage fix times, garage inventory, severity of problem, combinations, etc.) and make appropriate suggestions. For example, the system may provide the conversational warning "Please do not be alarmed, your engine is running slightly low on oil; there are four garages in the general area. You have time to get a cup of coffee while you wait; here are three coffee shops in the immediate location" and/or "It appears that the rear left suspension is malfunctioning and the upper strut will need to be replaced. It is noticed that you are greater than 80 miles from home, would you like to book a reservation at a local hotel? There are five hotels in the area rated three stars or above."

Referring to FIG. 28, the diagnostic module 2028, in step 2800, receives and interprets a maintenance and/or system error and/or warning code. Such codes are known in the art of automotive design and generally depend on the automotive and/or component manufacturer. Accordingly, the diagnostic module 2028 will, generally, have a lookup table or other set of data structures to map the code not only to a corresponding condition and/or conversation meaning but also behavioral rule in a rule set. In appropriate applications, the conversational meaning can be further determined based on the condition.

The diagnostic module 2028, in step 2808, provides the conversational meaning, such as audibly and/or visually, to the vehicle operator.

The diagnostic module 2028, in step 2812, determines other factors related to the received code(s). The pertinent rule in the rule set, for example, can cause the diagnostic to query other components potentially impacted by the condition and/or having other data points relevant to the condition. The diagnostic module 2028, in accordance with the pertinent rule, may contact a remote node for additional information relevant to the code, including the conversational advice to be provided to the vehicle operator.

In step 2816, the diagnostic module 2028 provides the conversational advice to the operator. The advice may be interactive in which event the operator would query the diagnostic module 2028 for information not clear from the initially provided conversation meaning and/or advice. A menu-type structure can be used by the diagnostic module to respond to the operator request for further information. Such further information may require the diagnostic module to initiate a contact, on behalf of the operator, with a remote node 1500.

In step 2820, the diagnostic module logs codes, internally and/or provides the codes to a remote node 1500 for logging, and provides for transfer of the operator to a selected entity or entities, such as one or more remote nodes 1500.

In step 2824, the diagnostic module 2028 optionally transfers the codes, on a predetermined stimulus, to a remote node 1500.

Operation of Displayed Object Movement Module 2024

Figure 21:
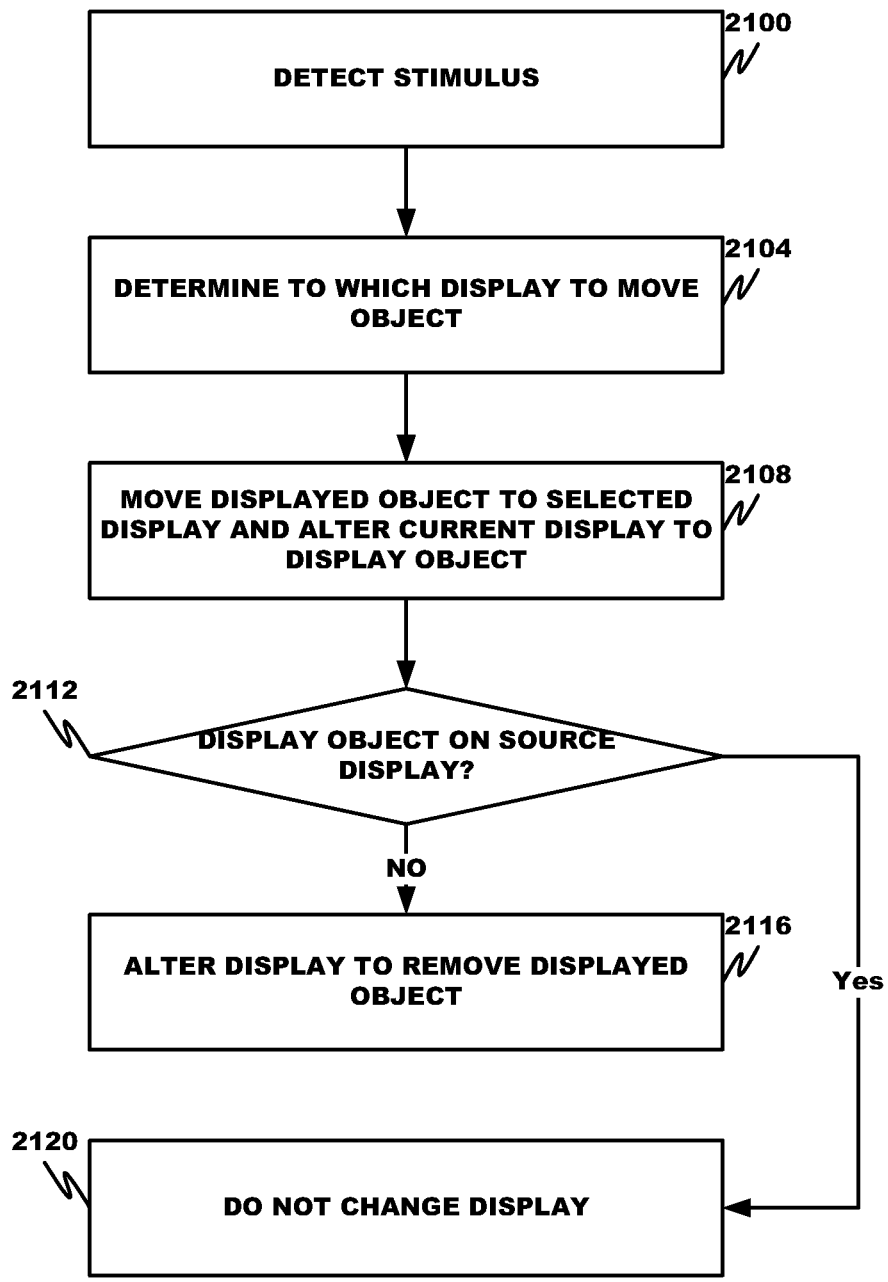
FIG. 21 depicts a flow diagram according to an embodiment.

An operation of the displayed object movement module 2024 will now be discussed with reference to FIGS. 21 and 22. The displayed object movement module 2024 enables a user to share displayed content or other image, in substantial real time and not via a message transmitted by a component located physically outside of the vehicle, with one or more other input/output systems. Typically, the displayed content is simply directed by the media controller to the target display (and/or a computational device associated with the target occupant as discussed in more detail below). The displayed object can be any displayed image, including streaming video, a web page, an icon, a window, an application, other content, and the like.

In step 2100, the displayed object movement module 2024 detects a stimulus. The stimulus can be, for example, receipt of a gesture by a touchscreen display of an input/output system, user selection on a first input/output system of a different second input/output system to which the displayed object is to be moved, and the like.

In step 2104, the displayed object movement module 2024 determines, based on the stimulus, to which input/output system display to move the displayed object.

Figure 22A:
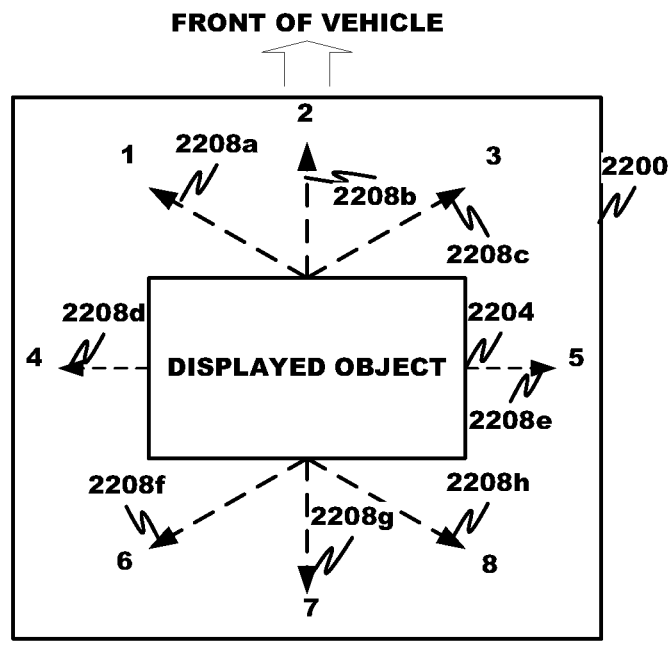
FIGS. 22A-B depict configurations of input/output systems according to an embodiment.

FIG. 22A depicts one technique to determine the destination input/output system(s). Each of the dashed lines 2208a— connecting to the displayed object 2204 in the display 2200 indicates a direction, or vector, along which the displayed object 2204 is to be moved. The displayed object movement module 2024 projects the direction to determine an input/output display intersected by or nearest the projection of the vector. By way of illustration, the first gesture 2208a (if received by an input/output system in a back seat) will cause the displayed object 2204 to move to the driver's input/output system (which corresponds to position "1"), the second gesture 2208b (if received by an input/output system in a back seat) will cause the displayed object 2204 to move to the input/output system positioned in the middle front seating position (which corresponds to position "2"), the third gesture 2208c (if received by an input/output system in a back seat) will cause the displayed object 2204 to move to the input/output system positioned in the right (facing the front of the vehicle) front seating position (which corresponds to position "3"), the fourth gesture 2208d (if received by an input/output system in either a front or back seat) will cause the displayed object 2204 to move to the left adjacent input/output system (relative to the gesture receiving input/output system) (which corresponds to position "4"), the fifth gesture 2208e (if received by an input/output system in either a front or back seat) will cause the displayed object 2204 to move to the right adjacent input/output system (relative to the gesture receiving input/output system) (which corresponds to position "5"), the sixth gesture 2208f (if received by an input/output system in a front seat) will cause the displayed object 2204 to move to the input/output system positioned in the left rear seating position (which corresponds to position "6"), the seventh gesture 2208g (if received by an input/output system in a front seat) will cause the displayed object 2204 to move to the input/output system positioned in the middle rear seating position (which corresponds to position "7"), and finally the eighth gesture 2208h (if received by an input/output system in a front seat) will cause the displayed object 2204 to move to the input/output system positioned in the right rear seating position (which corresponds to position "8").

Figure 22B:
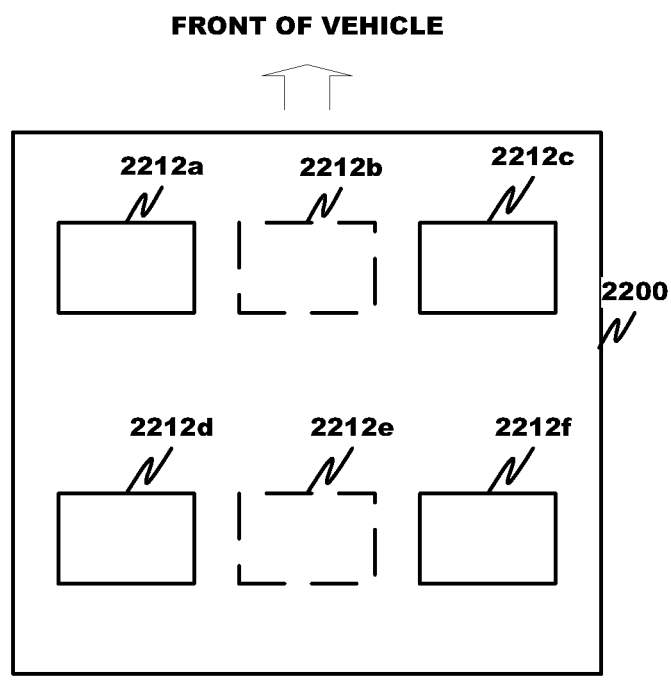

FIG. 22B depicts one technique to determine the destination input/output system(s). The display 2200 of the user's input/output system displays a seating diagram of the vehicle. The first seat icon 2212a corresponds to the driver's seating position, the second seat icon 2212b to the middle front seating position (if present), the third seat icon 2212c to the right front seating position, the fourth seat icon 2212d to the left rear seating position, the fifth seat icon 2212e to the middle rear seating position (if present), and the sixth seat icon 2212f to the right rear seating position. This display would typically be selected from the display containing the displayed object to be moved and would be selected before or after selection of the displayed object for movement. Unlike the prior technique, which generally requires the displayed object to be moved to multiple input/output systems sequentially or entry of multiple gestures, which can be laborious, the seating diagram enables the displayed object to be moved substantially simultaneously to multiple input/output systems. Specifically, selection of a seating position selects the input/output system servicing the seating position. Multiple seating positions can be selected from the display 2200, which, when a movement command is received, causes the displayed object to be moved to each of the input/output system(s) servicing the seating position(s) selected.

Other modalities for sharing the displayed object or content are possible. The displayed object movement module 2024 can provide the user seeking to share content with a list of the sensed identities of the various vehicle occupants. The user can simply select the occupants, by his or her corresponding unique identifier, to receive the shared content. When selected, the vehicle processing module would have a corresponding seating position and display for each named occupant. The content is, upon receipt of a "share" or "send" command then shared with each selected occupant's respective delay. The identity can be name, nickname, contact address (such as email address or instant message handle), and the like. The identity of each occupant can be sensed by any suitable technique, including parameters, such as weight, received by a seating sensor of the occupant's seat, seat or other settings selected by the occupant and received by a processing module, a computational device, such as a cell phone, laptop, tablet computer, e-reader, personal digital assistant, and the like carried by the occupant (such information would be exchanged, such as by a handshake, by the vehicle's processing module and the computational device), direct input from the occupant or user, sensed biometric information, and the like.

Returning to FIG. 21, the displayed object movement module 2024 moves the displayed object selected for movement to the display of each of the selected input/output systems and alters the current display of each of the selected input/output systems to include the moved displayed object. Alteration of the display can depend on the content currently being viewed at each of the targeted displays. For example, if a target display is displaying streaming video, the moved displayed object could be minimized, giving the user the option of opening the displayed object and interrupting the video display. If a target display is inactive for a specified time period and therefore in "sleep" or "power down" mode, the moved displayed object could be maximized and the display awakened from a "sleep" or "power down" mode to display the maximized displayed object. The format and other display parameters of the shared content or displayed object can also be based on default or preferences of the sharing user or selected recipient (or target occupant) or a further command received from the sharing user or target occupant.

In decision diamond 2112, the displayed object movement module 2024 determines whether to continue display of the displayed object on the source display which received the movement command for the displayed object. The determination can be based on default or preferences of the sharing user or target occupant or a further command received from the sharing user or target occupant. When the source display is to be altered, the displayed object movement module 2024, in step 2116, alters the source display to remove the displayed object. When the source display is not to be altered, the displayed object movement module 2024, in step 2120, continues to display the displayed object.

Problems can arise when the display of the target occupant is not activated. The vehicle processing module can determine which of the displays are activated and not activated. The vehicle processing module can cause each of the targeted displays to be activated if not already activated. Alternatively, the processing module can simply ignore any share command for those targeted displays that are not activated but perform the command for those targeted displays that are activated.

One optional operating mode of the displayed object movement module 2024 is to share the displayed object or other selected content with a computational device such as a cell phone, laptop, tablet computer, e-reader, personal digital assistant, and the like, carried and/or associated with one or more selected occupants and currently present in the vehicle. In that event, the content can be shared with the targeted display if activated and/or with the computational device if activated. The sharing user could specify which of the display and computational device is to be the recipient of the shared content. Alternatively, an order of priority could govern the selection. For example, the display is selected if activated and, if not activated, any activated computational device associated with the recipient and currently physically present in the vehicle would be selected as the recipient.

Operation of Presence Reporting Module 2056

A presence reporting module considers local laws, individual (or contactee) context, and other factors in determining whether an individual is present (e.g., for unified communications) and, if so, by what communication modalities and/or channel(s) (e.g., Voice over IP, cellular call, email, texting, tweeting, instant messaging, short message service, audio and video enabled call, and the like. Local laws, for example, may prohibit cellular calls and/or texting and/or tweeting while the car is in motion. In that event, a permissible communication channel, such as email or paging, is reported to the presence service 1500. The context could include, for example, the contactee is in the driver's seat (as determined by an on board sensor, such as a seating sensor), and the like), the vehicle is in motion, the vehicle is parked, the contactee is absent from vehicle (as determined by an on board sensor, such as a seating sensor, and the like), the contactee is currently using his or her corresponding input/output system and therefore is or is not available (depending on contactee preference), a current seating position of the contactee (e.g., whether the contactee is a driver or passenger), a current geographical and/or geopolitical location of the vehicle, and so on. Other factors include, for example, the on board communication system and/or external computational device(s) 1532 are currently out of cellular phone range, the on board communication system and/or external computational device(s) 1532 are currently roaming, the wireless connection, such as over a cellular network, with the on board communication system and/or external computational device(s) is currently unacceptable (e.g., unacceptably low signal-to-noise ratio or quality or grade of service), and the like.

In one exemplary application, the presence reporting module can determine, based on the vehicle occupant context, whether the vehicle occupant is present and available for receiving an inbound communication and/or by what communication channel and/or modality to contact the vehicle occupant. The vehicle occupant context can be one or more of whether the vehicle occupant is in the driver's seat, whether the vehicle is in motion and/or in gear, whether the vehicle is parked, whether the vehicle occupant is absent from vehicle, whether the vehicle occupant is currently using his or her corresponding on board input/output system, whether an on board vehicle transceiver to receive in bound communications is contactable, whether the on board vehicle transceiver is currently roaming, and whether a quality and/or grade of service of a wireless connection with the vehicle transceiver is unacceptable.

Figure 29:
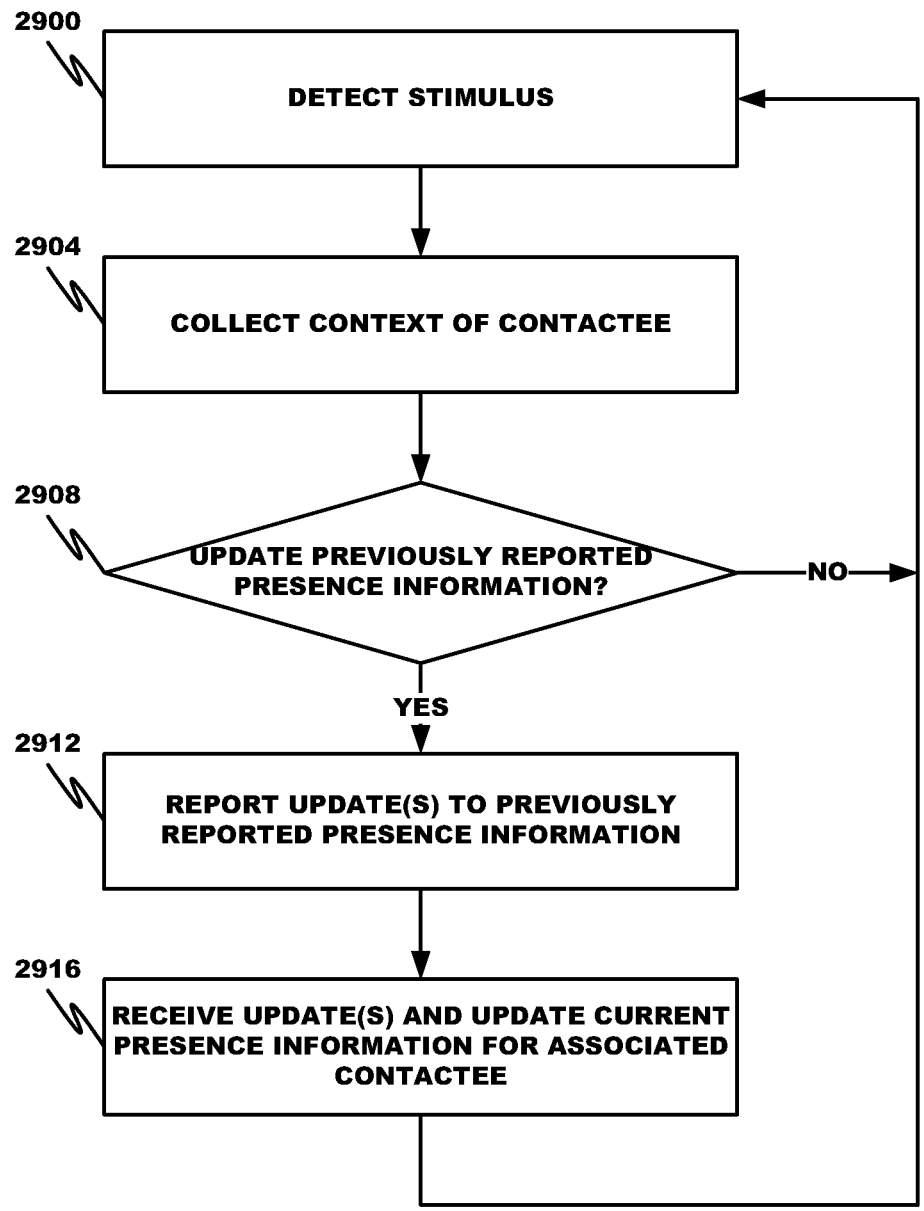
FIG. 29 depicts a flow diagram according to an embodiment.

With reference to FIG. 29, the presence reporting module 2056, in step 2900, detects a stimulus, such as a passage of time, a query by the presence service 1500, an incoming or inbound contact, a change in user context, a change in the applicable local law due to a change in location of the vehicle, a change in contactee context, or a change in another factor.

In step 2904, the presence reporting module 2056 collects the context of the contactee, such as by querying on board sensors 1516, a input/output system 1520 corresponding to a seating location of the contactee to determine a current state of the input/output system (operational or non-operational) and/or activity of the contactee (e.g., web surfing, playing media, engaged in a phone call, etc.), an external computational device 1532 associated with the contactee, and/or the transceiver 1508 and/or network controller 1528 for information regarding the available networks for a communication and/or the quality of a connection over each network.

In decision diamond 2908, the presence reporting module 2056 determines whether the previously reported presence information requires updating (e.g., the previously reported presence information is no longer valid due a sensed change). When no update is required, the presence reporting module 2056 returns to step 2900. When an update is required, the presence reporting module 2056 proceeds to step 2912.

In step 2912, the presence reporting module 2056 reports the update(s) (or changes to the previously reported presence information) to the presence service 1500.

In step 2916, the presence service 1500 receives the update(s) and updates the current presence information for the associated contactee.

Operation of Networking Module 2070

An operation of the networking module 2070 will now be discussed with reference to FIG. 30.

Networking, particularly social networking, among vehicles can add a new dimension to driving. For example, an operator can socially network with a friend driving in the next lane. Although this can be done with cell phones, it can be difficult to retrieve the number while driving let alone to dial it without increasing accident risk. Rather than fuming silently, occupants of different vehicles can conduct a social round table as they sit in gridlock. If an operator wanted to communicate with another car, he or she could address it using the license plate number. When the networking session is a social networking session, the networking participants in each of the networked vehicles can be members of a preexisting online community, e-community, and/or virtual community.

There are a myriad of other examples of networked vehicles. Networked vehicles, for example, can enable multiple cars to connect while on car trips to share information about how much gas is left in the fuel tanks, competing fuel economy between the cars, shared routes, and land marks and gas stations on the route ahead. Networked vehicles can record the real-time fuel economy of a vehicle and then compare that fuel economy to peers, thereby enabling the driver to see other drivers that have driven the same, or similar routes, and receive suggestions from other drivers on the best route for the best fuel economy. A ride-sharing network can encourage ad hoc carpooling and provide a rating and recommendation system for its users. Networked vehicles can play games with one another. Since the game could have access to car metrics, games could incorporate actual car data, such as speed, fuel, etc. Games could simulate what would happen if an operator drove the way he or she wanted to. Kids in socially networked vehicles can play games against one another.

Figure 30:
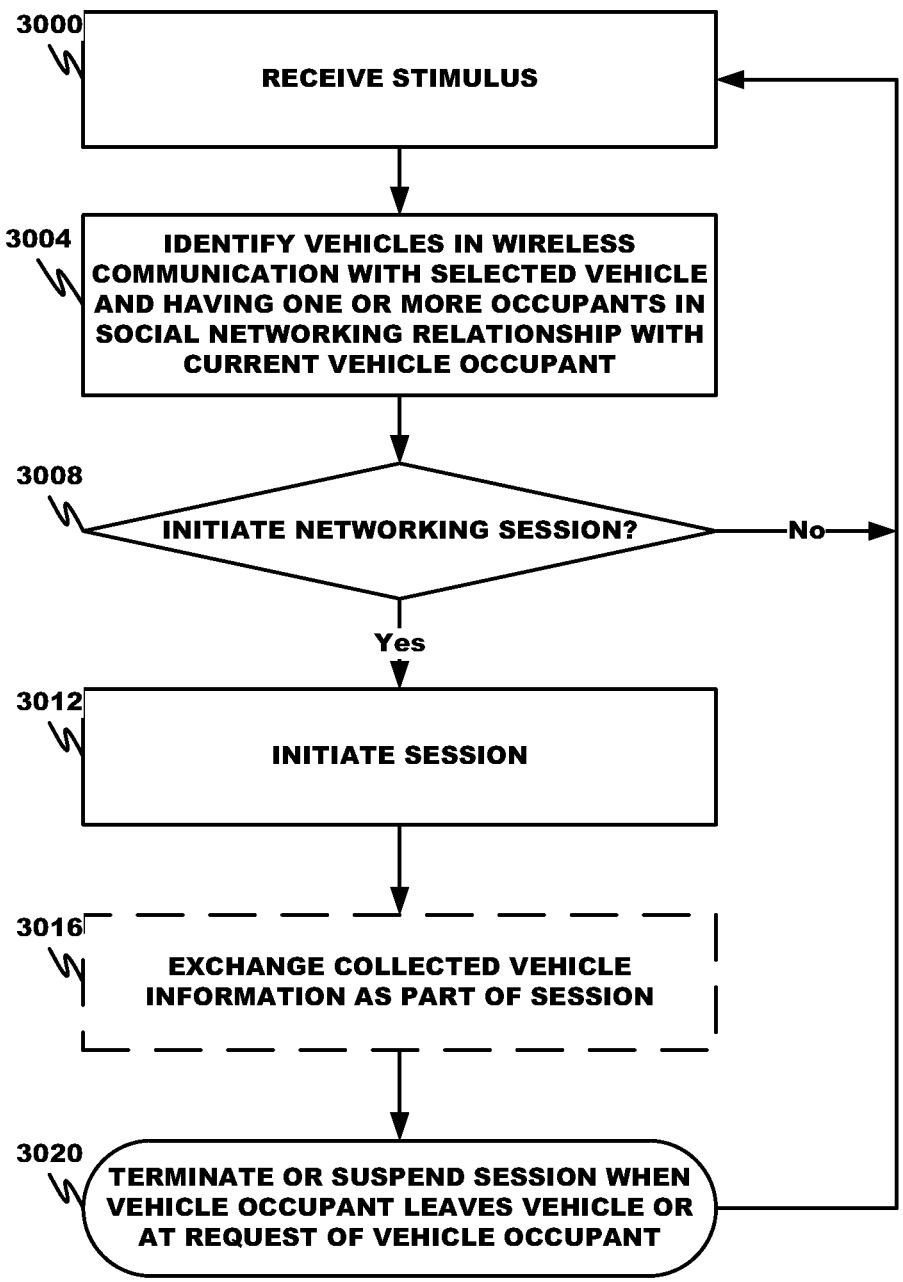
FIG. 30 depicts a flow diagram according to an embodiment.

With reference to FIG. 30, the processing module of a vehicle receives a stimulus in step 3000. The stimulus can be a request by a user to initiate a network with a vehicle identified by the user providing the license plate number, receipt of a request for initiating a networking session from another vehicle, the determination that a vehicle of a socially networked contact is available to initiate a networking session, and the like.

In step 3004, the social networking module 2070 identifies the vehicles in wireless communication with the selected vehicle and having one or more occupants in a networking relationship with a current vehicle occupant. The networked vehicles are typically in spatial proximity to one another, with the networking messages being exchanged over a short-range wireless technology forming a personal area network such that the information is not exchanged over the Internet. The networked vehicles can be in spatial proximity to one another, the networking messages can be exchanged using a short wavelength radio transmission having a limited range, and the radio transmission can use a frequency band ranging from about 2 to about 3 GHz.

In step 3008, the networking module 2070 determines whether or not to initiate a networking session. This can be determined by receiving user input, predetermined rules provided by the user, legal restrictions on the ability of the current or other vehicle to engage in a networking session, and the like.

When a networking session is to be initiated, the networking module 2070, in step 3012, initiates the session.

In optional step 3016, the networking module 2070 collects vehicle information and provides the information to the networked vehicle. The other vehicle, in return, can provide its collected vehicle information.

In step 3020, the networking module terminates or suspends the session when a vehicle occupant leaves one of the networked vehicles and/or at the request of a vehicle occupant.

After step 3020 or when no networking session is to be initiated (decision diamond 3008), the networking module 2070 returns to step 3000.

The exemplary systems and methods of this disclosure have been described in relation to vehicle processing modules. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a vehicle computer system, a Personal Computer (PC), laptop, netbook, smart phone, Personal Digital Assistant (PDA), tablet, etc., or collocated on a particular node of a distributed network, such as an analog and/or digital communications network, a packet-switch network, or a circuit-switched network or collocated on a particular node of a distributed network, such as an analog and/or digital communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a server. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the application store is applied in a vehicle other than a wheeled or tracked vehicle. For example, the application store can be implemented in an aircraft, boat, ship, and the like.

In another alternative embodiment, the application store can include not only media player software but also media itself. Media, for example, can involve one or more media types (e.g., audio and/or video). Media can thus refer to music, movies, videos, audio books, pictures, screen savers, display wallpaper, and the like.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in con junction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A vehicle, comprising:
a microprocessor;
a computer readable memory on board the vehicle;
a power source to propel the vehicle; and
a microprocessor executable installation supervisor operable for a selected computational component to be installed in the vehicle, to create a set of data structures in the selected computational component and/or the computer readable medium to bind the selected computational component to the vehicle, thereby preventing the selected computational component, after installation in the vehicle, from communicating openly with a processing module in a different vehicle.

2. The vehicle of claim 1, wherein the selected computational component is one or more of hardware and/or software and wherein the installation supervisor is further operable to determine, for the selected computational component to be installed in the vehicle, whether the selected computational component satisfies a requirement and/or restriction associated with the selected computational component, when installed, and, when the selected computational component can satisfy the requirement and/or restriction, creates the set of data structures.

3. The vehicle of claim 2, wherein the selected computational component is one or more of an on-board sensor, processing module, software application, circuit board, expansion module, critical device, non-critical device, and cellular upgrade module.

4. The vehicle of claim 3, wherein the selected computational component is one or more of an on board sensor, a media controller, a gateway, a firewall, a processing module, a network controller, an input/output system, a display controller, an audio controller, an arbitration module, a health check module, a critical system controller, a non-critical system controller, an on board sensor monitor, a displayed object movement module, a diagnostic module, a media filter, a network selector, a remote control module, a computational module selector, an expansion module, an application, and a plug-in module.

5. The vehicle of claim 2, wherein the selected computational component monitors, controls, operates, and/or is one or more of an engine and/or power control unit, transmission control unit (TCU), a door setting, a window setting, a blind spot monitor, an airbag deployment control unit, a collision sensor, a nearby object sensing system, a seat belt control unit, a sensor for a seat belt setting, a power source controller, an energy output sensor, an engine temperature sensor, oil pressure, hydraulic pressure, a headlight, an emergency light, a brake light, a parking light, a fog light, an interior and/or passenger compartment light, a tail light, a vehicle control system sensor, a wireless network, a cellular data sensor, a steering sensor, a torque sensor, an engine, power steering, a display panel, switch state control unit, and a brake control unit.

6. The vehicle of claim 2, wherein the selected computational component monitors, controls, operates, and/or is one or more of an emissions system, a seating system controller and/or sensor, an entertainment system, monitoring an ambient (outdoor) weather sensor, an odometer reading sensor, a trip mileage reading sensor, a road condition sensor, a radar transmitter/receiver output, a brake wear sensor, an oxygen sensor, an ambient lighting sensor, a vision system sensor, a ranging sensor, a parking sensor, a heating, venting, and air conditioning (HVAC) system and/or sensor, a water sensor, a air-fuel ratio meter, a hall effect sensor, a microphone, a radio frequency (RF) sensor, and/or an infrared (IR) sensor.

7. The vehicle of claim 1, wherein the installation supervisor is operable to perform a plurality of: (a) detect an installation attempt of the selected computational component on board the vehicle, (b) in response, determine a characteristic of the selected computational component, (c) determine whether the selected computational component is linked with another vehicle, and (d) determine whether the installation of the selected computational component is in compliance with a license restriction and/or requirement.

8. The vehicle of claim 7, wherein operation (c) is performed.

9. A method, comprising:
a microprocessor executable installation supervisor determining that a selected computational component is to be installed in a selected vehicle, and
in response, the microprocessor executable installation supervisor creating a set of data structures in the selected computational component and/or a computer readable medium on board the selected vehicle to bind the selected computational component to the selected vehicle, thereby restricting the ability of the selected computational component, after installation in the selected vehicle, to communicate with a processing module in a different vehicle when compared to the ability of the selected computational component, after installation in the selected vehicle, to communicate with a processing module in the selected vehicle.

10. The method of claim 9, wherein the selected computational component is one or more of hardware and/or software, wherein the installation supervisor determines whether the selected computational component satisfies a requirement and/or restriction associated with the selected computational component, when installed, and when the selected computational component can satisfy the requirement and/or restriction, the installation supervisor creates the set of data structures.

11. The method of claim 10, wherein the selected computational component is one or more of an on-board sensor, processing module, software application, circuit board, expansion module, critical device, non-critical device, and cellular upgrade module.

12. The method of claim 11, wherein the selected computational component is one or more of an on board sensor, a media controller, a gateway, a firewall, a processing module, a network controller, an input/output system, a display controller, an audio controller, an arbitration module, a health check module, a critical system controller, a non-critical system controller, an on board sensor monitor, a displayed object movement module, a diagnostic module, a media filter, a network selector, a remote control module, a computational module selector, an expansion module, an application, and a plug-in module.

13. The method of claim 10, wherein the selected computational component monitors, controls, operates, and/or is one or more of an engine and/or power control unit, transmission control unit (TCU), a door setting, a window setting, a blind spot monitor, an airbag deployment control unit, a collision sensor, a nearby object sensing system, a seat belt control unit, a sensor for a seat belt setting, a power source controller, an energy output sensor, an engine temperature sensor, oil pressure, hydraulic pressure, a headlight, an emergency light, a brake light, a parking light, a fog light, an interior and/or passenger compartment light, a tail light, a vehicle control system sensor, a wireless network, a cellular data sensor, a steering sensor, a torque sensor, an engine, power steering, a display panel, switch state control unit, and a brake control unit.

14. The method of claim 10, wherein the selected computational component monitors, controls, operates, and/or is one or more of an emissions system, a seating system controller and/or sensor, an entertainment system, monitoring an ambient (outdoor) weather sensor, an odometer reading sensor, a trip mileage reading sensor, a road condition sensor, a radar transmitter/receiver output, a brake wear sensor, an oxygen sensor, an ambient lighting sensor, a vision system sensor, a ranging sensor, a parking sensor, a heating, venting, and air conditioning (HVAC) system and/or sensor, a water sensor, a air-fuel ratio meter, a hall effect sensor, a microphone, a radio frequency (RF) sensor, and/or an infrared (IR) sensor.

15. The method of claim 9, further comprising:
the installation supervisor performing a plurality of:
(a) detecting an installation attempt of the selected computational component on board the selected vehicle,
(b) in response, determining a characteristic of the selected computational component,
(c) determining whether the selected computational component is linked with another vehicle, and
(d) determining whether the installation of the selected computational component is in compliance with a license restriction and/or requirement.

16. The vehicle of claim 15, wherein operation (c) is performed.

17. A non-transitory, tangible computer readable medium comprising a microprocessor executable installation supervisor on board a selected vehicle that, when executed, creates a set of data structures in a selected computational component to be installed in a selected vehicle and/or a computer readable medium on board the selected vehicle to bind the selected computational component to the selected vehicle, thereby prohibiting the selected computational component, after installation in the selected vehicle, from communicating restricted vehicle information to a processing module in a different vehicle.

18. The computer readable medium of claim 17, wherein the installation supervisor (a) determines, for the selected computational component to be installed in the selected vehicle, whether the selected computational component satisfies a requirement and/or restriction associated with the selected computational component when installed, and (b) when the selected computational component can satisfy the requirement and/or restriction, the installation supervisor creates the data structures and wherein the selected computational component is one or more of hardware and/or software.

19. The computer readable medium of claim 18, wherein the selected computational component is one or more of an on-board sensor, processing module, software application, circuit board, expansion module, critical device, non-critical device, and cellular upgrade module.

20. The computer readable medium of claim 18, wherein the selected computational component is one or more of an on board sensor, a media controller, a gateway, a firewall, a processing module, a network controller, an input/output system, a display controller, an audio controller, an arbitration module, a health check module, a critical system controller, a non-critical system controller, an on board sensor monitor, a displayed object movement module, a diagnostic module, a media filter, a network selector, a remote control module, a computational module selector, an expansion module, an application, and a plug-in module.

21. The computer readable medium of claim 18, wherein the selected computational component monitors, controls, operates, and/or is one or more of an engine and/or power control unit, transmission control unit (TCU), a door setting, a window setting, a blind spot monitor, an airbag deployment control unit, a collision sensor, a nearby object sensing system, a seat belt control unit, a sensor for a seat belt setting, a power source controller, an energy output sensor, an engine temperature sensor, oil pressure, hydraulic pressure, a headlight, an emergency light, a brake light, a parking light, a fog light, an interior and/or passenger compartment light, a tail light, a vehicle control system sensor, a wireless network, a cellular data sensor, a steering sensor, a torque sensor, an engine, power steering, a display panel, switch state control unit, and a brake control unit.

22. The computer readable medium of claim 18, wherein the selected computational component monitors, controls, operates, and/or is one or more of an emissions system, a seating system controller and/or sensor, an entertainment system, monitoring an ambient (outdoor) weather sensor, an odometer reading sensor, a trip mileage reading sensor, a road condition sensor, a radar transmitter/receiver output, a brake wear sensor, an oxygen sensor, an ambient lighting sensor, a vision system sensor, a ranging sensor, a parking sensor, a heating, venting, and air conditioning (HVAC) system and/or sensor, a water sensor, a air-fuel ratio meter, a hall effect sensor, a microphone, a radio frequency (RF) sensor, and/or an infrared (IR) sensor.

23. The computer readable medium of claim 9, wherein the instructions, when executed, perform or cause the performance of a plurality of:
detecting an installation attempt of the selected computational component on board the selected vehicle,
in response, determining a characteristic of the selected computational component,
determining whether the selected computational component is linked with another vehicle, and
determining whether the installation of the selected computational component is in compliance with a license restriction and/or requirement.

24. The computer readable medium of claim 23, wherein the instructions perform or cause the performance of determining whether the selected computational component is linked with another vehicle.

\* \* \* \* \*

UNITED STATES PATENT AND TRADEMARK OFFICE
CERTIFICATE OF CORRECTION

| | | |
|---|---|---|
| PATENT NO. | : 9,134,986 B2 | Page 1 of 1 |
| APPLICATION NO. | : 14/485467 | |
| DATED | : September 15, 2015 | |
| INVENTOR(S) | : Christopher P. Ricci | |

It is certified that error appears in the above-identified patent and that said Letters Patent is hereby corrected as shown below:

Claims

Claim 1, column 59, line 16, after "able" insert --,-- therein.

Signed and Sealed this
Twenty-third Day of August, 2016

Michelle K. Lee
*Director of the United States Patent and Trademark Office*